US012759942B2

(12) United States Patent
Lathiya et al.

(10) Patent No.: US 12,759,942 B2
(45) Date of Patent: Oct. 13, 2026

(54) COPPER OXIDE DOPED NI—CO—ZN FERRITE FOR VERY HIGH FREQUENCY AND ULTRA HIGH FREQUENCY APPLICATIONS AND PROCESS METHODOLOGY

(71) Applicant: UNIVERSITY OF SOUTH FLORIDA, Tampa, FL (US)

(72) Inventors: Poonam Lathiya, Tampa, FL (US); Jing Wang, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 285 days.

(21) Appl. No.: 18/255,322

(22) PCT Filed: Dec. 3, 2021

(86) PCT No.: PCT/US2021/061772
§ 371 (c)(1),
(2) Date: May 31, 2023

(87) PCT Pub. No.: WO2022/120149
PCT Pub. Date: Jun. 9, 2022

(65) Prior Publication Data

US 2024/0018051 A1 Jan. 18, 2024

Related U.S. Application Data

(60) Provisional application No. 63/120,826, filed on Dec. 3, 2020.

(51) Int. Cl.

| | |
|---|---|
| ***C04B 35/26*** | (2006.01) |
| ***C04B 35/63*** | (2006.01) |
| ***C04B 35/64*** | (2006.01) |
| ***H01F 1/34*** | (2006.01) |

(52) U.S. Cl.
CPC ........ *C04B 35/265* (2013.01); *C04B 35/6303* (2013.01); *C04B 35/64* (2013.01); *H01F 1/344* (2013.01); *C04B 2235/327* (2013.01); *C04B 2235/3274* (2013.01); *C04B 2235/3275* (2013.01); *C04B 2235/3279* (2013.01); *C04B 2235/3281* (2013.01); *C04B 2235/3284* (2013.01); *C04B 2235/549* (2013.01); *C04B 2235/656* (2013.01); *C04B 2235/77* (2013.01); *C04B 2235/781* (2013.01); *C04B 2235/96* (2013.01)

(58) Field of Classification Search
CPC ....... H01F 1/344; C04B 35/265; C04B 35/64; C04B 35/6303; C04B 2235/3274; C04B 2235/3275; C04B 2235/3279; C04B 2235/3281; C04B 2235/3284; C04B 2235/327; C04B 2235/781; C04B 2235/77; C04B 2235/96
See application file for complete search history.

(56) References Cited

U.S. PATENT DOCUMENTS

| | | | |
|---|---|---|---|
| 5,648,015 | A | 7/1997 | Reczek |
| 6,890,670 | B2 | 5/2005 | Leddy et al. |
| 2006/0118758 | A1 | 6/2006 | Wang et al. |
| 2016/0358862 | A1 | 12/2016 | Lee et al. |
| 2017/0213628 | A1 | 7/2017 | Chen et al. |
| 2018/0016157 | A1 | 1/2018 | Chen et al. |

FOREIGN PATENT DOCUMENTS

| | | | |
|---|---|---|---|
| CN | 101723654 | * | 6/2010 |

OTHER PUBLICATIONS

Thakur, Atul, et al. "Low-loss spinel nanoferrite with matching permeability and permittivity in the ultrahigh frequency range." Journal of Applied Physics 108.1 (2010). 5 pages.
Stergiou, Charalampos. "Magnetic, dielectric and microwave absorption properties of rare earth doped Ni—Co and Ni—Co—Zn spinel ferrites." Journal of Magnetism and Magnetic Materials 426 (2017): 629-635.
Mathur, P., et al. "Sustained electromagnetic properties of Ni—Zn—Co nanoferrites for the high-frequency applications." Materials Letters 64.24 (2010): 2738-2741.
Kong, L. B., et al. "Ni—Zn ferrites composites with almost equal values of permeability and permittivity for low-frequency antenna design." IEEE Transactions on Magnetics 43.1 (2006): 6-10.
Zheng, Zongliang, et al. "Low-loss Z-type barium hexaferrite composites from nanoscale ZnAl2O4 addition for high-frequency applications." AIP Advances 8.5 (2018).
International Search Report of related PCT/US2021/061772, mailed Mar. 31, 2022, 4 pages.
Written Opinion of related PCT/US2021/061772, mailed Mar. 31, 2022, 9 pages.
Zhao et al. "Characterization of magnetic properties and microstructures for Co 2+ ions-doped Ni—Cu—Zn ferrites." Journal of Materials Science: Materials in Electronics 31 (2020): 9057-9064.
"Maghemite." Wikipedia, Wikimedia Foundation, Jun. 21, 2017, https://en.wikipedia.org/wiki/Maghemite.

* cited by examiner

*Primary Examiner* — C Melissa Koslow
(74) *Attorney, Agent, or Firm* — HUSCH BLACKWELL LLP

(57) ABSTRACT

A soft ferrite composition comprises a ferrimagnetic ceramic material having a crystal structure and a dopant in the crystal structure, wherein the ceramic material comprises an oxide including nickel, cobalt, zinc, and iron, wherein the dopant is selected from the group consisting of copper oxides, and wherein the dopant is present in the crystal structure at 0.1 to 20 weight percent based Non a total weight of the composition. The dopant can be CuO. The copper oxide doped Ni—Co—Zn ferrite can be used for very high frequency (VHF) and ultra high frequency (UHF) applications such antennas, isolators, and circulators.

12 Claims, 42 Drawing Sheets

Complex permeability and Resonance Frequency of Magnetic Materials

Complex Permeability $\mu_r = \mu' - j\mu''$

Magnetic loss tangent $tan\delta_\mu = \frac{\mu''}{\mu'}$

Quality factor $Q\text{-}factor = \frac{1}{tan\delta_\mu}$

Relative loss factor $\frac{tan\delta_\mu}{\mu'}$

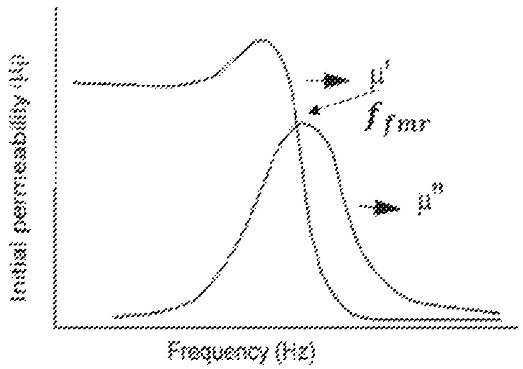

Snoek's limit:

- Limits the resonance frequency of the material
- Each material has its own resonance frequency Snoek's limit $(\mu_i - 1)f_{fmr} = \frac{2\gamma 4\pi M_s}{3}$ Figure of merit $(\mu_i - 1)f_{fmr} = Constant$

FIG. 1

Device Performance and Electrical Properties

Device Size:

$$\text{Device } Size \propto \lambda_g = \frac{c}{f\sqrt{\mu_{eff}\varepsilon_{eff}}} \propto \frac{1}{\sqrt{\mu_r\varepsilon_r}}$$

Miniaturize the antenna implies to maximize the product $\mu_r \times \varepsilon_r$

Impedance Matching with Free Space:

$$\eta_0 = \eta_1$$

Characteristic Impedance $$\eta_1 = \eta_0\sqrt{\mu_r/\varepsilon_r}$$

For dielectric only ⟹ $\eta_1 = \eta_0 * \sqrt{(1/\varepsilon r)}$

For Magneto-dielectric ⟹ $\eta_1 = \eta_0 * \sqrt{(\mu r / \varepsilon r)}$

Bandwidth :

$$BW = \frac{96\sqrt{\frac{\mu_r}{\varepsilon_r}}\frac{t}{\lambda_0}}{\sqrt{2}\left[4 + 17\sqrt{\mu_r\varepsilon_r}\right]}$$

Maximize bandwidth implies to maximize $\mu_r$

Impedance matching implies $$\mu_r = \varepsilon_r$$

FIG. 2

COPPER OXIDE DOPED NI—CO—ZN FERRITE FOR VERY HIGH FREQUENCY AND ULTRA HIGH FREQUENCY APPLICATIONS AND PROCESS METHODOLOGY

CROSS-REFERENCES TO RELATED APPLICATIONS

This application is a 371 U.S. National Phase entry of International Application No. PCT/US2021/061772, filed Dec. 3, 2021, which claims the benefit of U.S. Provisional Patent Application No. 63/120,826 filed Dec. 3, 2020, each of which are incorporated herein by reference in their entirety for all purposes.

STATEMENT REGARDING FEDERALLY SPONSORED RESEARCH

Not Applicable.

FIELD OF THE INVENTION

This invention relates to copper oxide doped Ni—Co—Zn ferrite compositions having high permeability and low magnetic loss at RF and microwave frequencies.

BACKGROUND

For decades, the soft magnetic materials have been proposed for radio frequency (RF) and microwave applications in different areas ranging from electronics to biomedical devices and miniaturization of devices, shielding from electromagnetic waves, and enhancement of antenna sensitivity and range. Ferrites are an important class of magnetic materials that have been widely used in various electromagnetic devices due to their high resistivity, good chemical stability, and excellent magnetic properties. In recent years, the operational frequency of many electromagnetic devices has become increasingly higher. However, it has been challenging to develop ferrite materials for use in such high frequency applications as known ferrite materials exhibit relatively high magnetic losses at high frequencies. For example, ferrites with high permeability values, such as NiZn ferrites, have been widely used for high frequency applications. However, these ferrites exhibit relatively low cutoff frequencies that prevent their use above 0.3 GHz.

Therefore, there exists a need for ferrites with high permeability and low magnetic loss at RF and microwave frequencies. There also exists a need for ferrites with high permeability and low magnetic loss when the ferrites operate at a frequency range that is much higher than today's near-field communication (NFC) applications at 13.56 MHz.

SUMMARY OF THE INVENTION

The foregoing needs are met by a soft ferrite composition according to this disclosure. The ferrite composition comprises a ferrimagnetic ceramic material having a crystal structure and a dopant in the crystal structure, wherein the ceramic material comprises an oxide including nickel, cobalt, zinc, and iron, wherein the dopant is selected from the group consisting of copper oxides, and wherein the dopant is present in the crystal structure at 0.1 to 20 weight percent based on a total weight of the composition. The dopant can be CuO.

The foregoing and other aspects and advantages of the invention will appear from the following description. In the description, reference is made to the accompanying drawings which form a part hereof, and in which there is shown by way of illustration an example embodiment of the invention. Such embodiment does not necessarily represent the full scope of the invention, however, and reference is made therefore to the claims and herein for interpreting the scope of the invention.

BRIEF DESCRIPTION OF DRAWINGS

FIG. 1 shows symbols and equations for complex permeability and resonance frequency of magnetic materials.

FIG. 2 shows symbols and equations for device performance and electrical properties of magnetic materials.

Figure 3:
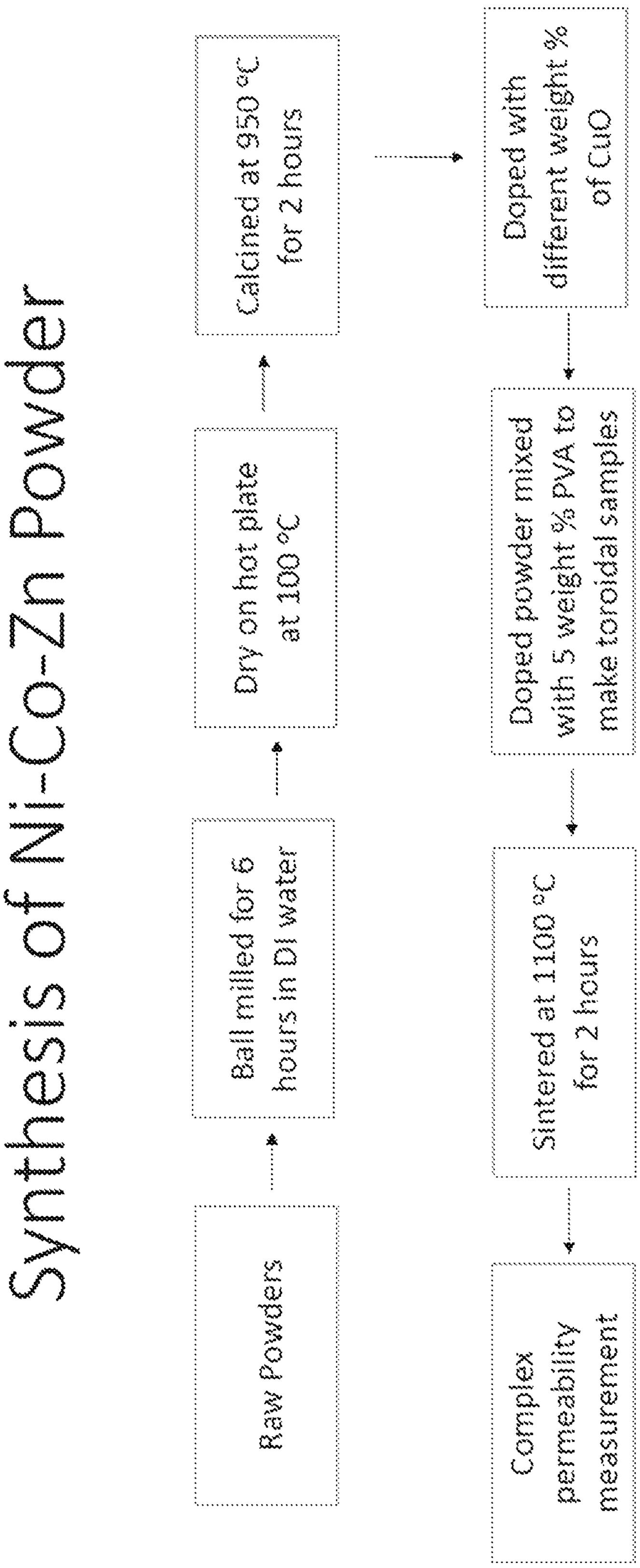
FIG. 3 shows a flow chart of example synthesis steps for a doped Ni—Co—Zn powders.

The invention will be better understood and features, aspects and advantages other than those set forth above will become apparent when consideration is given to the following detailed description thereof. Such detailed description makes reference to the drawings.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

As context for the invention, it is noted that radio frequency (RF) is in the frequency range from around 20 kHz to around 300 GHz; very high frequency (VHF) is the ITU designation for the range of radio frequency electromagnetic waves (radio waves) from 30 to 300 megahertz (MHz); ultra high frequency (UHF) is the ITU designation for radio frequencies in the range between 300 megahertz (MHz) and 3 gigahertz (GHz); and microwave has frequencies between 300 MHz and 300 GHz.

For a better understanding of the invention, FIG. 1 shows symbols and equations for complex permeability and resonance frequency of magnetic materials, and FIG. 2 shows symbols and equations for device performance and electrical properties of magnetic materials.

In one embodiment, the invention provides a soft ferrite composition comprising: a ferrimagnetic ceramic material having a crystal structure and a dopant in the crystal structure, wherein the ceramic material comprises an oxide including nickel, cobalt, zinc, and iron, wherein the dopant is selected from the group consisting of copper oxides, and wherein the dopant is present in the crystal structure at 0.1 to 20 weight percent based on a total weight of the composition. The dopant can be CuO. The ceramic material may be an oxide consisting essentially of nickel, cobalt, zinc, iron, and oxygen.

The dopant may be present in the crystal structure at 0.1 to 10 weight percent based on a total weight of the composition. The dopant may be present in the crystal structure at 0.1 to 8 weight percent based on a total weight of the composition. The dopant may be present in the crystal structure at 0.1 to 5 weight percent based on a total weight of the composition. The dopant may be present in the crystal structure at 2 to 4 weight percent based on a total weight of the composition.

A sum of a stoichiometry of the nickel, a stoichiometry of the cobalt, and a stoichiometry of the zinc, may be in a ratio of about 1:2 with a stoichiometry of the iron. In one non-limiting example embodiment, the ceramic material has the formula: $Ni_{0.4}Co_{0.25}Zn_{0.35}Fe_2O_{4.1}$. In one non-limiting example embodiment, the ceramic material has the formula: $Ni_{0.4}Co_{0.25}Zn_{0.35}Fe_2O_4$.

In one embodiment, the ferrite composition has a real permeability (μ') of at least 4 over a frequency range of 100 MHz to 18 GHz. In one embodiment, the ferrite composition has a real permeability (μ') of at least 4 over a frequency range of 100 MHz to 3 GHz. In one embodiment, the ferrite composition has a real permeability (μ') of at least 4 over a frequency range of 100 MHz to 1000 MHz. In one embodiment, the ferrite composition has a real permeability (μ') of at least 6 over a frequency range of 100 MHz to 800 MHz. In one embodiment, the ferrite composition has a real permeability (μ') of at least 8 over a frequency range of 100 MHz to 600 MHz. In one embodiment, the ferrite composition has a real permeability (μ') ranging from 5 to 10 at a frequency of 300 MHz. In one embodiment, the ferrite composition has a real permeability (μ') ranging from 4 to 12 at a frequency of 500 MHz. In one embodiment, the ferrite composition has a real permeability (μ') ranging from 3 to 10 at a frequency of 800 MHz.

In one embodiment, the ferrite composition has an imaginary permeability (μ") of at least 2 over a frequency range of 500 MHz to 18 GHz. In one embodiment, the ferrite composition has an imaginary permeability (μ") of at least 2 over a frequency range of 500 MHz to 3 GHz. In one embodiment, the ferrite composition has an imaginary permeability (μ") of at least 2 over a frequency range of 500 MHz to 1000 MHz. In one embodiment, the ferrite composition has an imaginary permeability (μ") of at least 3 over a frequency range of 500 MHz to 1000 MHz.

In one embodiment, the ferrite composition has a magnetic loss tangent (tan $\delta_\mu$) below 0.8 over a frequency range of 100 MHz to 18 GHz. In one embodiment, the ferrite composition has a magnetic loss tangent (tan $\delta_\mu$) below 0.8 over a frequency range of 100 MHz to 3 GHz. In one embodiment, the ferrite composition has a magnetic loss tangent (tan $\delta_\mu$) below 0.8 over a frequency range of 100 MHz to 800 MHz. In one embodiment, the ferrite composition has a magnetic loss tangent (tan $\delta_\mu$) below 0.5 over a frequency range of 100 MHz to 600 MHz. In one embodiment, the ferrite composition has a magnetic loss tangent (tan $\delta_\mu$) below over a frequency range of 100 MHz to 500 MHz. In one embodiment, the ferrite composition has a magnetic loss tangent (tan $\delta_\mu$) below 0.1 over a frequency range of 100 MHz to 300 MHz. In one embodiment, the ferrite composition has a magnetic loss tangent (tan $\delta_\mu$) ranging from 0.02 to 0.15 at a frequency of 300 MHz. In one embodiment, the ferrite composition has a magnetic loss tangent (tan $\delta_\mu$) ranging from 0.02 to 0.35 at a frequency of 500 MHz. In one embodiment, the ferrite composition has a magnetic loss tangent (tan $\delta_\mu$) ranging from 0.1 to 0.5 at a frequency of 800 MHz.

In one embodiment, the ferrite composition has a real permittivity (ε') of at least 5 over a frequency range of 10 MHz to 18 GHz. In one embodiment, the ferrite composition has a real permittivity (ε') of at least 5 over a frequency range of MHz to 3 GHz. In one embodiment, the ferrite composition has a real permittivity (ε') of at least 5 over a frequency range of 10 MHz to 1000 MHz. In one embodiment, the ferrite composition has a real permittivity (ε') ranging from 4 to 10 over a frequency range of 10 MHz to 1000 MHz.

In one embodiment, the ferrite composition has a dielectric loss tangent (tan $\delta_\mu$) below 0.02 over a frequency range of 100 MHz to 18 GHz. In one embodiment, the ferrite composition a dielectric loss tangent (tan $\delta_\mu$) below 0.02 over a frequency range of 100 MHz to 3 GHz. In one embodiment, the ferrite composition has a dielectric loss tangent (tan $\delta_\mu$) below 0.02 over a frequency range of 100 MHz to 1000 MHz. In one embodiment, the ferrite composition has a dielectric loss tangent (tan $\delta_\mu$) below 0.01 over a frequency range of 100 MHz to 1000 MHz.

In one embodiment, the ferrite composition has a relative loss factor (tan δ/μ') ranging from 0.0005 to 0.01 at a frequency of 300 MHz. In one embodiment, the ferrite composition has a relative loss factor (tan δ/μ') ranging from 0.001 to 0.05 at a frequency of 500 MHz. In one embodiment, the ferrite composition has a relative loss factor (tan δ/μ') ranging from 0.001 to 0.03 at a frequency of 500 MHz. In one embodiment, the ferrite composition has a relative loss factor (tan δ/μ') ranging from 0.01 to 0.05 at a frequency of 800 MHz. In one embodiment, the ferrite composition has a relative loss factor (tan δ/μ') less than 0.04 at a frequency of 800 MHz.

In one embodiment, the ferrite composition has a real permeability (μ') of at least 8 at a frequency of 300 MHz, and the ferrite composition has a magnetic loss tangent (tan $\delta_\mu$) of 0.03 or below at a frequency 300 MHz. In one embodiment, the ferrite composition has a real permeability (μ') of at least 10 at a frequency of 500 MHz, and the ferrite composition has a magnetic loss tangent (tan $\delta_\mu$) of 0.3 or below at a frequency 500 MHz. In one embodiment, the ferrite composition has a real permeability (μ') of at least 8 at a frequency of 800 MHz, and the ferrite composition has a magnetic loss tangent (tan $\delta_\mu$) of 0.7 or below at a frequency 800 MHz.

In one embodiment, the ferrite composition has a porosity of 5% or less. In one embodiment, the ferrite composition has a porosity of 3% or less. In one embodiment, the ferrite composition has a porosity of 2% or less. In one embodiment, the ferrite composition has an average crystallite size of 50 nanometers or less.

In one embodiment, the ferrite composition has a resonance frequency of at least 1.5 GHz. In one embodiment, the ferrite composition has a resonance frequency of at least 2 GHz.

FIG. 3 shows a flow chart of example synthesis steps for a doped Ni—Co—Zn powder. In a first step, raw powders are obtained or prepared. In a second step, the powders are ball milled for a time period (e.g., 6 hours) in deionized water. In a third step, the powders are dried on hot plate at a suitable temperature (e.g., 100° C.). In a fourth step, the powders are calcined at a suitable time and temperature (e.g., 950° C. for 2 hours). In a fifth step, the calcined powders are doped with different weight % of a dopant (e.g., CuO), weight % being based on the total weight of the composition. In a sixth step, the doped powder is mixed with a binder (e.g., 5 weight % polyvinyl alcohol) to make toroidal samples. In a seventh step, the samples are sintered at a suitable time and temperature (e.g., 1100° C. for 2 hours). The sintered samples may then be evaluated for various magnetic and electrical properties (e.g., complex permeability measurement).

In one embodiment, the invention provides a method for forming a ferrite composition. The method includes the steps of: (a) combining a first solid comprising nickel, a second solid comprising cobalt, a third solid comprising zinc, and a fourth solid comprising iron to form a mixture; (b) calcining the mixture; (c) doping the calcined mixture with a fifth solid comprising copper; (d) forming an article from the doped calcined mixture; and (e) sintering the article for form the ferrite composition. The first solid can comprise a nickel oxide or a nickel salt; the second solid can comprise a cobalt oxide or a cobalt salt; the third solid can comprise a zinc oxide or a zinc salt; the fourth solid can comprise an iron oxide or an iron salt, and the fifth solid can comprise a copper oxide or a copper salt. Step (e) can comprise sintering the article at a temperature in a range of 900° C. to 1300° C. Step (c) can comprise doping the calcined mixture with a copper oxide at 0.1 to 20 weight percent based on a total weight of the doped calcined mixture. Step (c) can comprise doping the calcined mixture with a copper oxide at 1 to 5 weight percent based on a total weight of the doped calcined mixture.

EXAMPLES

The following Examples are provided in order to demonstrate and further illustrate certain embodiments and aspects of the present invention and are not to be construed as limiting the scope of the invention.

Example 1

Overview of Example 1

The dynamic magnetic properties in CuO-substituted (x=3 wt. %, 5 wt. %, 8 wt. %, 10 wt. % and 12 wt. %) Ni—Co—Zn ferrites at RF frequencies were investigated. The Ni—Co—Zn ferrites were prepared by a ceramic synthesis process. The synthesized powders were doped with CuO additives up to 12 wt. %. The copper substitution led to soft ferrites with high permeability and low magnetic loss at RF and microwave frequencies.

Background of Example 1

For decades, the soft magnetic materials have been proposed for radio frequency (RF) and microwave applications in different areas ranging from electronics to biomedical devices and miniaturization of devices, shielding from electromagnetic waves, and enhancement of antenna sensitivity and range. Ni—Co—Zn ferrites have exhibited a higher operating frequency range up to 100's of MHz as compared to that of pure Ni—Zn ferrites of a few MHz, which limits the use of Ni—Zn ferrites in RF devices operate at high frequencies. Ni—Co—Zn ferrites offer better suited properties because of its high resistivity, high permeability, low magnetic loss, high operation frequency, and chemical stability. The magnetic properties of Ni—Co—Zn ferrites can be tailored easily by further optimization of different synthesis parameters such as sintering temperature, Ni/Co/Zn ratio, added dopants and by different synthesis methods that can lead to more desirable morphology and microstructure of the material. In this Example 1, we focused on development of CuO doped Ni—Co—Zn ferrites for RF and microwave applications. In this Example 1, more specifically, the effect of CuO concentration on the real part of permeability, the imaginary part of permeability, magnetic loss tangent and resonance frequency was explored.

Experimental Procedure

Soft ferrite material with the composition $Ni_{0.4}Co_{0.25}Zn_{0.35}Fe_2O_{4.1}$ for RF/microwave applications was prepared via solid state synthesis. All the commercially available materials ($Fe_2O_3$, ZnO, CuO, NiO, $Bi_2O_3$ & $Co_2O_3$) were used in the synthesis and each component was added according to its weight percentage (weight % being based on the total weight of the composition). The following are the steps that were used to synthesize this ferrite sample: Weighed ZnO (16.26 g), NiO (10.47 g), $Fe_2O_3$ (66.51 g) and $Co_2O_3$ (6.76 g). Poured all the constituent oxides in a stainless-steel container. Powder was mixed and ball milled in planetary ball mill with DI water for 6 hours using stainless steel balls in 100 ml stainless steel container (diameter of balls 7-8 millimeters). The water to powder ratio & ball to powder ratios were taken as 2.5:1 and 2:1 respectively. The ball mill rotation speed was 560 rpm. The ball milled powder was dried on hot plate at 100° C. for 2 hours, followed by calcination of dried power at 950° C. for 2 hours at a ramping rate of 10° C. per minute (heating and cooling ramp rate was 10° C. per minute). The calcined powder was dry mixed in ball milling with dopants 0.2 wt. % $Bi_2O_3$ (0.2 gm in 100 g powder) and different weight percent of CuO for 2 hours. The stainless steel ball to powder ratio taken 2:1. The ball mill rotation speed was 560 rpm. The fine powders were granulated with 5 wt. % PVA solution for binding. The resulting powder was pressed to form pellets.

The procedure for pellet formation used the following steps: the powder was mixed with polyvinyl alcohol solution (10 wt. % solution) until granulated and a pellet was made. To make 1 pellet, 0.7 grams powder was used. The dimension of the pellet before sintering was as follows: Height=2.5 to 3.2 mm; Outer diameter=7 to 8.5 mm; inner diameter=3.8 to 3.5 mm. Finally, pellets were sintered in air at 1100° C. for 2 hours at a ramp rate of 2° C. per minute. The sintering temperature profile was as follows. The pellet was sintered at a final temperature for 2 hours at a ramping rate of 2° C. per minute. The pellet was first heated at 500° C. for 2 hours, then the temperature was increased to the final temperature of 1100° C. and held there for 2 hours. Heating was done at ramp rate of 2° C. per minute. Cooling was done at 10° C. per minute ramp rate.

Real Permeability (μ') Measurement

Figure 4A:
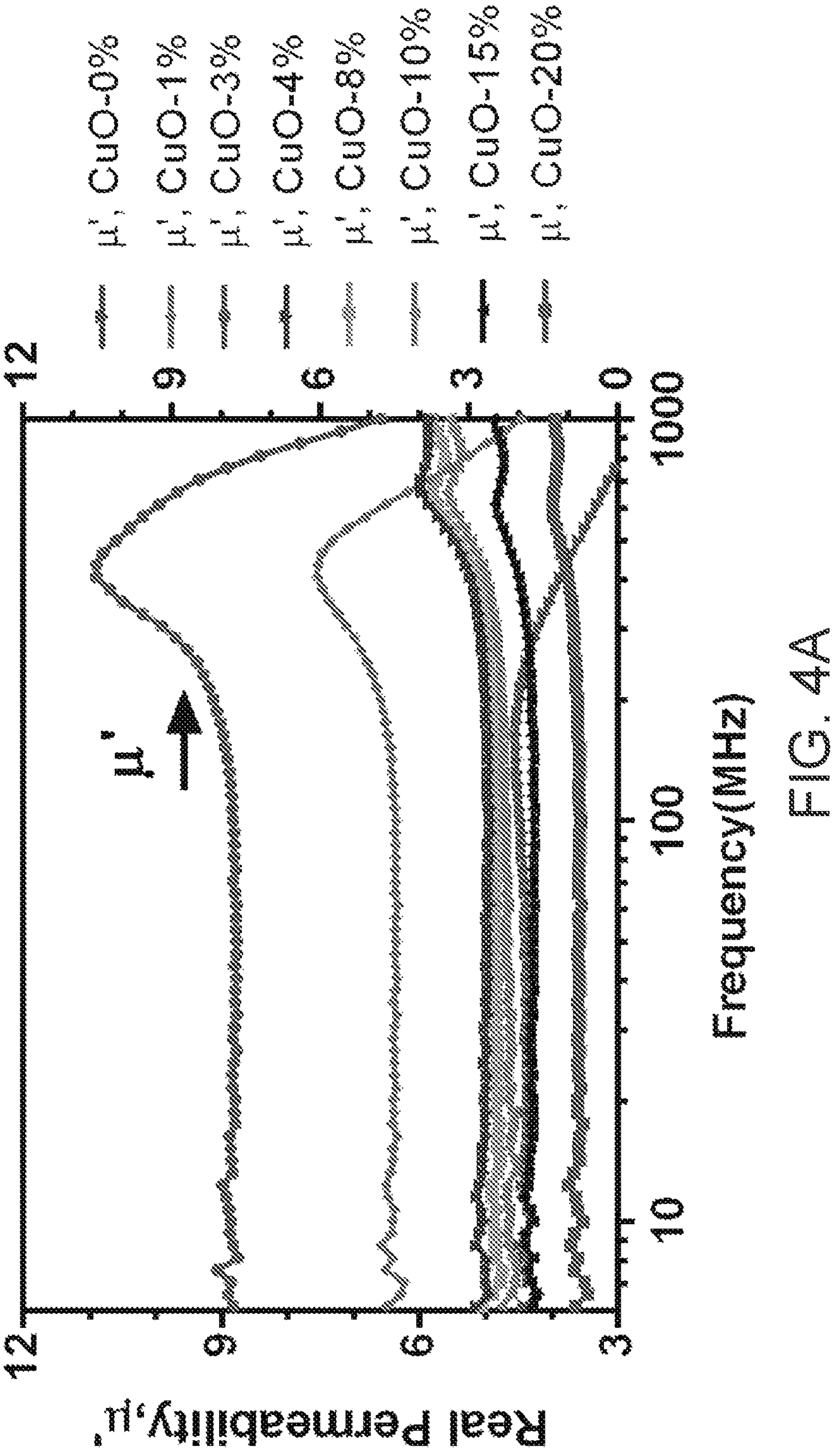
FIG. 4A shows measured real permeability spectra for CuO-substituted (CuO=0 wt. %, 1 wt. %, 3 wt. %, 4 wt. %, 8 wt. %, 10 wt. %, 15 wt. % and 20 wt. %) $Ni_{0.4}Co_{0.25}Zn_{0.35}Fe_2O_{4.1}$ ferrite toroidal samples versus frequency.
Figure 4B:
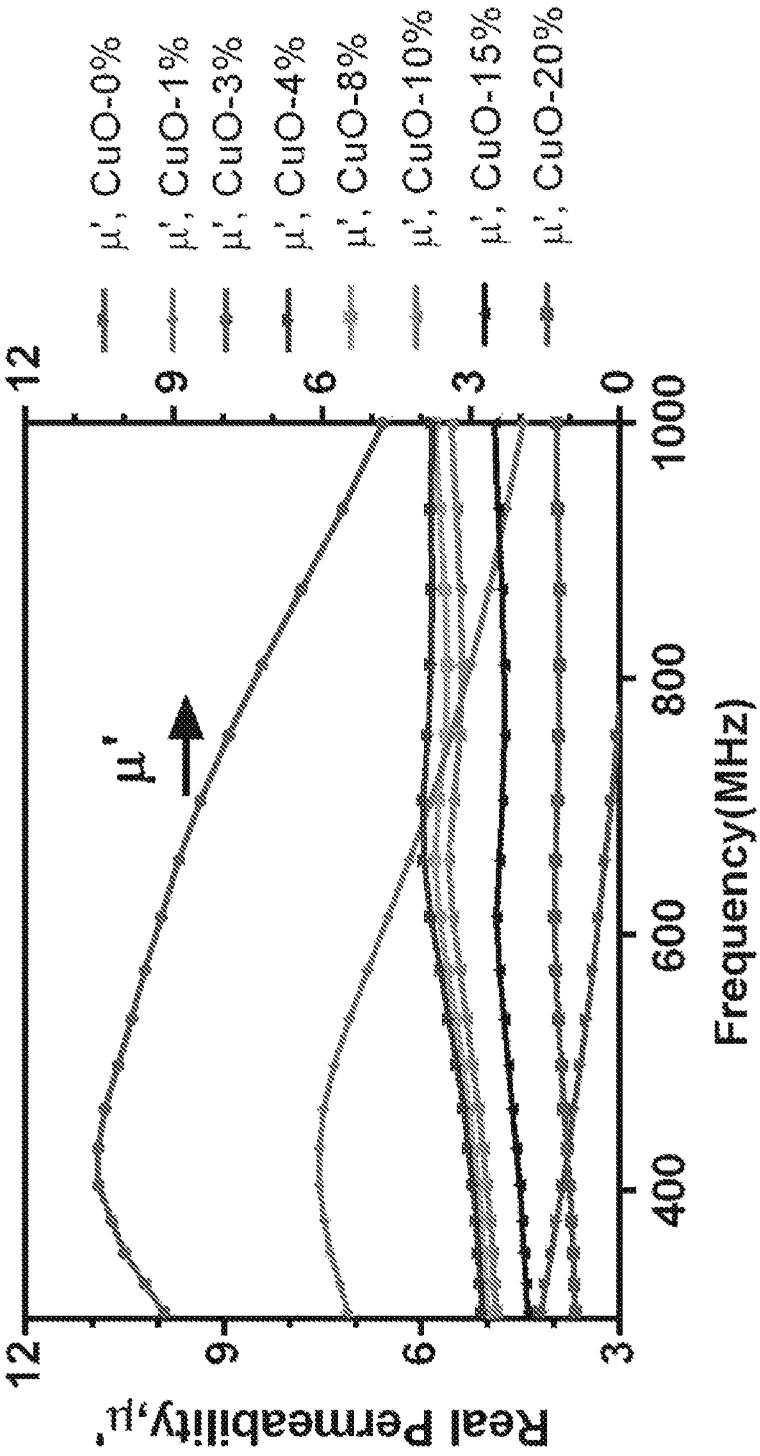
FIG. 4B is a detailed view of FIG. 4A over a narrower frequency range.

FIGS. 4A and 4B show measured real permeability spectra for CuO-substituted (CuO=0 wt. %, 1 wt. %, 3 wt. %, 4 wt. %, 8 wt. %, 10 wt. %, 15 wt. % and wt. %) $Ni_{0.4}Co_{0.25}Zn_{0.35}Fe_2O_{4.1}$ ferrite toroidal samples prepared according to this Example 1 versus frequency. The real part of permeability increases with increase in CuO concentration up to 3 weight % then again shows a drop in permeability above CuO=3 weight %.

Imaginary Permeability (μ") Measurement

Figure 5A:
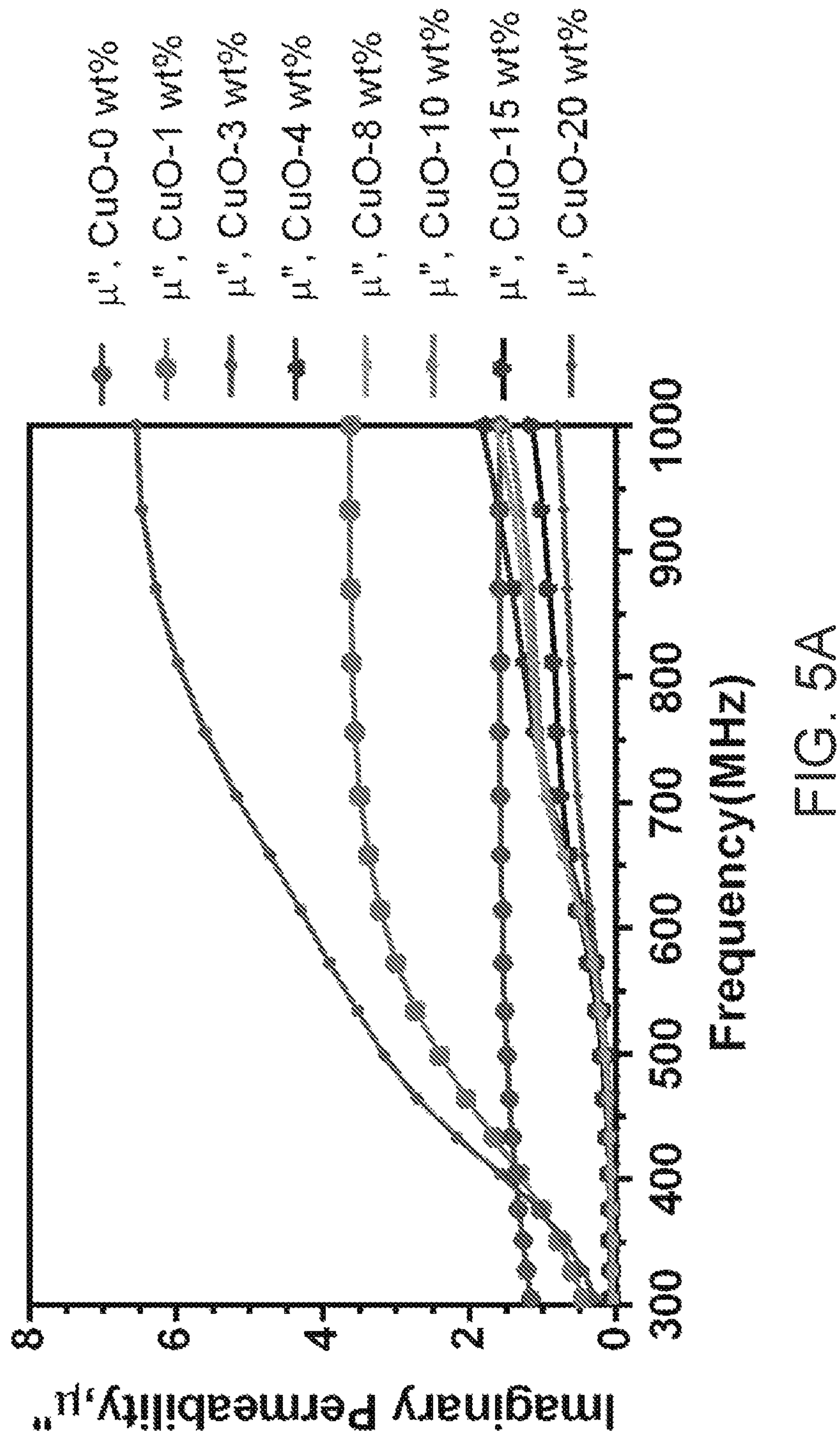
FIG. 5A shows measured imaginary permeability spectra for CuO-substituted (CuO=0 wt. %, 1 wt. %, 3 wt. %, 4 wt. %, 8 wt. %, 10 wt. %, 15 wt. % and wt. %) $Ni_{0.4}Co_{0.25}Zn_{0.35}Fe_2O_{4.1}$ ferrite toroidal samples versus frequency.
Figure 5B:
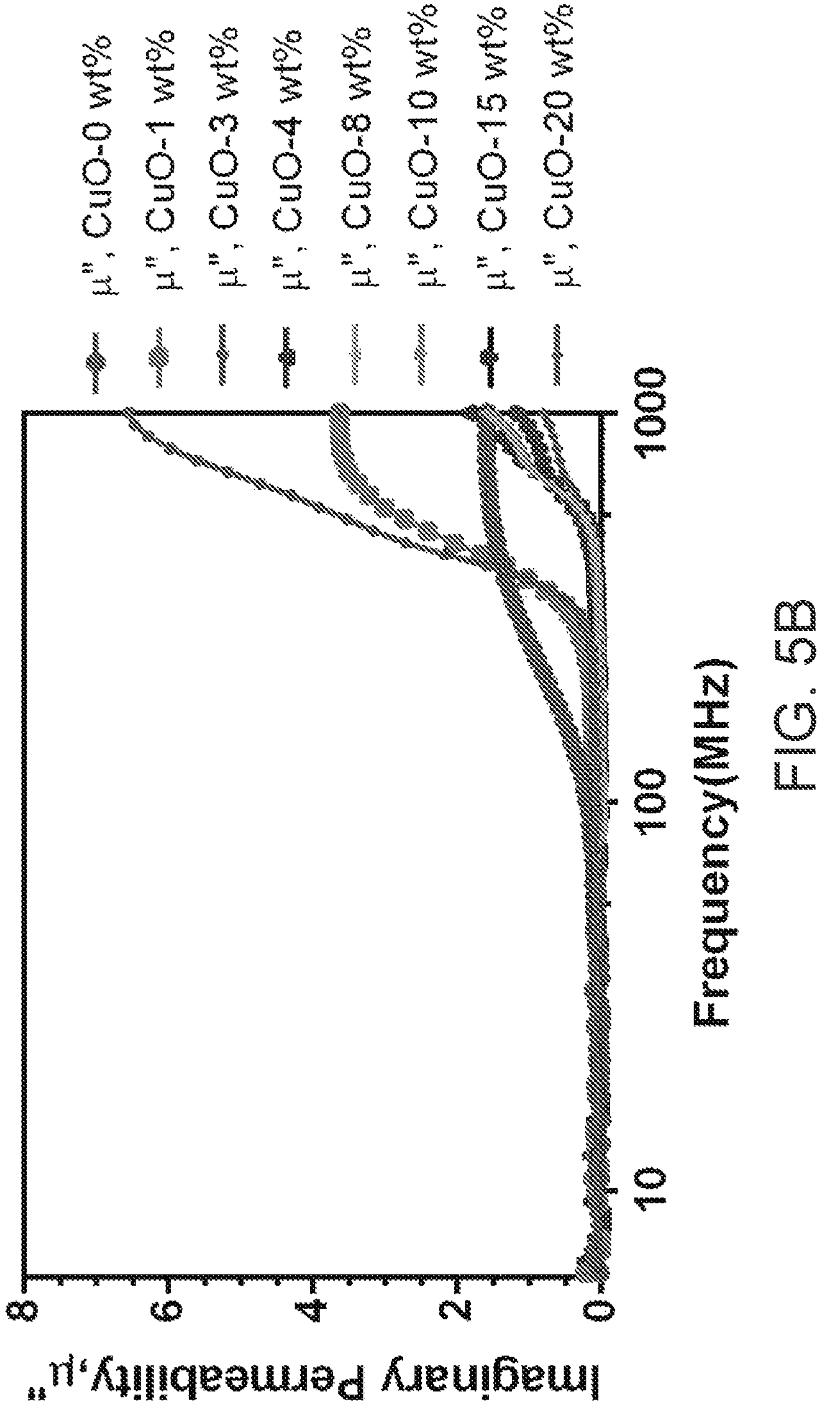
FIG. 5B is a detailed view of FIG. 5A over a narrower frequency range.

FIGS. 5A and 5B show measured imaginary permeability spectra for CuO-substituted (CuO=0 wt. %, 1 wt. %, 3 wt. %, 4 wt. %, 8 wt. %, 10 wt. %, 15 wt. % and 20 wt. %) $Ni_{0.4}Co_{0.25}Zn_{0.35}Fe_2O_{4.1}$ ferrite toroidal samples prepared according to this Example 1 versus frequency. The imaginary part of permeability increases with increase in CuO concentration up to 3 weight % then again shows a decrease in imaginary permeability at CuO=4 weight %.

Magnetic Loss Tangent (tan $\delta_\mu$) Measurement

Figure 6A:
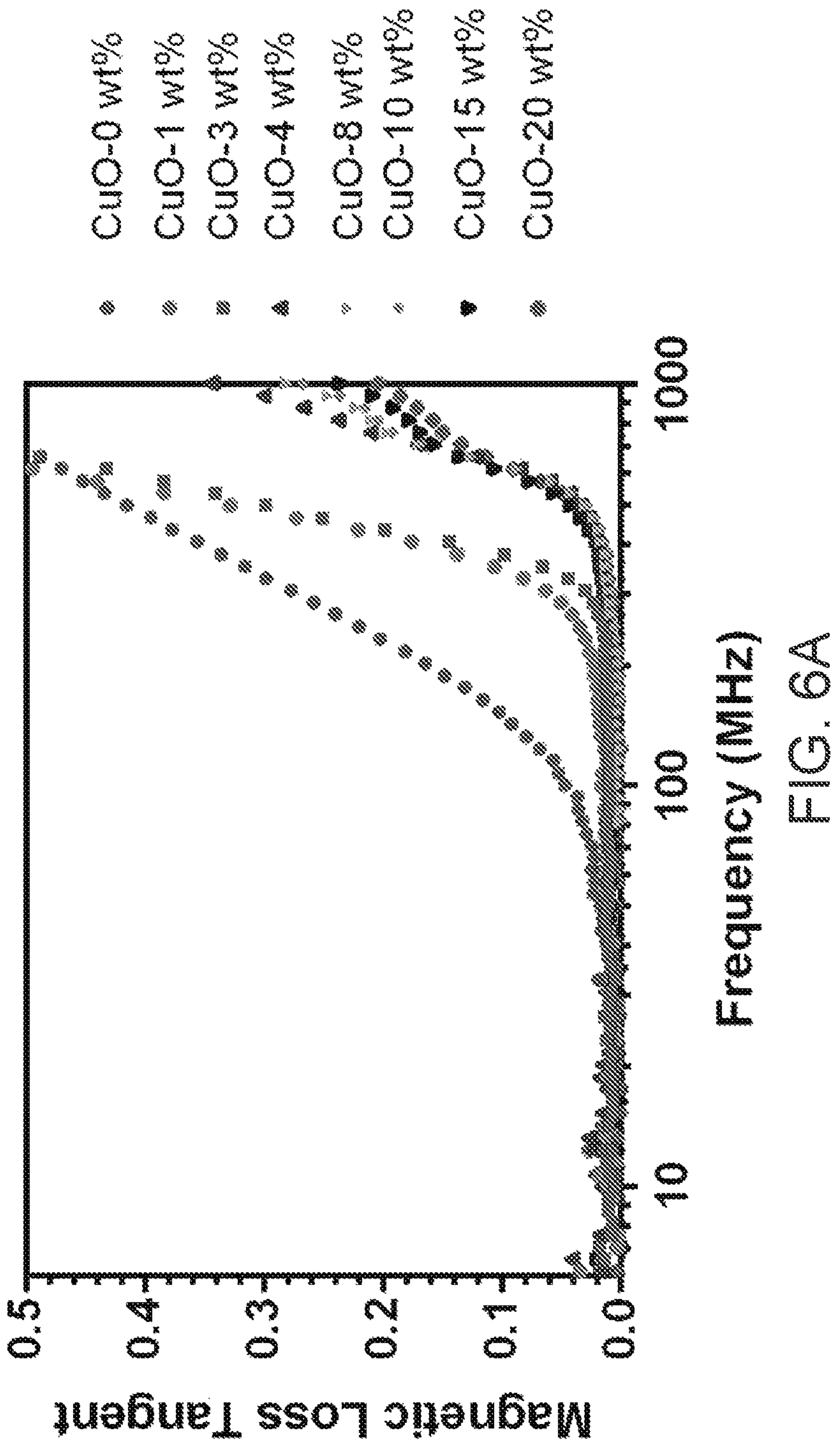
FIG. 6A shows measured magnetic loss tangent spectra for CuO-substituted (CuO=0 wt. %, 1 wt. %, 3 wt. %, 4 wt. %, 8 wt. %, 10 wt. %, 15 wt. % and wt. %) $Ni_{0.4}Co_{0.25}Zn_{0.35}Fe_2O_{4.1}$ ferrite toroidal samples versus frequency.
Figure 6B:
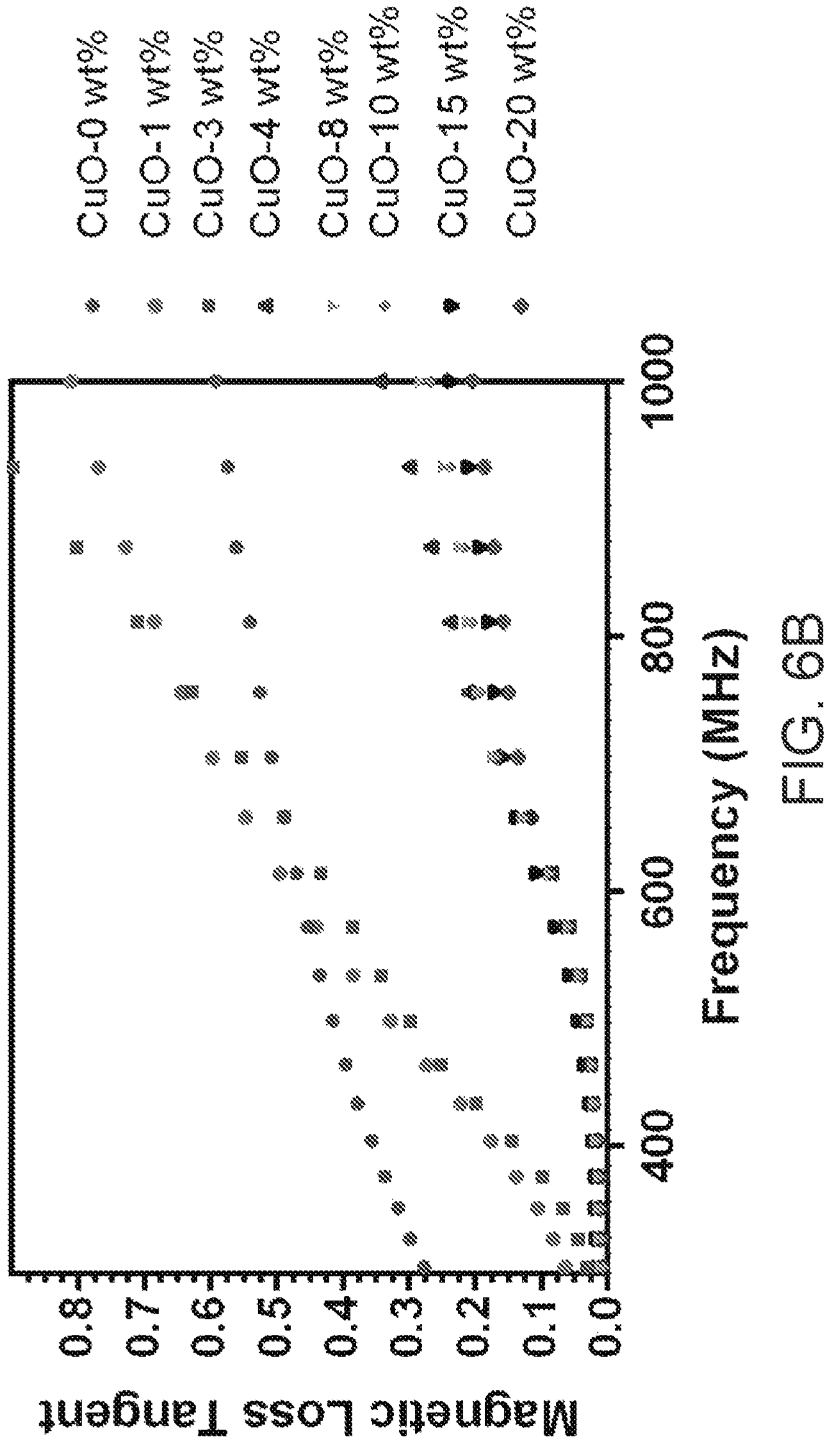
FIG. 6B is a detailed view of FIG. 6A over a narrower frequency range.

FIGS. 6A and 6B show measured magnetic loss tangent spectra for CuO-substituted (CuO=0 wt. %, 1 wt. %, 3 wt. %, 4 wt. %, 8 wt. %, 10 wt. %, 15 wt. % and 20 wt. %) $Ni_{0.4}Co_{0.25}Zn_{0.35}Fe_2O_{4.1}$ ferrite toroidal samples versus frequency. Magnetic loss tangent follows the imaginary curve, it increases with CuO concentration up to 3 weight % then again shows decrease above CuO=4 weight %.

Figure 7A:
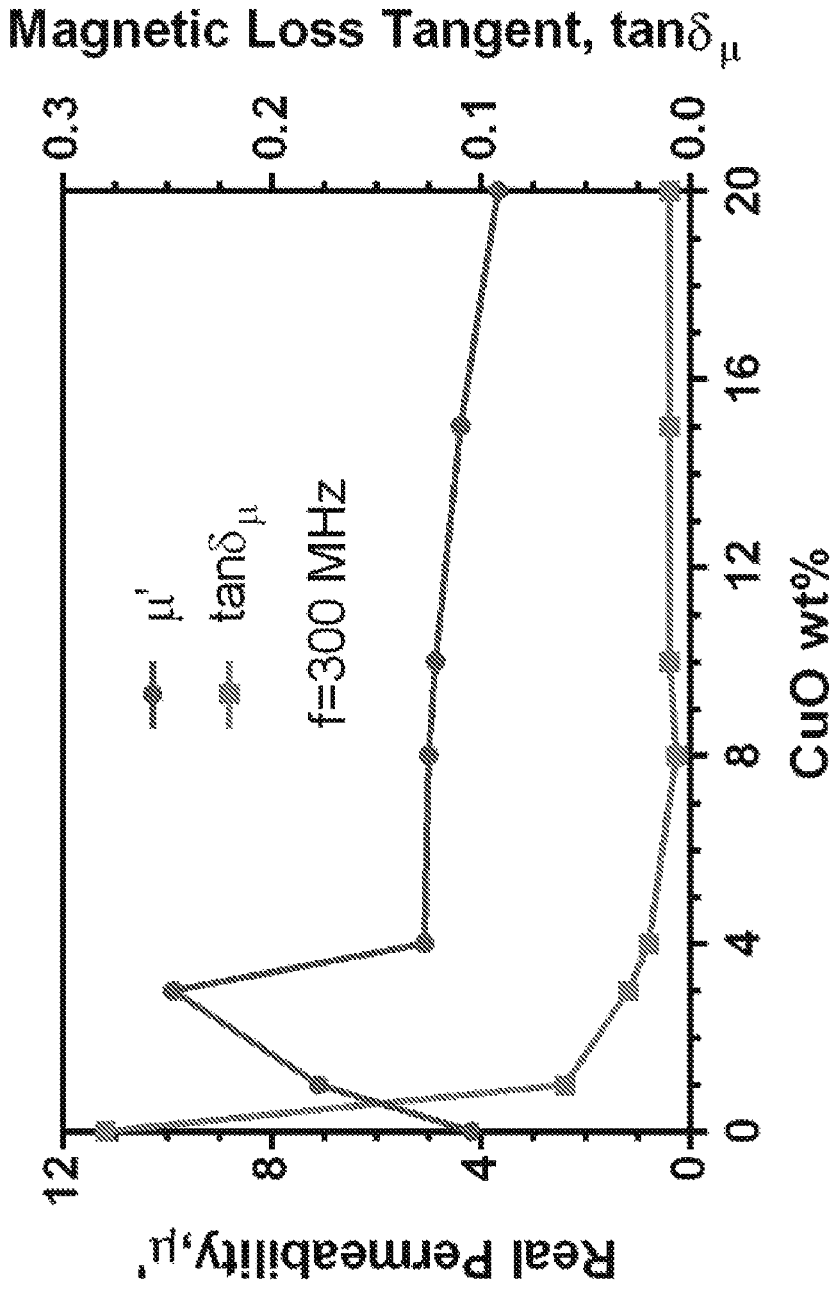
FIG. 7A shows measured real part of permeability and magnetic loss tangent for different CuO weight percentages at a frequency of 300 MHz.
Figure 7B:
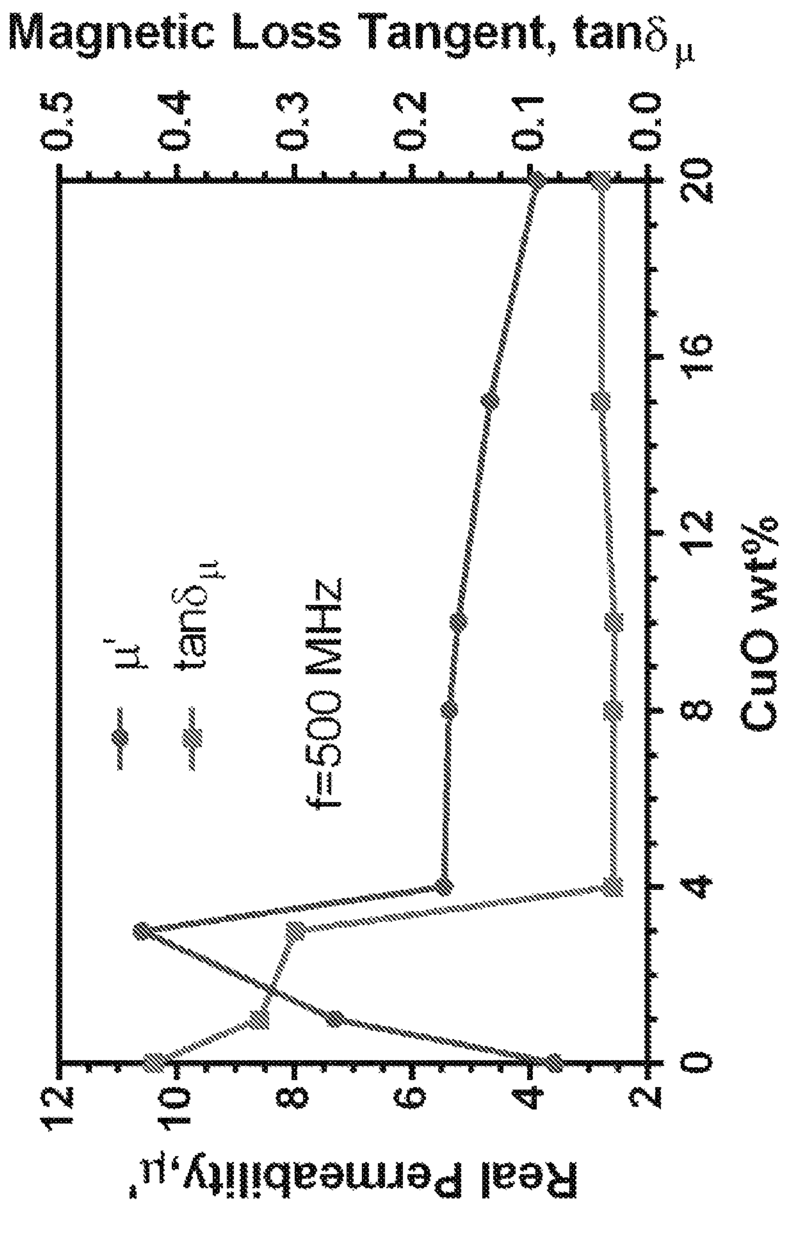
FIG. 7B shows measured real part of permeability and magnetic loss tangent for different CuO weight percentages at a frequency of 500 MHz.
Figure 7C:
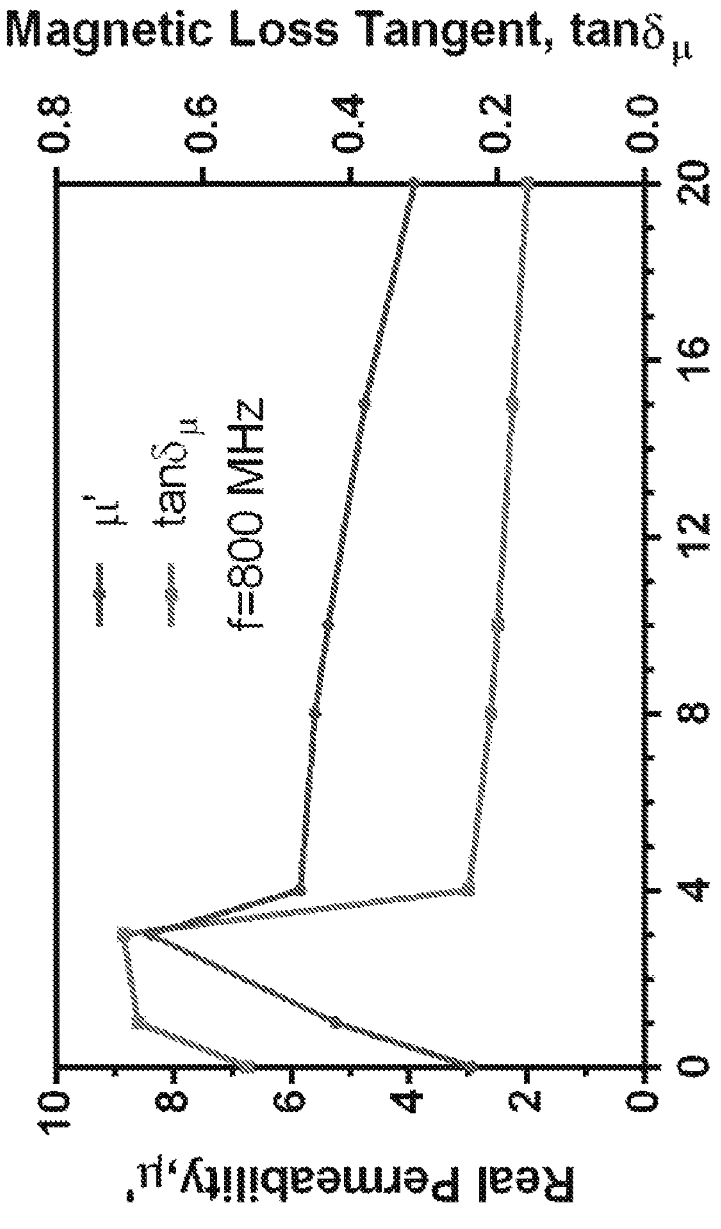
FIG. 7C shows measured real part of permeability and magnetic loss tangent for different CuO weight percentages at a frequency of 800 MHz.

Real Permeability and Magnetic Loss Tangent Measurement Versus CuO Weight Percent FIG. 7A shows measured real part of permeability and magnetic loss tangent for different CuO weight percentages prepared according to this Example 1 at a frequency of 300 MHz. Magnetic loss tangent decreases with increase in CuO concentration. FIG. 7B shows measured real part of permeability and magnetic loss tangent for different CuO weight percentages prepared according to this Example 1 at a frequency of 500 MHz. Magnetic loss tangent decreases with increase in CuO concentration. FIG. 7C shows measured real part of permeability and magnetic loss tangent for different CuO weight percentages prepared according to this Example 1 at a frequency of 800 MHz. Magnetic loss tangent decreases with increase in CuO concentration.

Figure 8A:
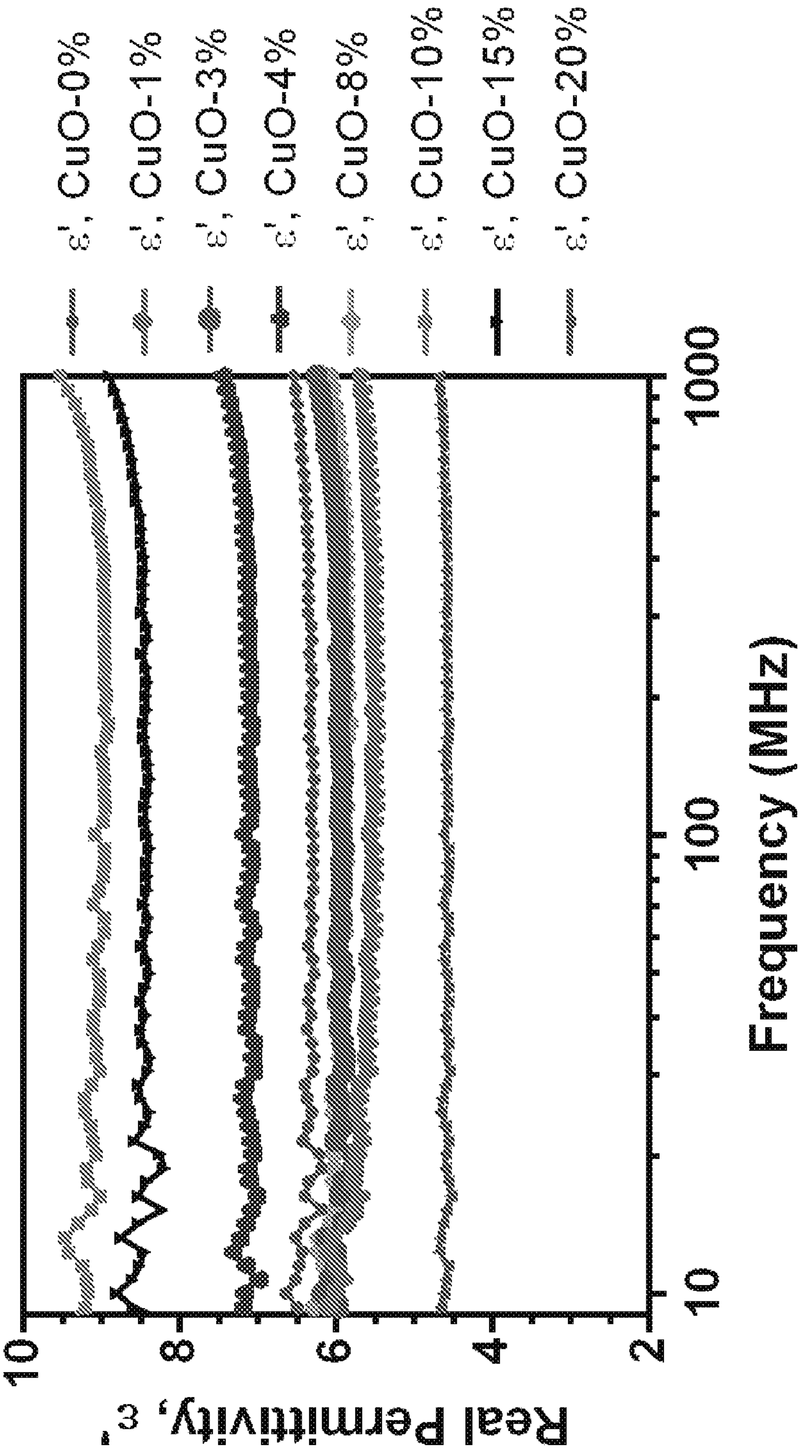
FIG. 8A shows measured real permittivity spectra for CuO-substituted (CuO=0 to 20 wt. %) $Ni_{0.4}Co_{0.25}Zn_{0.35}Fe_2O_{4.1}$ ferrite toroidal samples versus frequency.

Real Permittivity ($\varepsilon'$) and Dielectric Loss Tangent (Tan $\delta_\mu$) Measurement FIG. 8A shows measured real permittivity spectra for CuO-substituted (CuO=0 to 20 wt. %) $Ni_{0.4}Co_{0.25}Zn_{0.35}Fe_2O_{4.1}$ ferrite toroidal samples prepared according to this Example 1 versus frequency. Real part of permittivity first decreases with CuO doping up to 3 wt. % then increases with increase in CuO concentration. All values lie in the similar range as permeability from 4.5 to 9.5 for all CuO concentrations. These properties are desirable to achieve high impedance match, higher bandwidth and in miniaturization of bio medical antennas and other devices.

Figure 8B:
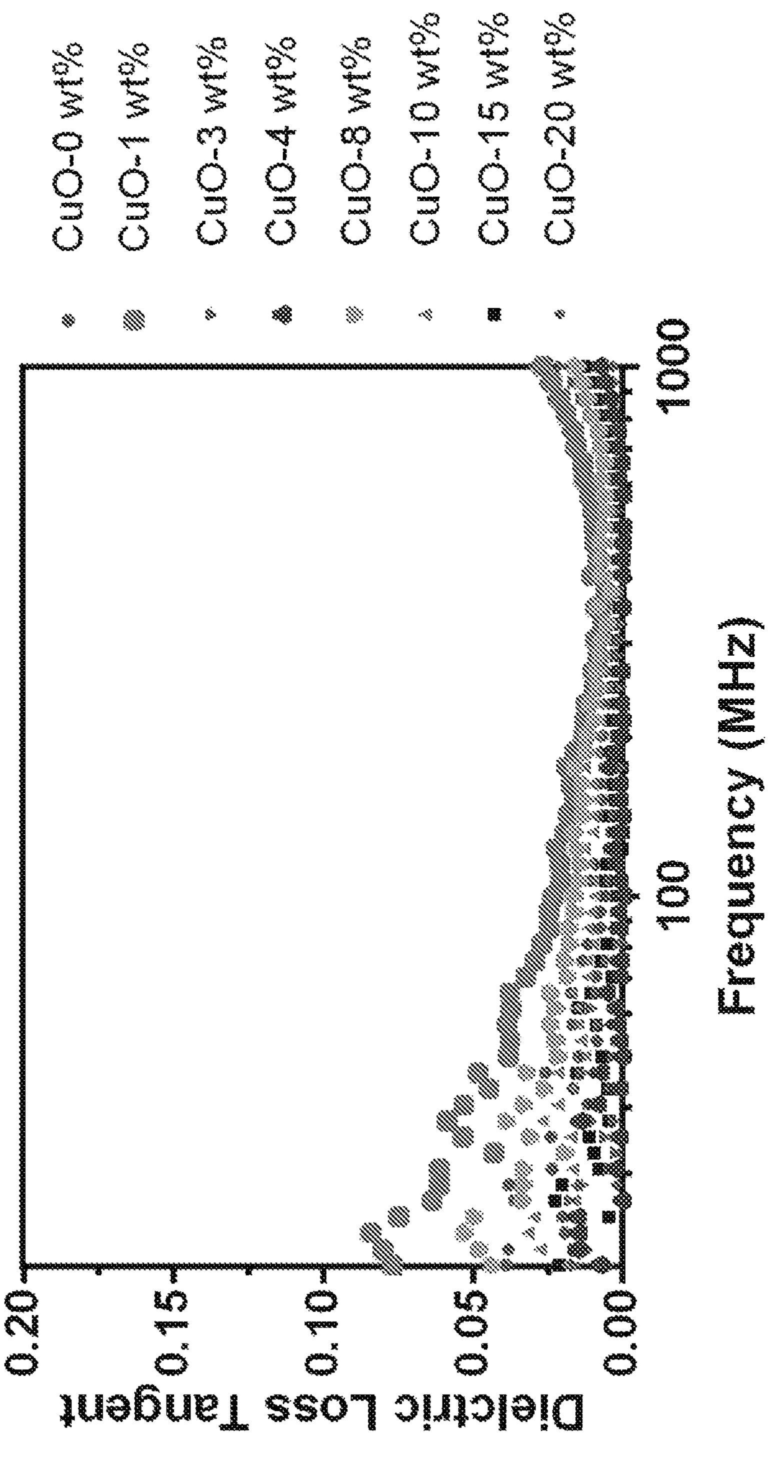
FIG. 8B shows measured dielectric loss tangent spectra for CuO-substituted (CuO=0 to 20 wt. %) $Ni_{0.4}Co_{0.25}Zn_{0.35}Fe_2O_{4.1}$ ferrite toroidal samples versus frequency.

FIG. 8B shows measured dielectric loss tangent spectra for CuO-substituted (CuO=0 to 20 wt. %) $Ni_{0.4}Co_{0.25}Zn_{0.35}Fe_2O_{4.1}$ ferrite toroidal samples prepared according to this Example 1 versus frequency. Dielectric loss tangent lies below 0.01 for all samples between 100 MHz to 1 GHz range. Low dielectric loss is required to achieve better performance of device.

Figure 9A:
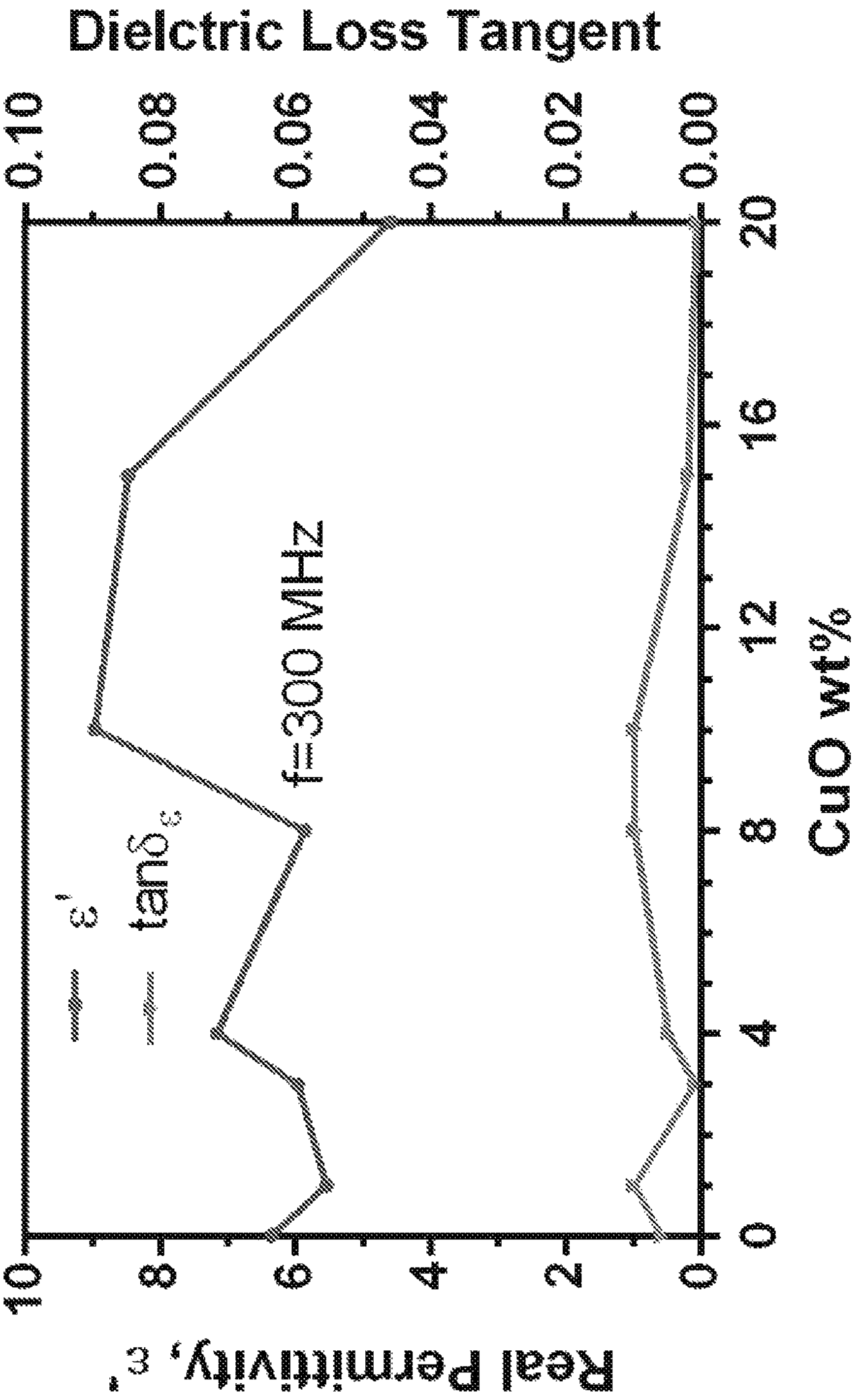
FIG. 9A shows measured real part of permittivity and dielectric loss tangent versus CuO weight percentages at a frequency of 300 MHz.

Real Permittivity and Dielectric Loss Tangent Measurement Versus CuO Weight Percent FIG. 9A shows measured real part of permittivity and dielectric loss tangent versus CuO weight percentages prepared according to this Example 1 at a frequency of 300 MHz. At lower CuO concentrations up to 3 wt. %, a low value of permittivity and high dielectric loss is observed. Above 3 wt. %, a high value of dielectric loss tangent with low dielectric loss is achieved (less than 0.01). Dielectric loss follows a similar pattern as magnetic loss tangent, i.e., gradually decreasing with increase in CuO concentration up to 20 wt. %.

Figure 9B:
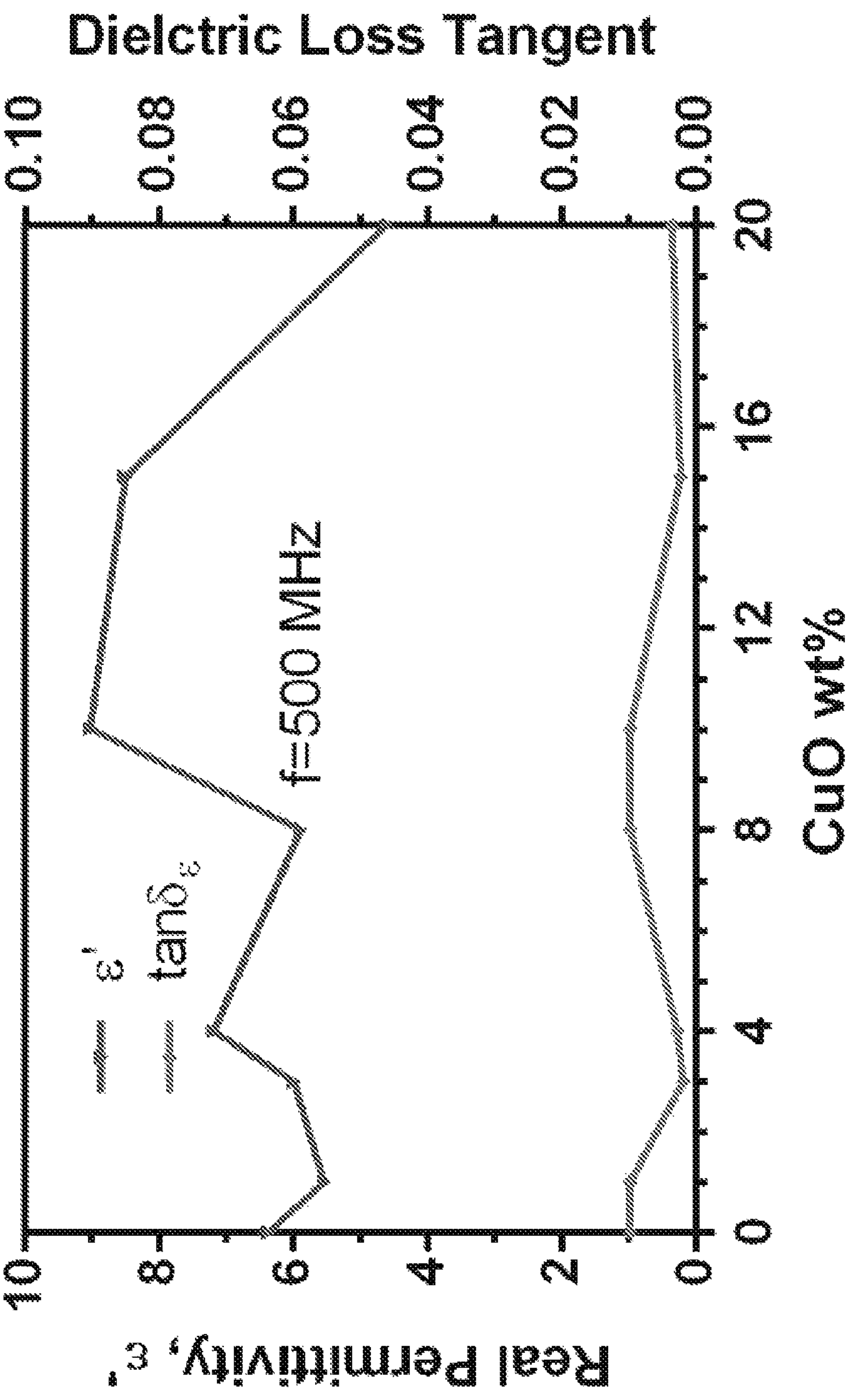
FIG. 9B shows measured real part of permittivity and dielectric loss tangent versus CuO weight percentages at a frequency of 500 MHz.

FIG. 9B shows measured real part of permittivity and dielectric loss tangent versus CuO weight percentages prepared according to this Example 1 at a frequency of 500 MHz. At lower CuO concentrations up to 3 wt. %, a low value of permittivity and high dielectric loss is observed. Above 3 wt. %, a high value of dielectric loss tangent with low dielectric loss is achieved (less than 0.01). Dielectric loss follows a similar pattern as magnetic loss tangent, i.e., gradually decreasing with increase in CuO concentration up to 20 wt. %.

Figure 9C:
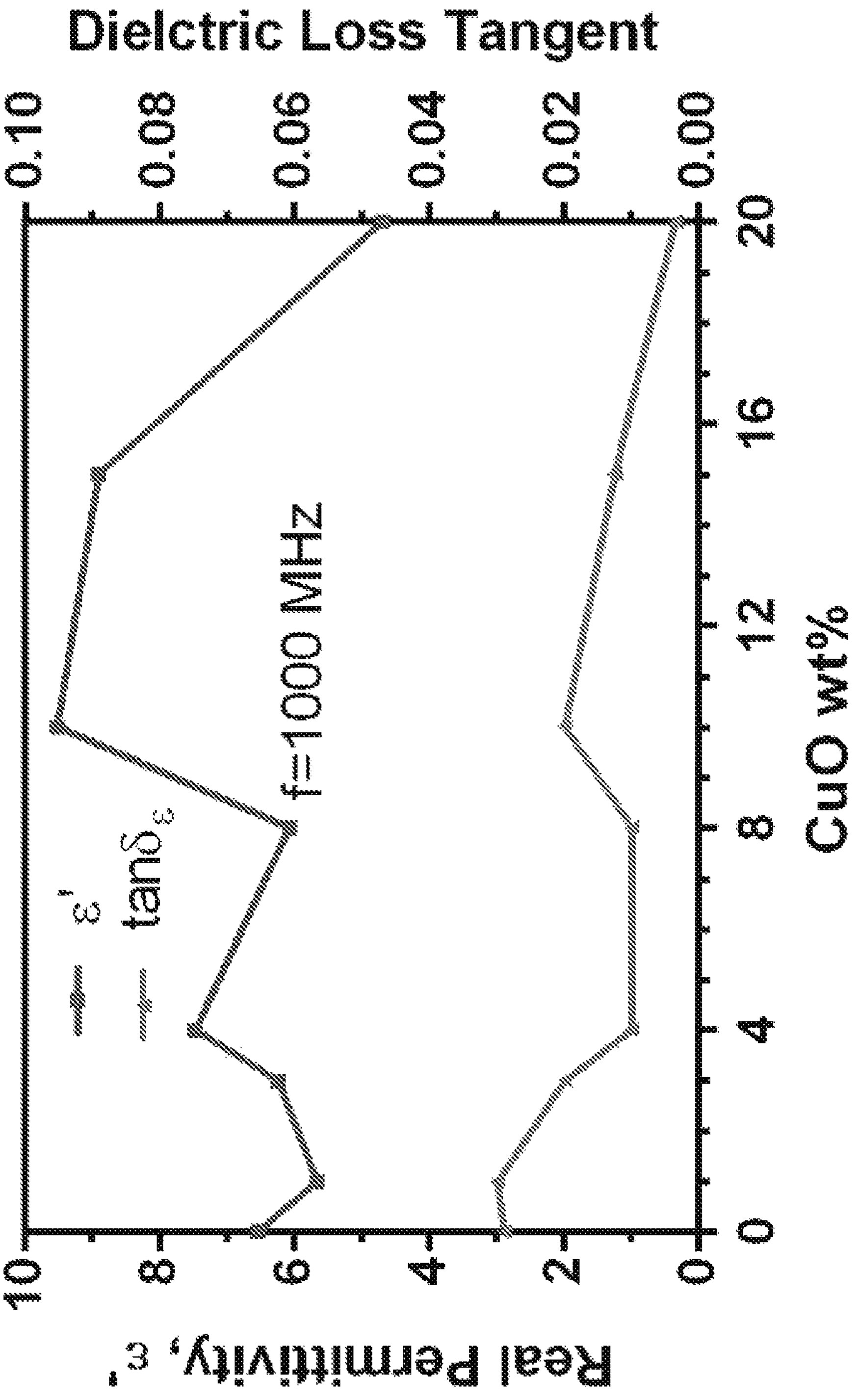
FIG. 9C shows measured real part of permittivity and dielectric loss tangent versus CuO weight percentages at a frequency of 1000 MHz.

FIG. 9C shows measured real part of permittivity and dielectric loss tangent versus CuO weight percentages prepared according to this Example 1 at a frequency of 1000 MHz. At lower CuO concentrations up to 3 wt. %, a low value of permittivity and high dielectric loss is observed. Above 3 wt. %, a high value of dielectric loss tangent with low dielectric loss is achieved (less than 0.01). Dielectric loss follows a similar pattern as magnetic loss tangent, i.e., gradually decreasing with increase in CuO concentration up to 20 wt. %.

Grain Size Analysis of $Ni_{0.40}Co_{0.25}Zn_{0.35}Fe_2O_{4.1}$ Ferrite

Table 1 below shows a grain size analysis of a CuO-substituted $Ni_{0.40}Co_{0.25}Zn_{0.35}Fe_2O_{4.1}$ ferrite prepared according to this Example 1. The average grain size was calculated by taking average of 50 random grain sizes from an obtained SEM image of the sample. From Table 1, it can be seen that grain size increases with increase in CuO weight %.

TABLE 1

| CuO weight % | Average grain size (μm) |
|---|---|
| 0 | 0.2-0.6 |
| 1 | 0.4-0.8 |
| 3 | 2-9 |
| 4 | 6-16 |
| 5 | 5-20 |
| 8 | 15-30 |
| 15 | 18-25 |
| 20 | 15-40 |

Table 2 below shows measured properties of a CuO-substituted $Ni_{0.40}Co_{0.25}Zn_{0.35}Fe_2O_{4.1}$ ferrite prepared according to this Example 1.

TABLE 2

| Sample CuO | μ' (300 MHz) | $\tan\delta_\mu = \mu''/\mu'$ (300 MHz) | Relative loss factor ($\tan\delta/\mu'$) |
|---|---|---|---|
| 0 wt. % | 4.2 | 0.28 | 0.066 |
| 1 wt. % | 7.12 | 0.06 | 0.008 |
| 3 wt. % | 9.91 | 0.030 | 0.003 |
| 4 wt. % | 5.09 | 0.02 | 0.003 |
| 8 wt. % | 5.01 | 0.007 | 0.001 |
| 10 wt. % | 4.88 | 0.010 | 0.002 |
| 15 wt. % | 4.41 | 0.01 | 0.002 |
| 20 wt. % | 3.68 | 0.01 | 0.0027 |

Table 3 below shows measured properties of a CuO-substituted $Ni_{0.40}Co_{0.25}Zn_{0.35}Fe_2O_{4.1}$ ferrite prepared according to this Example 1.

TABLE 3

| Sample CuO | μ' (500 MHz) | $\tan\delta_\mu = \mu''/\mu'$ (500 MHz) | Relative loss factor ($\tan\delta/\mu'$) |
|---|---|---|---|
| 0 wt. % | 3.6 | 0.42 | 0.116 |
| 1 wt. % | 7.33 | 0.33 | 0.045 |

TABLE 3-continued

| Sample CuO | μ' (500 MHz) | $\tan\delta_\mu = \mu''/\mu'$ (500 MHz) | Relative loss factor ($\tan\delta/\mu'$) |
|---|---|---|---|
| 3 wt. % | 10.6 | 0.3 | 0.028 |
| 4 wt. % | 5.47 | 0.03 | 0.005 |
| 8 wt. % | 5.38 | 0.03 | 0.005 |
| 10 wt. % | 5.23 | 0.03 | 0.006 |
| 15 wt. % | 4.69 | 0.04 | 0.008 |
| 20 wt. % | 3.89 | 0.04 | 0.01 |

Table 4 below shows measured properties of a CuO-substituted $Ni_{0.40}Co_{0.25}Zn_{0.35}Fe_2O_{4.1}$ ferrite prepared according to this Example 1.

TABLE 4

| Sample CuO | μ' (800 MHz) | $\tan\delta_\mu = \mu''/\mu'$ (800 MHz) | Relative loss factor ($\tan\delta/\mu'$) |
|---|---|---|---|
| 0 wt. % | 2.95 | 0.54 | 0.183 |
| 1 wt. % | 5.26 | 0.69 | 0.131 |
| 3 wt. % | 8.42 | 0.70 | 0.080 |
| 4 wt. % | 5.86 | 0.24 | 0.041 |
| 8 wt. % | 5.61 | 0.21 | 0.037 |
| 10 wt. % | 5.39 | 0.20 | 0.037 |
| 15 wt. % | 4.76 | 0.18 | 0.037 |
| 20 wt. % | 3.92 | 0.16 | 0.040 |

Table 5 below shows measured properties of CuO-substituted $Ni_{0.40}Co_{0.25}Zn_{0.35}Fe_2O_{4.1}$ ferrite samples prepared according to this Example 1.

TABLE 5

| Sample CuO | μ' | $\tan\delta_\mu = \mu''/\mu'$ | Relative loss factor |
|---|---|---|---|
| 3 wt. % | 10.6 @ 500 MHz | 0.3 | 0.028 |
| 4 wt. % | 6.24 @ 870 MHz | 0.21 | 0.033 |
| 15 wt. % | 4.71 @ 750 MHz | 0.17 | 0.037 |

This Example 1 investigated the effect of Cu-substitution on the complex permeability spectra of the Ni—Co—Zn ferrites. Along with the gradual increase of the Cu-substitution, the real part of permeability at the target operation frequency of 500 MHz initially decreases from 10.6 (CuO=3 wt. %) to 5.23 (CuO=10 wt. %), and then decreases to 6.15 (CuO=12 wt. %) for $Ni_{0.4}Co_{0.25}Zn_{0.35}Fe_2O_{4.1}$ samples. These newly developed CuO-doped Ni—Co—Zn ferrite materials have shown a great promise for RF and microwave devices, bio medical implants and unmanned aerial vehicles by following the processing strategy reported herein.

Example 2

Overview of Example 2

Novel soft magnetic ferrite materials will play a crucial role in next-generation trillion-dollar sensor technologies related to 5G communications and internet of things as these materials can achieve improved wireless power/signal transfer efficiency with high operation frequency. In this Example 2, $Ni_{0.4}Co_{0.25}Zn_{0.35}Fe_2O_4$ ferrites with high permeability and low magnetic loss were prepared for RF and microwave device applications. Composition and microstructure control is crucial to obtain the desired magnetic and loss properties. CuO dopant (x=0 wt. % to 20 wt. %) were employed during the synthesis of $Ni_{0.4}Co_{0.25}Zn_{0.35}Fe_2O_4$ ferrite specimens to modify the microstructures, thus improving the magnetic properties of the ferrites. High value of measured relative permeability (μ' of 4-10) and relatively low magnetic loss tangent (tan $\delta_\mu$ of 0.01-0.1) has been achieved at frequency range between 100 MHz and 800 MHz. Addition of CuO, especially up to 3 wt. %, can cause a significant increase in permeability. Real part of the permeability of 3.87 and 10.9 has been achieved for undoped and 3 wt. % CuO doped specimens, while noticeable reduction in magnetic losses has been observed for the doped sample measured at 400 MHz. The resonance frequency of synthesized ferrites has also been shifted into GHz range, when higher concentration of CuO dopants (>5 wt. %) were employed.

1. Introduction to Example 2

In the latest developments of modern wireless communication and information technology, there is growing demand for soft magnetic materials, which can offer high working frequencies along with tailored magnetic, dielectric and loss properties. Polycrystalline ferrite ceramics have been utilized in a wide range of applications such as electronic devices, RF and microwave communications, electromagnetic shielding, magnetic recording, and so on for a few decades [Ref. 1, 2]. One of the most important soft magnetic materials is Ni—Co—Zn spinel ferrite, as it exhibits high permeability, low magnetic losses, chemical stability and high resistivity in the high frequency region well beyond 1 MHz [Ref. 3]. In recent years, research has been focused on increasing the magnetic permeability, while reducing the losses and shifting the resonance frequency of these soft magnetic ferrites for operation at GHz frequencies [Ref. 4]. To utilize these ferrites in practical applications, the requirements of the magnetic and dielectric properties is diverse. Each device has different requirement of permeability and permittivity over different frequency range [Ref. 5, 6]. With growing demand in devices, high values of permeability and permittivity together with low losses at higher frequencies are desired. Magnetic properties of ferrites such, as permeability and magnetic loss tangent, are highly sensitive to composition, grain size, density, type and quantity of additives, sintering conditions, and other synthesis/processing parameters. It is well established that a high sintered density, a large average grain size, a low porosity, and a stress-free grain boundary are the key governing microstructural parameters to achieve high permeabilities and low losses [Ref. 7]. This was attributed to the fact that the complex permeability spectra is described by two different mechanisms, which are domain wall motion and spin rotation [Ref. 8]. Domain wall motion is sensitive to both microstructure and sintered density of the ferrites in lower frequency range, while spin rotation contributes to the response at frequencies over 100 MHz and depends only on post-sintering density of the polycrystalline ferrites. Also, in these ferrites, natural resonance exists due to effective anisotropy field, which results in magnetic losses [Ref. 9, 10]. This restricts the utilization of these ferrites in radiofrequency devices known as the Snoek's limit, that is defined by equation 1. [Ref. 11]

$$(\mu_i - 1) f_0 = \text{Constant} \quad (1)$$

Where, $\mu_i$ is initial permeability and $f_0$ is resonance frequency. Various researches have been conducted for improving magnetic properties and raising of resonance frequency on spinel ferrites and hexaferrites using different dopants such as Cu substituted Ni—Zn ferrite [Ref. 12, 13, 14], Ca and Cao—$SiO_2$ doped Ni—Co—Zn [Ref. 15], Y and La doped Ni—Co—Zn ferrite [Ref. 16], Co—Ti substituted M-type barium hexaferrite [Ref. 17], Ir, $ZnAl_2O_4$, Ca and glass ($SiO_2$—$B_2O_3$) doped $Co_2Z$ hexaferrite [Ref. 18, 19 20], and so on at radio frequency region. Ni—Co—Zn composition was chosen as cobalt oxide in spinel lattice of Ni—Zn helps in reducing core loss and contributes to the enhancement of the magneto crystalline anisotropy, thereby achieving better dynamic magnetic properties [Ref. 21]. It is hypothesized that migration of cobalt ions in spinel lattice stabilizes the magnetics domain walls because of induced anisotropy. Copper oxide acts as sintering aid to lower the sintering temperature, thus promoting the grain growth and densify the microstructure [Ref. 14]. There is no prior report on copper oxide (CuO) doped Ni—Co—Zn ferrite. Previous studies showed that the addition of copper oxide in Ni—Zn ferrites could tune the magnetic properties, hence permeability and magnetic losses can be tailored [Ref. 21]. It is noteworthy that, in Ni—Co—Zn spinel structure, both $Co^{2+}$ ions and $Ni^{2+}$ ions have inverse spinel, which prefer B lattice (octahedral site) while $Zn^{2+}$ ions are a normal spinel and prefers A lattice (tetrahedral site) [Ref. 22]. As $Cu^{2+}$ ions preferably reside at B site, doping the Ni—Co—Zn spinel ferrite by using CuO, it can replace both $Ni^{2+}$ and $Co^{2+}$ depending upon the amount of the CuO.

In this Example 2, we introduced CuO as dopant into Ni—Co—Zn polycrystalline ferrites by adding CuO after the crystalline structure was formed by solid-state ceramic synthesis process. Subsequently, the effect of CuO concentration upon complex permeability and permittivity spectra as well as losses over 1 MHz to 1 GHz frequency range has been carefully studied. The effect of CuO concentration on phase composition and microstructure have also been systematically studied and correlated with dynamic magnetic and dielectric properties.

2. Experimental Procedure

The $Ni_{0.4}Co_{0.25}Zn_{0.35}Fe_2O_4$ ferrite powders were synthesized using conventional solid-state synthesis method. Commercially available analytical grade oxides were used. Stoichiometric amounts of oxides, including NiO, ZnO, $Co_2O_3$ and $Fe_2O_3$ (phase purities>99%), were weighed according to the composition. All the powders were mixed by using a Retsch planetary ball milling tool for 6 hours along with deionized (DI) water. Thereafter, drying was done on a hot plate at 100° C. for 1 hour. The dried powders were calcined at 950° C. for 2 hours at a ramp rate of 10° C. per minute. The calcinated powders were then divided into 8 portions, which were doped with 0.2 wt. % of $Bi_2O_3$ and x wt. % of CuO (x is varied between 0 wt. % and 20 wt. %), respectively. Addition of $Bi_2O_3$ was used during synthesis process to promote uniform grain growth which facilitates densification and improves the magnetic properties [Ref. 7]. These samples were subsequently dry milled at 560 rpm for 2 hours. The resultant fine powders were then granulated along with 5 wt. % Polyvinyl Alcohol (PVA) binder to prepare toroidal test specimens of an outer diameter of 8 mm, an inner diameter of 3.1 mm, and a height of 3 mm. All the toroidal samples doped with CuO were sintered for 2 hours under an ambient air atmosphere at 1100° C. Complex permeability measurements were done on the resulted toroidal samples. For complex permittivity measurements, disc shaped samples of a thickness 3 mm and a diameter 15 mm were pressed along with PVA binder and sintered at 1100° C. for 2 hours [Ref. 23].

The phase composition of doped and sintered toroids was analyzed by X-ray θ-2θ diffraction (XRD) at room temperature using Cu-$K_\alpha$. radiation (λ=0.1542 nm). The grain size and grain morphology of the sintered toroidal samples were examined by scanning electron microscopy (Hitachi S800 SEM, Krefeld, Germany). Grain sizes distribution were analyzed using ImageJ software with a sample area consists of 50 grains. The complex permeability and permittivity spectra of ferrite samples between 1 MHz and 1 GHz was measured by a RF impedance/material analyzer (E4991A, Keysight, CA, USA) using a magnetic material test fixture (Keysight 16454A, CA, USA) and dielectric test fixture (Keysight 16453A, CA, USA), respectively. Bulk densities of the sintered specimens were determined by Archimedes principle. The porosity percentage was calculated for all $Ni_{0.4}Co_{0.25}Zn_{0.35}Fe_2O_4$ samples sintered at 1100° C. for 2 hours according to the equation 2.

$$P\ \% = 100\left(1 - \frac{d_{x\text{-}ray}}{d_{Bulk}}\right)\% \quad (2)$$

where, $d_{X\text{-}ray}$ is the theoretical X-ray density and $d_{Bulk}$ is bulk density.

3. Results and Discussion

3.1. Phase and Microstructure Characterization

Figure 10A:
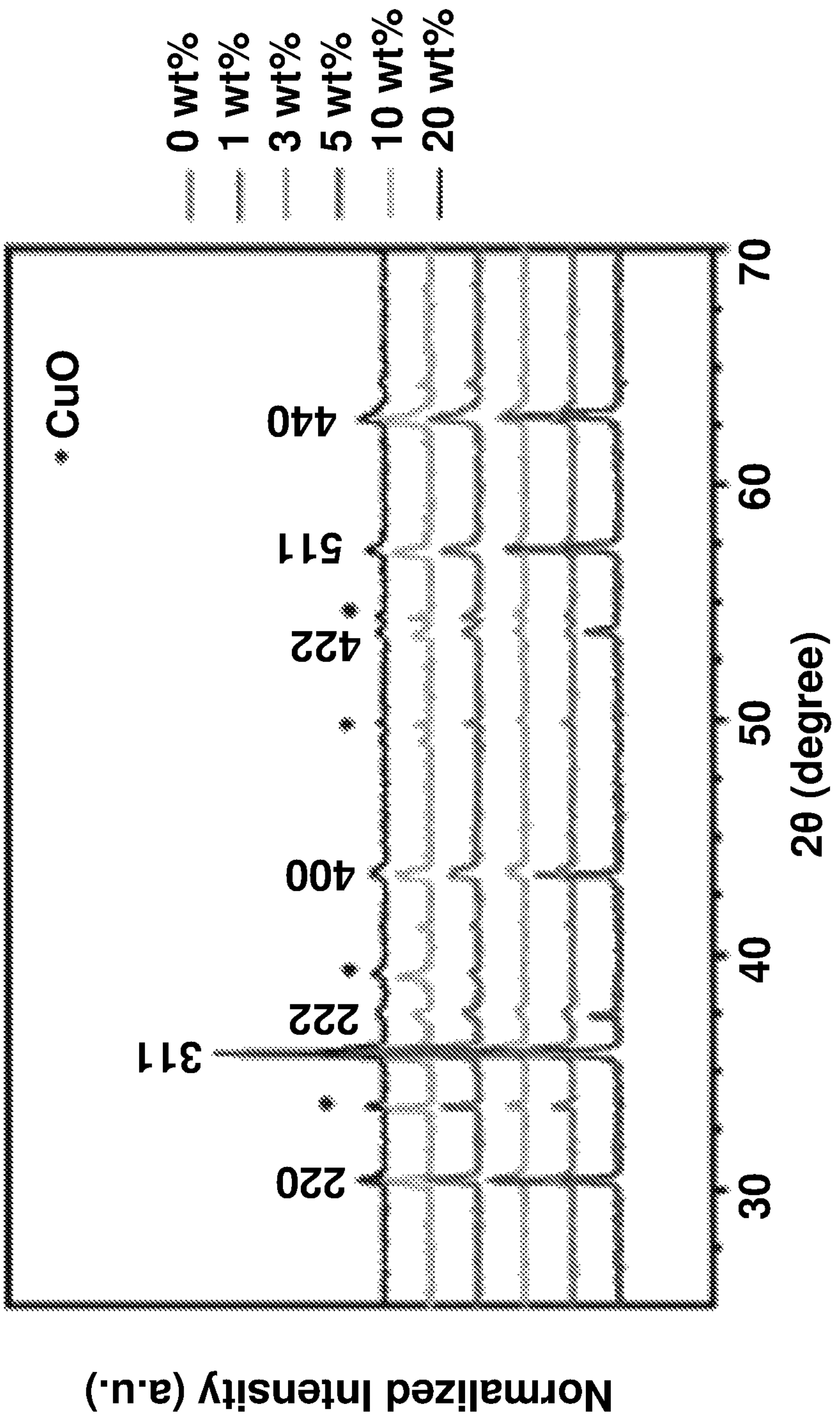
FIG. 10A shows XRD patterns of CuO (x=0, 1, 3 5, 10 and 20 wt. %) doped $Ni_{0.4}Co_{0.25}Zn_{0.35}Fe_2O_4$ ferrite ceramics. All samples were sintered at 1100° C. for 2 hours.
Figure 10B:
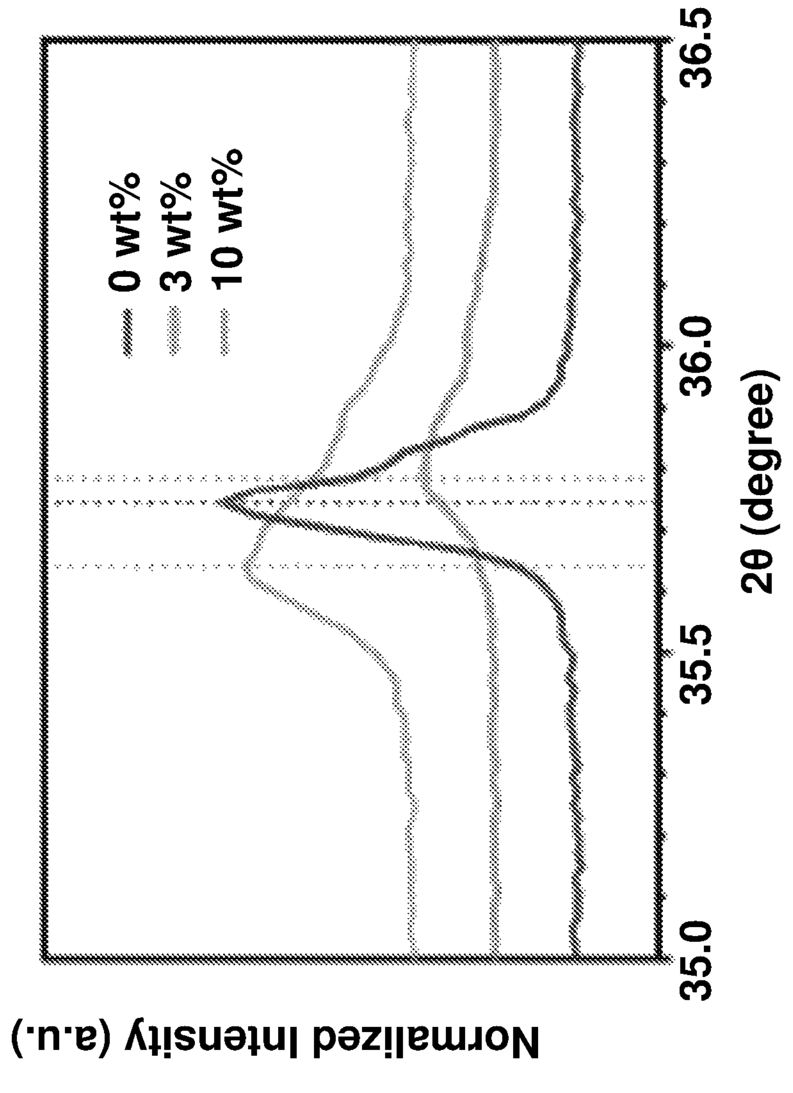
FIG. 10B shows zoomed XRD at (311) crystal plane for samples doped at 3 different weight percentages. Part B is a representative of observed peak shift phenomenon in response to CuO doping level. All samples were sintered at 1100° C. for 2 hours.
Figure 11A:
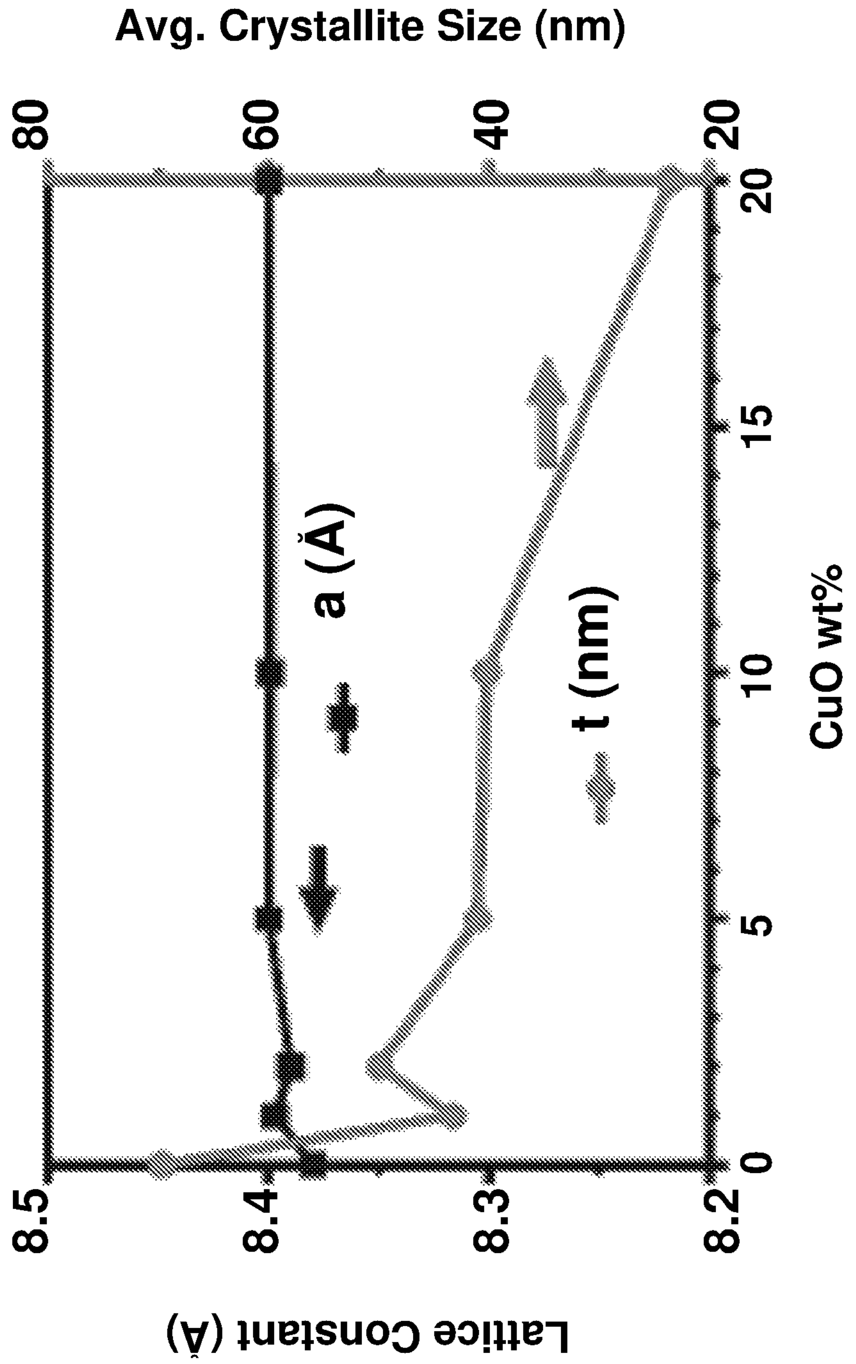
FIG. 11A shows variation of lattice constant and average crystallite size in response to varied CuO concentrations.

The XRD patterns of the CuO (x=0 wt. % to 20 wt. %) doped $Ni_{0.4}Co_{0.25}Zn_{0.35}Fe_2O_4$ ferrite powders are shown in FIGS. 10A and 10B. The sharp and high-intensity peaks in the XRD indicates the formation of single-phase spinel structure and all the peaks are indexed with the (JCPDS Card 00-08-0234). Extra peaks of CuO and $Fe_2O_3$ appeared in the XRD patterns of Ni—Co—Zn ferrite for x>3% of relatively small intensities. All compositions exhibited maximum intensity at (311) and other strong diffraction peaks corresponds to (111), (220), (311), (222), (422), (511) and (440) hkl planes. Lattice parameters are shown in Table 6 for all the compositions of varied CuO dopants. The lattice constant (a) in cubic crystal lattice was calculated using the following equation 3 [Ref. 24].

$$a = d\sqrt{h^2 + k^2 + l^2} \quad (3)$$

where d is the interplanar spacing and hkl are the Miller indices. The value of lattice constant matches with as reported values in the literature for Ni—Co—Zn ferrites, which varies with the level of added CuO dopants. The lattice constant first increases with CuO doping concentration up to 3 wt. % and then slightly decreases at higher doping percentage greater than 3 wt. % as shown in FIG. 11A. This can be attributed to difference in ionic radii of copper (0.73 Å), nickel (0.69 Å) and cobalt (0.745 Å) ions [Ref. 25]. This initial variation in lattice constant can be attributed to the fact that, $Cu^{2+}$ ions are known to have tendency to replace both $Ni^{2+}$ and $Co^{2+}$ ions since they both reside at octahedral B site in the structure [Ref. 12]. Based on their ionic radii $Cu^{2+}$ (0.73 Å), $Ni^{2+}$ (0.72 Å) and Co 2+(0.74 Å), it has been observed that at lower CuO doping level, $Cu^{2+}$ would replace both $Ni^{2+}$ and $Co^{2+}$ ions without any specific preference that leads to variations in the lattice constant, depending on which ion $Cu^{2+}$ replaces. It is well known that, lattice expands or shrink dependent upon radius of doped ions ($Cu^{2+}$) [Ref. 24, 25, 26]. Our observations are consistent with the reported prior works which shows increase in lattice constant at lower concentrations, inferring the substitution of $Cu^{2+}$ ions to both $Ni^{2+}$ and $Co^{2+}$ ions in the structure [Ref. 25]. As the amount of copper ions increases in the composition, there was a slight decrease in lattice constant after x>3 wt. %, which may be attributed to segregation of excess copper ions at the grain boundaries [Ref. 27, 28]. Also, there is a possibility of migration of copper ions to A site rather than B site due to excess amount of copper ions. The average crystallite size was calculated using Scherrer formula given by equation 4.

$$D = \frac{k\lambda}{\beta\cos\theta} \quad (4)$$

where k is a constant, λ is X-ray wavelength, β is full width half maximum and e is diffraction angle. As shown in FIG. 11A, the calculated crystal size decreases with amount of CuO dopants from 69.76 nm (x=0 wt. %) to 30.06 nm (x=20 wt. %). Furthermore, the diffraction angle of peaks of CuO doped Ni—Co—Zn ferrite shifted with the CuO doping as compared to undoped samples as shown in FIGS. 10A &10B. This is related to the substitution of copper ions in the cubic lattice as diameter of Cu, Ni and Co ions are different, the peaks shift according to the ionic radii of each element [Ref. 24]. The theoretical X-ray density was calculated using the following equation 5.

$$d_{X-ray} = \frac{nM_V}{N_A V} \quad (5)$$

where, n is number of moles per unit volume, $M_V$ is molecular weight of sample, $N_A$ is Avogadro number and V is volume of sample.

Figure 11B:
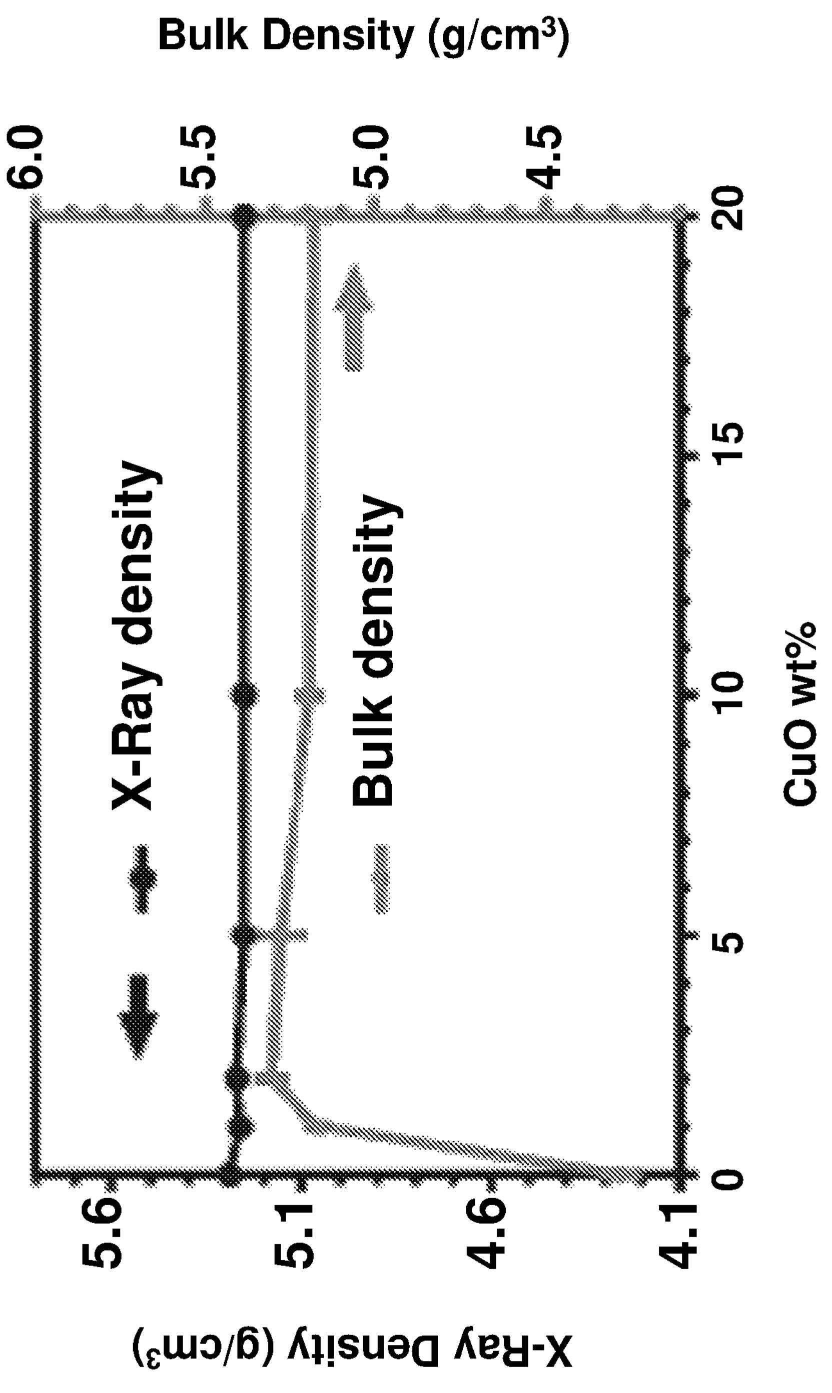
FIG. 11B shows X-ray density and bulk density with respect to CuO doping concentration for $Ni_{0.4}Co_{0.25}Zn_{0.35}Fe_2O_4$ ferrite.
Figure 12A:
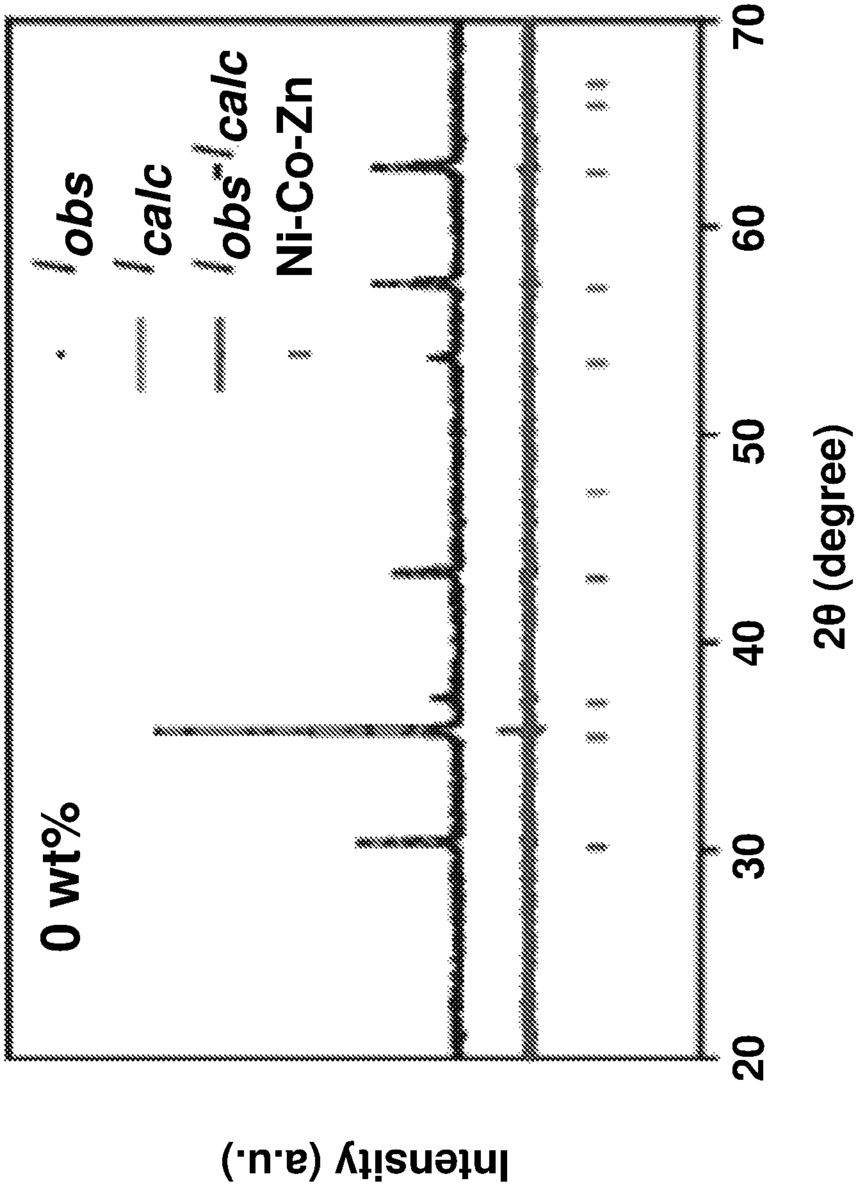
FIG. 12A shows Le Bail refined XRD patterns of CuO (x=0 wt. %) doped $Ni_{0.4}Co_{0.25}Zn_{0.35}Fe_2O_4$ ferrite ceramics.
Figure 12B:
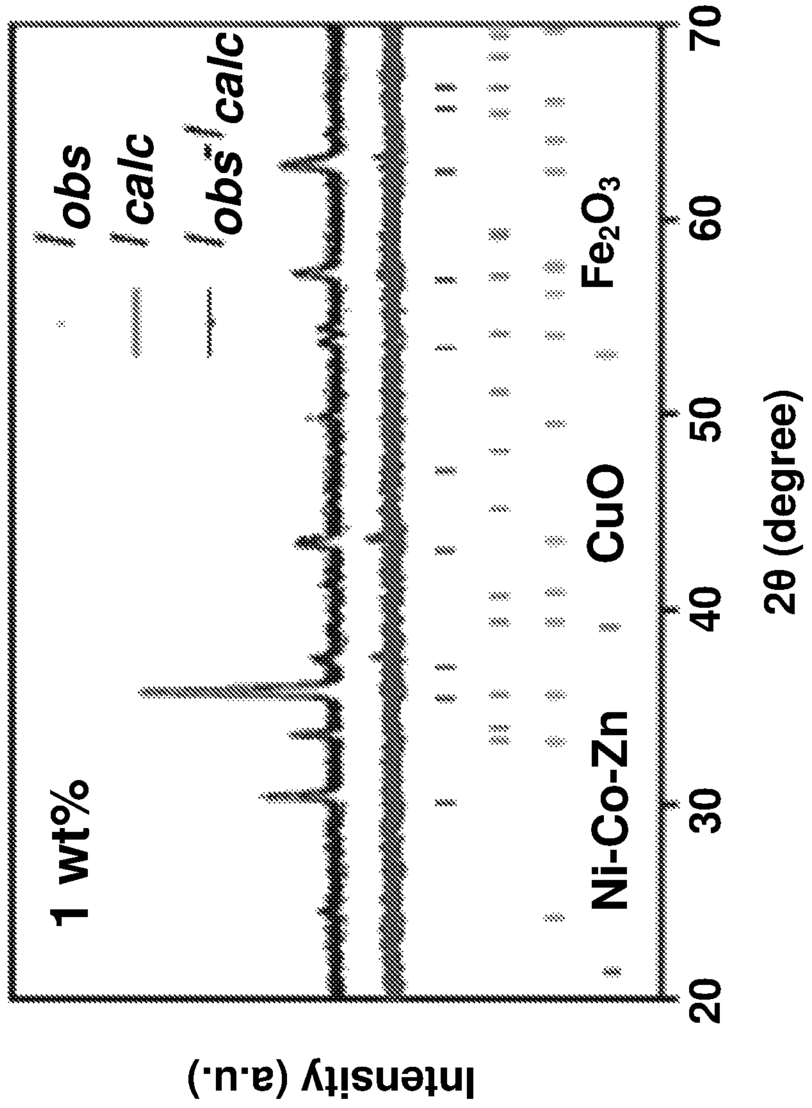
FIG. 12B shows Le Bail refined XRD patterns of CuO (x=1 wt. %) doped $Ni_{0.4}Co_{0.25}Zn_{0.35}Fe_2O_4$ ferrite ceramics.
Figure 12C:
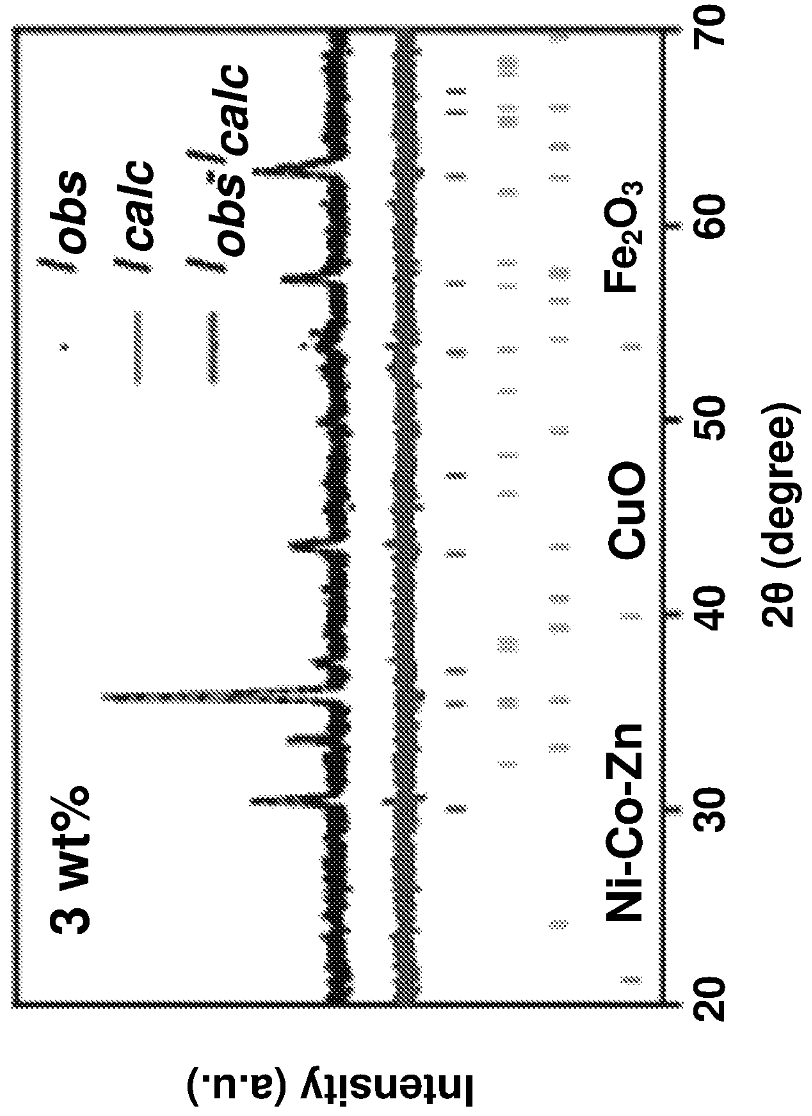
FIG. 12C shows Le Bail refined XRD patterns of CuO (x=3 wt. %) doped $Ni_{0.4}Co_{0.25}Zn_{0.35}Fe_2O_4$ ferrite ceramics.
Figure 12D:
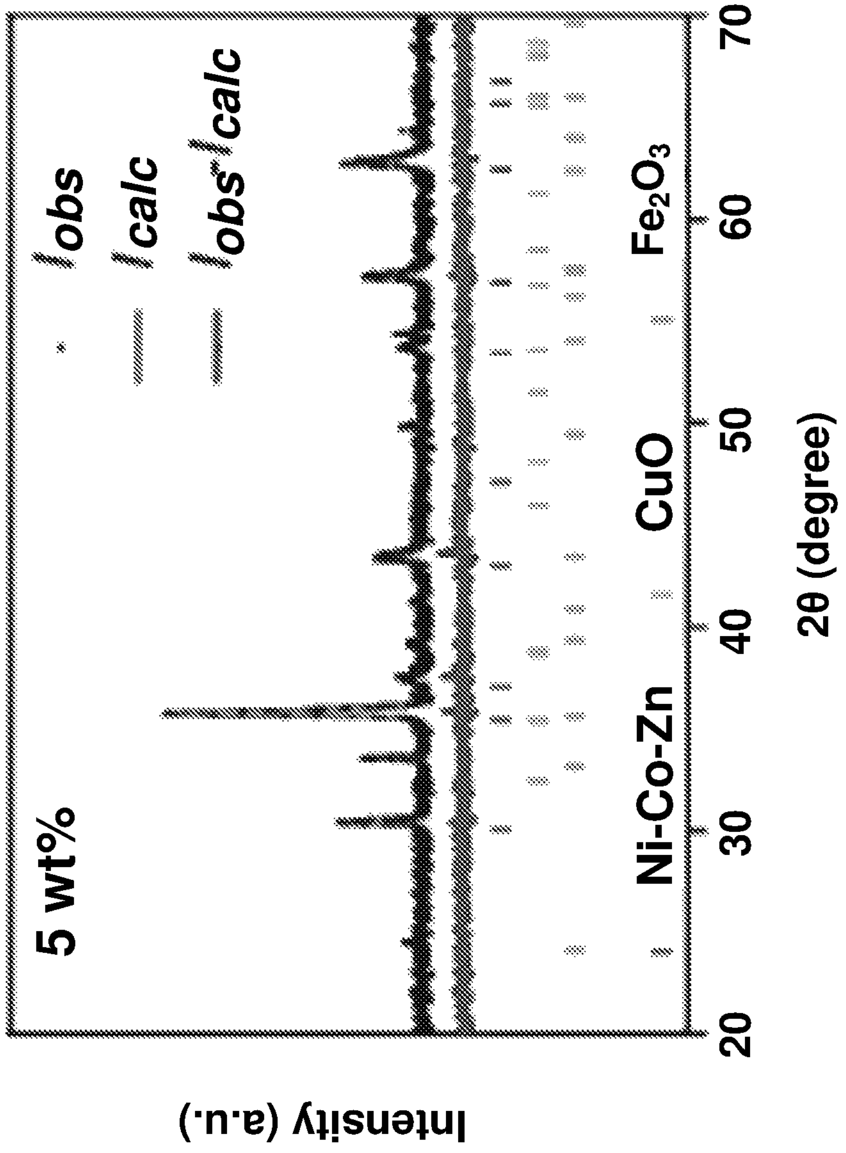
FIG. 12D shows Le Bail refined XRD patterns of CuO (x=5 wt. %) doped $Ni_{0.4}Co_{0.25}Zn_{0.35}Fe_2O_4$ ferrite ceramics.
Figure 12E:
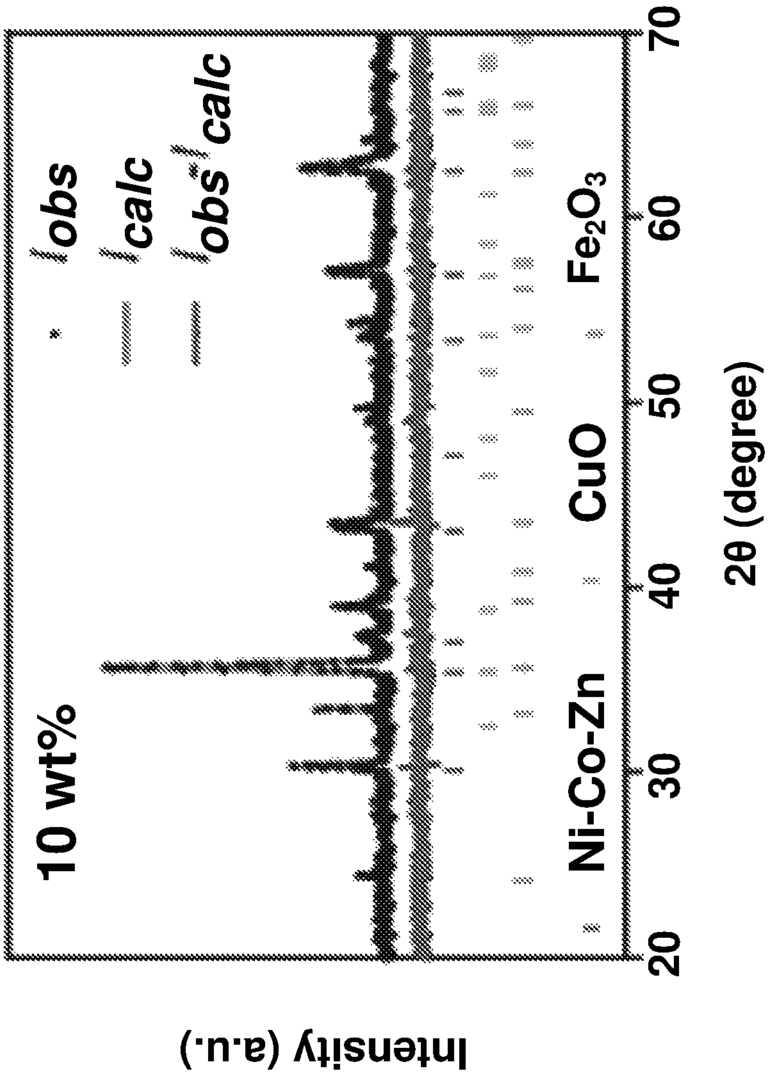
FIG. 12E shows Le Bail refined XRD patterns of CuO (x=10 wt. %) doped $Ni_{0.4}Co_{0.25}Zn_{0.35}Fe_2O_4$ ferrite ceramics.
Figure 12F:
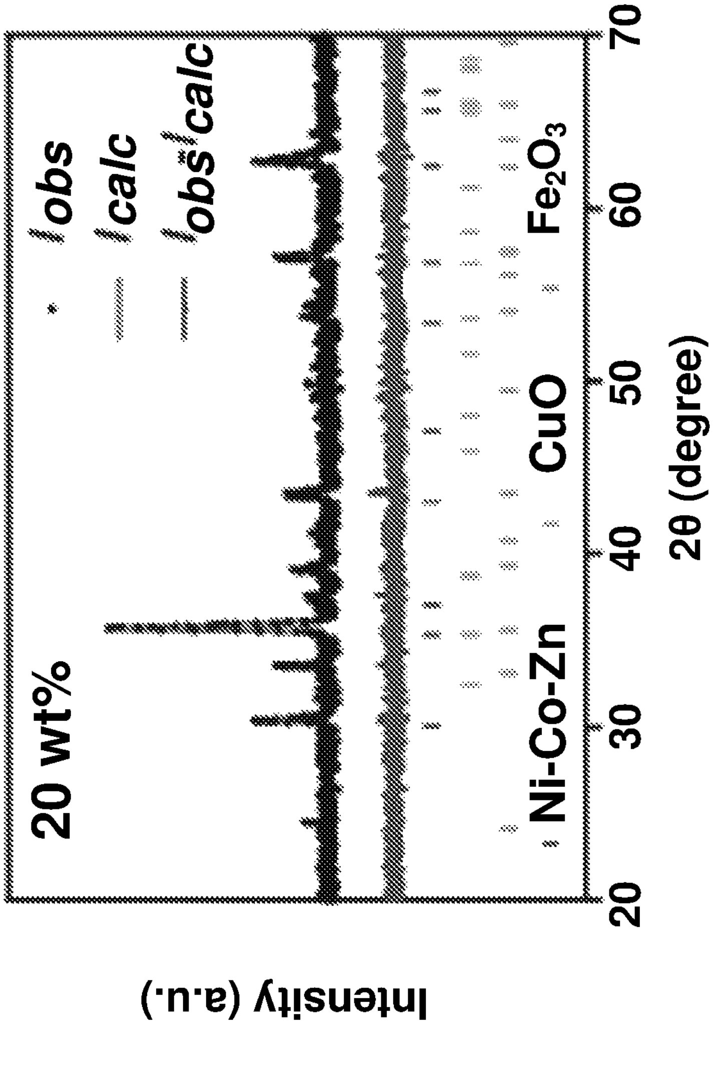
FIG. 12F shows Le Bail refined XRD patterns of CuO (x=20 wt. %) doped $Ni_{0.4}Co_{0.25}Zn_{0.35}Fe_2O_4$ ferrite ceramics.

FIG. 11B shows an increase in density (4.29 g/cm$^3$ (x=0 wt. %) to 5.33 g/cm$^3$ (x=3 wt. %)) because of the increase in CuO concentration in the composition. This increase is due to diffusion of Cu ions in the lattice as CuO has a higher density. To further analyze the XRD data, Le Bail refinements are used for all CuO concentrations as shown in FIGS. 12A to 12F. The simulated XRD patterns reproduce same observed reflections and give good reliability factor. The refined patterns also suggest that extra peaks of CuO and $Fe_2O_3$ are present in the microstructure for CuO doping and the XRD peaks intensify at high CuO concentrations. Furthermore, the lattice constant variation at low concentrations (up to 3%) suggest that CuO enters at both A and B positions in the lattice. At higher CuO concentrations, lattice constant is almost constant, which indicates segregation of CuO at grain boundaries. The low and good fitting parameters of Le Bail refinements are tabulated in Table 6.

TABLE 6

La Bail refinement parameters along with X-ray density, average crystallite size, and porosity of $Ni_{0.4}Co_{0.25}Zn_{0.35}Fe_2O_4$ samples sintered at 1100° C. for 2 hours for specimen doped with CuO at all concentrations

| Parameters | 0 wt % | 1 wt % | 3 wt % | 5 wt % | 10 wt % | 20 wt % |
|---|---|---|---|---|---|---|
| X-Ray Density (g/cm3) | 5.29 | 5.26 | 5.27 | 5.25 | 5.25 | 5.25 |
| a (Å) | 8.3805 | 8.3974 | 8.3904 | 8.4007 | 8.3997 | 8.4006 |
| Average Crystallite Size (nm) | 69 ± 5 | 44 ± 7 | 48 ± 7 | 41 ± 5 | 40 ± 5 | 30 ± 5 |
| Porosity (%) | 21.01 ± 0.920 | 4.67 ± 0.403 | 1.99 ± 0.532 | 2.58 ± 1.152 | 3.64 ± 0.554 | 2.44 ± 0.784 |

TABLE 6-continued

La Bail refinement parameters along with X-ray density, average crystallite size, and porosity of $Ni_{0.4}Co_{0.25}Zn_{0.35}Fe_2O_4$ samples sintered at 1100° C. for 2 hours for specimen doped with CuO at all concentrations

| Parameters | 0 wt % | 1 wt % | 3 wt % | 5 wt % | 10 wt % | 20 wt % |
|---|---|---|---|---|---|---|
| $R_{exp}$ | 2.19 | 4.26 | 4.28 | 4.17 | 4.12 | 4.27 |
| $R_{wp}$ (%) | 2.4 | 6.56 | 6.49 | 8.3 | 9.16 | 6.18 |
| $R_p$ (%) | 1.9 | 5.17 | 5.17 | 6.6 | 7.18 | 4.87 |
| $\chi^2$ | 1.10 | 1.54 | 1.52 | 1.99 | 2.23 | 1.45 |

Figure 13:
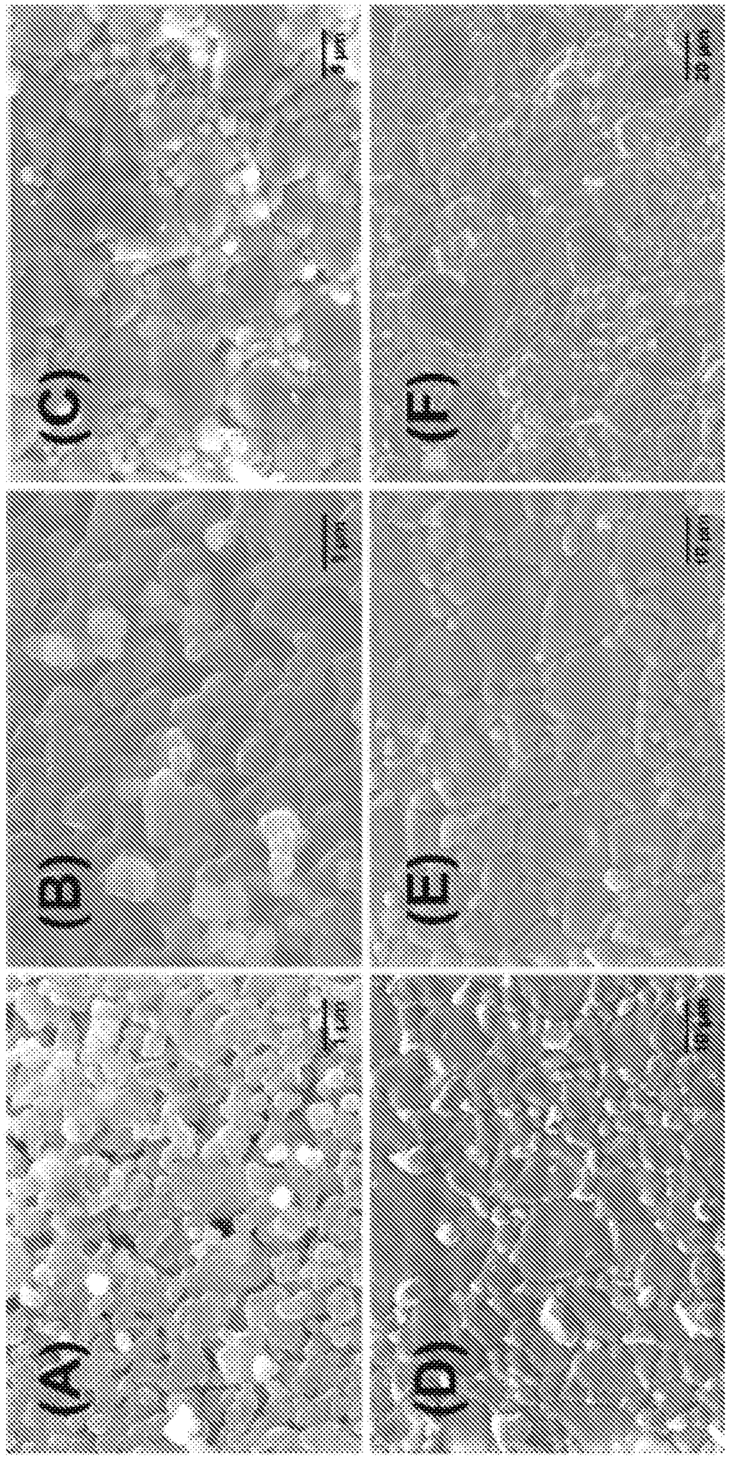
FIG. 13 shows SEM micrographs of CuO (x=0, 1, 3, 5, 10 and 20 wt. %) doped $Ni_{0.4}Co_{0.25}Zn_{0.35}Fe_2O_4$ ferrite ceramics sintered at 1100° C. for 2 hours, including ferrite doped with CuO at varied levels: panel (A) x=0 wt. % (undoped); panel (B) x=1 wt. %; panel (C) x=3 wt. %; panel (D) x=5 wt. %; panel (E) x=10 wt. %; and panel (F) x=20 wt. %.

FIG. 13 shows the SEM micrograph of CuO doped (x=0 wt. % to 20 wt. %) Ni—Co—Zn samples sintered at 1100° C. It was observed that average grain size gradually increased with CuO concentration in the composition. Narrow grain size distribution was observed for samples doped with less than 3 wt. % CuO as compared to other samples doped with higher CuO concentrations as shown in Table 7. In fact, non-uniform grain size distribution was observed at higher CuO concentrations (>5%). Average grain size was drastically increased from 200-600 nm to 15-40 μm for undoped Ni—Co—Zn ferrite (x=0 wt. %) and heavily doped sample (x=20 wt. %), respectively. Porosity decreased along with an increase in grain size specially at higher CuO concentrations [Ref. 1]. It mainly results from the decrease in intragranular porosity, which decreases from 21% for an undoped sample (x=0 wt. %) to 2.4% for a heavily doped counterpart (x=20 wt. %). Copper substitution increases the bulk density from 4.27 g/cm$^3$ (x=0 wt. %) to 5.33 g/cm$^3$ (x=3 wt. %), which are then decreased to 5.24 g/cm$^3$ (x=20 wt. %) as shown in Table 7. This can be attributed to an increase in grain size and the reduction in porosity with increasing CuO concentration, as reactivity of the grains with each other has led to mergers and formation of larger grains. The presence of copper oxide in the composition during sintering facilitates grain growth and reduction in porosity, which in turn play important role for enhancing dynamic magnetic properties.

TABLE 7

Bulk density and grain size of $Ni_{0.4}Co_{0.25}Zn_{0.35}Fe_2O_4$ samples sintered at 1100° C. for 2 hours, which are prepared with different CuO doping concentrations (x = 0 wt. % to 20 wt. %)

| Sample | Bulk Density (g/cm$^3$) | Grain Size (μm) |
|---|---|---|
| 0% | 4.27 ± 0.05 | 0.2-0.6 |
| 1% | 5.16 ± 0.02 | 0.4-0.8 |
| 3% | 5.30 ± 0.03 | 2-9 |
| 5% | 5.28 ± 0.06 | 5-20 |
| 10% | 5.19 ± 0.02 | 15-30 |
| 15% | 5.21 ± 0.02 | 18-25 |
| 20% | 5.18 ± 0.04 | 15-40 |

3.2 Magnetic And Dielectric Characterizations

The frequency dependent relative complex permeability can be given by equation 6.

$$\mu_r = \mu' - j\mu'' \quad (6)$$

Where, $\mu_r$ is known as relative permeability that is the ratio of permeability of the material versus that of the free space ($\mu_0$). And μ' and μ" are real and imaginary parts of the complex permeability.

The magnetic loss tangent and relative loss factor is given by equation 7 and 8.

$$\tan\delta_\mu = \frac{\mu''}{\mu'} \tag{7}$$

$$\text{Relative Loss Factor} = \frac{\tan\delta_\mu}{\mu'} \tag{8}$$

Figure 14A:
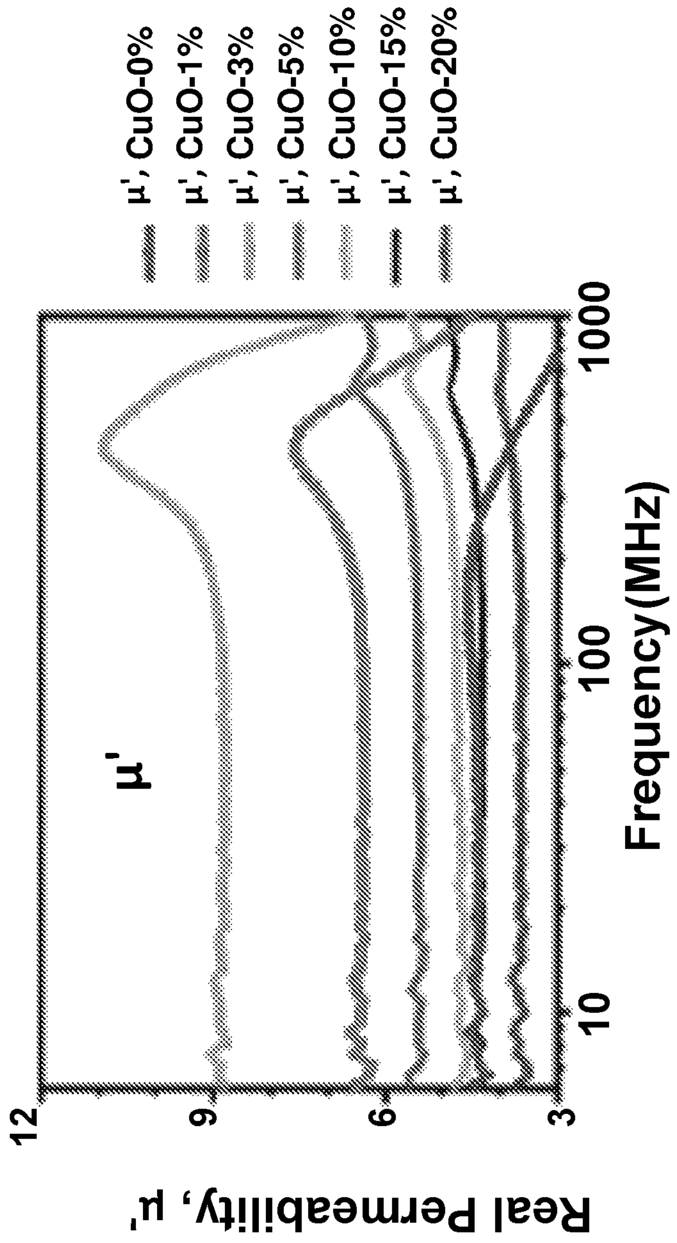
FIG. 14A shows relative complex permeability spectra of $Ni_{0.4}Co_{0.25}Zn_{0.35}Fe_2O_4$ samples sintered at 1100° C. for 2 hours for real part of complex permeability.
Figure 14B:
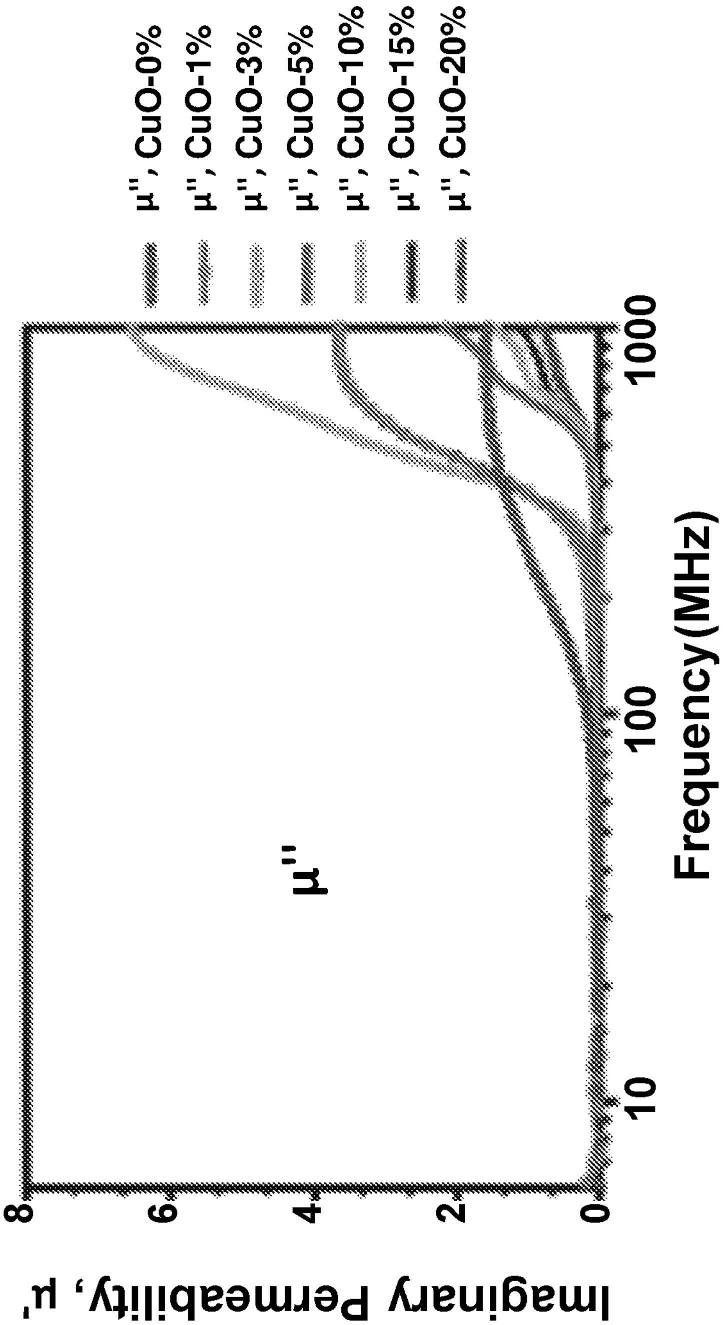
FIG. 14B shows relative complex permeability spectra of $Ni_{0.4}Co_{0.25}Zn_{0.35}Fe_2O_4$ samples sintered at 1100° C. for 2 hours for imaginary part of complex permeability.
Figure 14C:
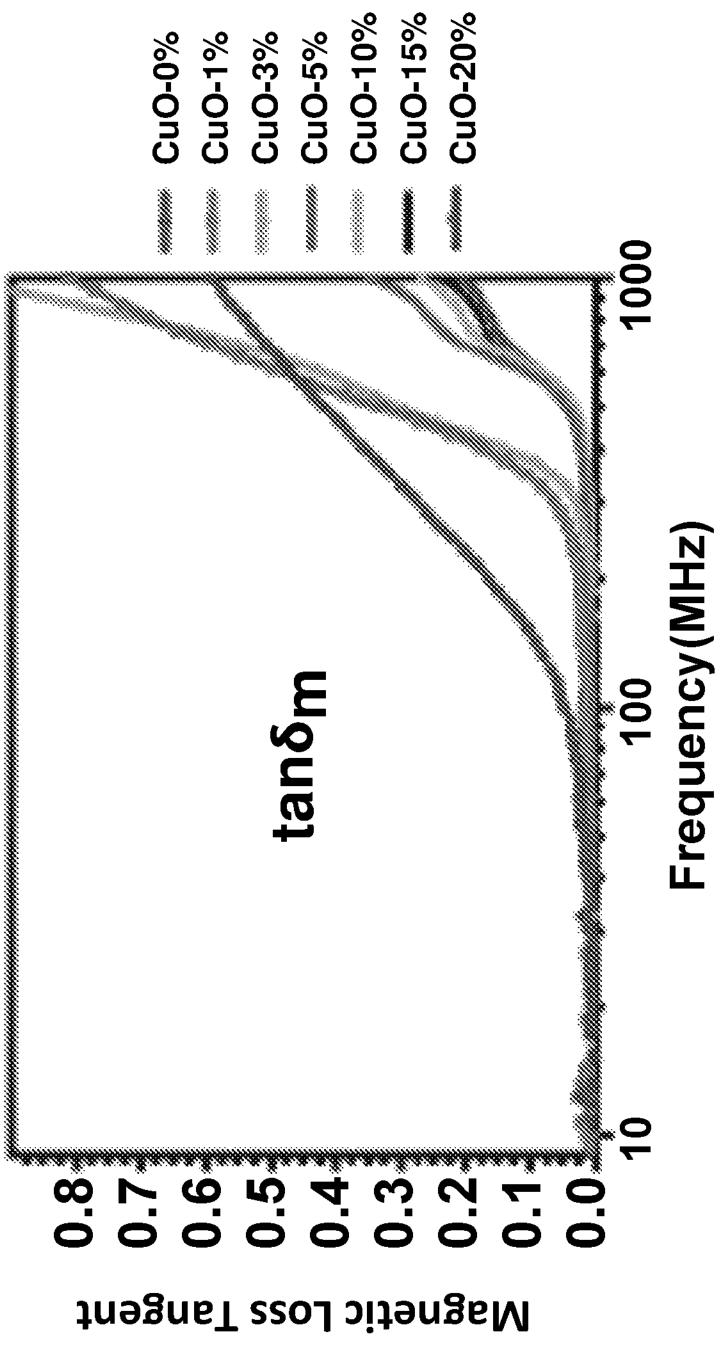
FIG. 14C shows relative complex permeability spectra of $Ni_{0.4}Co_{0.25}Zn_{0.35}Fe_2O_4$ samples sintered at 1100° C. for 2 hours for magnetic loss tangent.
Figure 15A:
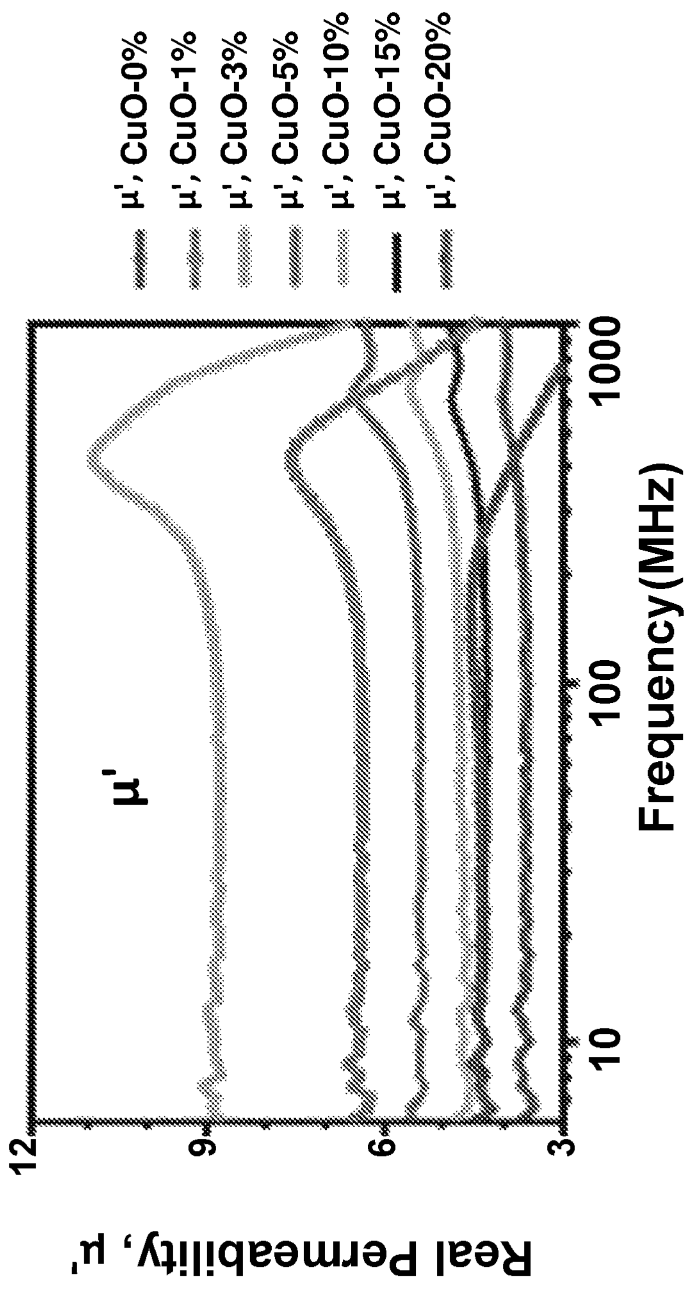
FIG. 15A shows real part of permeability and magnetic loss tangent of $Ni_{0.4}Co_{0.25}Zn_{0.35}Fe_2O_4$ samples sintered at 1100° C. for 2 hours with respect to CuO concentrations at a frequency of 300 MHz.
Figure 15B:
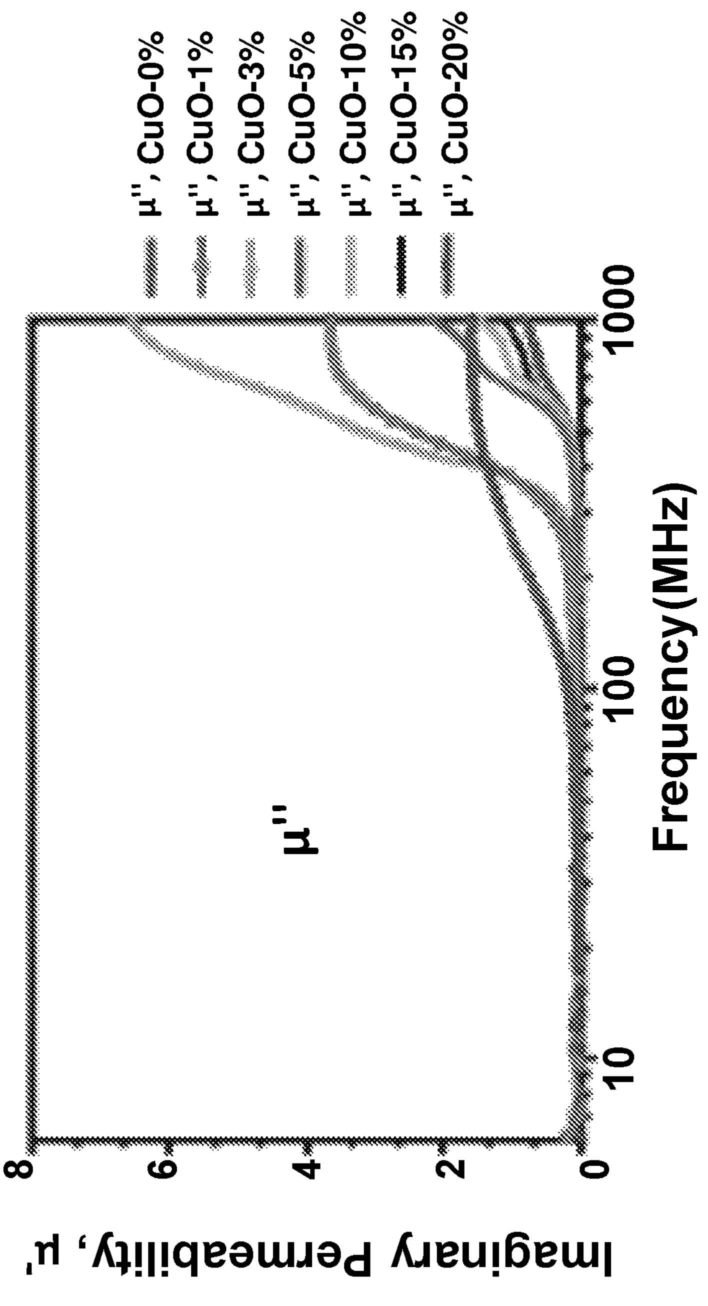
FIG. 15B shows real part of permeability and magnetic loss tangent of $Ni_{0.4}Co_{0.25}Zn_{0.35}Fe_2O_4$ samples sintered at 1100° C. for 2 hours with respect to CuO concentrations at a frequency of 500 MHz.
Figure 15C:
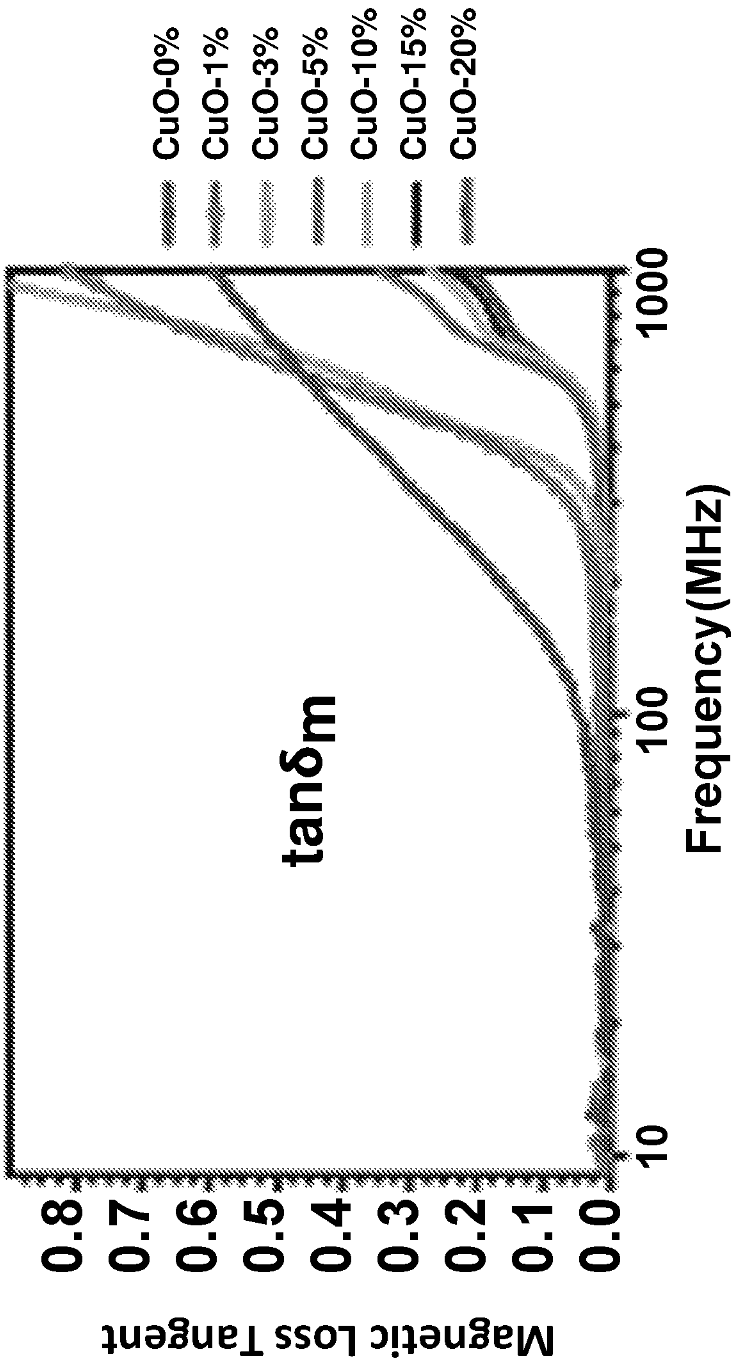
FIG. 15C shows real part of permeability and magnetic loss tangent of $Ni_{0.4}Co_{0.25}Zn_{0.35}Fe_2O_4$ samples sintered at 1100° C. for 2 hours with respect to CuO concentrations at a frequency of 800 MHz.

The variation of complex permeability spectra for CuO doped (x=0 wt. % to 20 wt. %) Ni—Co—Zn ferrite samples sintered at 1100° C. for 2 hours are shown in FIGS. 14A-14C. It is noted that both real (μ') and imaginary part (μ") of the permeability increases with CuO concentration until x=3 wt. %, because of the increase in grain size and density with increasing CuO concentration. Afterwards, both real and imaginary part of the complex permeability decreases steadily with further increase of CuO dopants. Between x=0 wt. % and x=3 wt. %, the real part of permeability increases from 3.87 to 10.9, whereas the imaginary part of permeability increases from 1.38 to 1.59, which were tested at 400 MHz frequency. With further increase in CuO content, the real part of permeability decreases from 10.9 (x=3 wt. %) to 3.77 (x=20 wt. %) along with a decrease in the imaginary part from 1.59 (x=3 wt. %) to 0.06 (x=20 wt. %). The relative magnetic permeability of ferrites has shown a positive correlation with grain size. The magnetic loss tangent of the samples is also depicted in FIG. 14C, which showed pronounced decrease in values from undoped sample (x=0 wt. %) to doped samples (x=20 wt. %). It is noted that magnetic loss tangent at 400 MHz decreases from 0.36 (x=0 wt. %) to 0.02 (x=20 wt. %). Magnetic loss follows a different trend than imaginary part of the permeability. This indicates that copper helps in lowering of magnetic loss, as it acts as a sintering aid during the sintering process of ferrite samples, which densifies sample while reducing pore volume. The values of real part of permeability, magnetic loss tangent and relative loss factor are tabulated in Table 9 at different frequencies. The real part of permeability and magnetic loss tangent at different Cu concentrations for 300 MHz, 500 MHz and 800 MHz are depicted in FIGS. 15A-15C. It is observed that real part of permeability follows the same trend at higher frequencies above 500 MHz, it decreases after an initial increase for all frequencies. On the contrary, magnetic loss tangent decreases gradually and drop to very low values at frequencies up to 500 MHz for samples doped with a high concentration of CuO. As frequency increases above 500 MHz, high magnetic loss tangent was observed at low concentration of CuO dopants as compared to the higher concentrations (FIG. 15C). The real part of permeability μ' remains almost constant in a certain range of frequency (between 100 to 500 MHz depending on the composition) and then begins to decrease sharply at higher frequencies. The imaginary part of permeability μ" gradually increases with frequency and attains the highest value at resonance frequency, whereas the real part of permeability rapidly decreases. This feature resembles a typical relaxation characteristic of natural resonance frequency; the frequency at which μ" form a broad peak is known as resonance frequency $f_o$. Resonance frequency is a key limiting factor for magnetic materials to be utilized efficiently at frequencies below this value. $f_o$ was observed towards the lower frequency for samples prepared with a low concentration of CuO dopant, x, 3 wt. %. And beyond x=3 wt. %, $f_o$ further shifted to higher frequency range above 1 GHz. This behavior agrees well with Globus model, which relates the relative permeability to the resonance frequency [Ref. 29] as shown below by equation 9.

$$\sqrt{\mu_r - 1}\, f_o = \text{constant} \tag{9}$$

Complex permeability spectra of polycrystalline ferrite are dependent on two different magnetizing phenomena: the spin rotational magnetization and domain wall motion. The complex permeability of polycrystalline ferrites is highly dependent on the microstructure of the ferrite powder [Ref. 30]. In previous studies, it was reported that spin rotational component is dependent only on post sintering density of the ferrite, while domain wall motion is dependent on post sintering density and the grain size of the ferrite. It was also reported that domain wall contribution lies only at lower frequency range while complex permeability at higher frequency range above 100 MHz is governed by spin rotation component [Ref. 31]. Large grains have a greater number of domain walls, which in turn contribute to increase in magnetization, thus leading to increased permeability. In this Example 2, for unsubstituted sample (x=0 wt. %), low value of permeability is realized as domain wall movement is absent because of single domain particles. On the contrary, the multi-domain particles of grain size ≥3 μm are observed for CuO substituted samples that result in higher domain wall contribution, thus increasing the permeability [Ref. 14]. It was noted that grain size increases with CuO concentration up to a certain weight percent (up to x=3 wt. %), beyond which segregation of CuO at grain boundaries and increase in intragranular porosity discontinuous grain growth (seen in SEM images—FIG. 13) can be observed that have a direct impact on permeability [Ref. 32]. Another contributing factor is the density, which also aids the enhancement of permeability due to the reduction of demagnetizing field that is attributed to decrease in pore volume. As shown in FIG. 15C, it was observed that permeability decreases with frequency, especially for high frequencies >500 MHz. Basically, the presence of nonmagnetic impurities located between grains and intragranular pores can hinder the movement of spin and domain walls, which in turn lowers the permeability and increases the magnetic loss.

With an increase in CuO concentration, both the real and imaginary part of permeability initially increases and then decreases with frequencies. In order to determine the model-predicted resonance frequency, the relative complex permeability spectra in FIGS. 14A-14C is fitted with Kittel Equation (equations 10 and 11) using three fitting parameters: where xo is the static magnetic susceptibility; $f_O$ is the resonant frequency; and a is the damping factor [Ref. 33, 34].

$$\mu_r(f) = 1 + \frac{x_o\left(1 + i\alpha\frac{f}{f_o}\right)}{\left(1 + i\alpha\frac{f}{f_o}\right)^2 + \left(\frac{f}{f_o}\right)^2} \tag{10}$$

$$\mu_r(f) = 1 + \frac{x_o f_o^2 \left(f_o^2 - (1-\alpha)f^2\right)}{\left(f_o^2 - (1+\alpha^2)f^2\right)^2 + 4\alpha^2 f_o^2 f^2} - i\frac{x_o \alpha f_o f \left(f_o^2 + (1+\alpha)f^2\right)}{\left(f_o^2 - (1+a^2)f^2\right)^2 + 4\alpha^2 f_o^2 f^2} \tag{11}$$

Figure 16A:
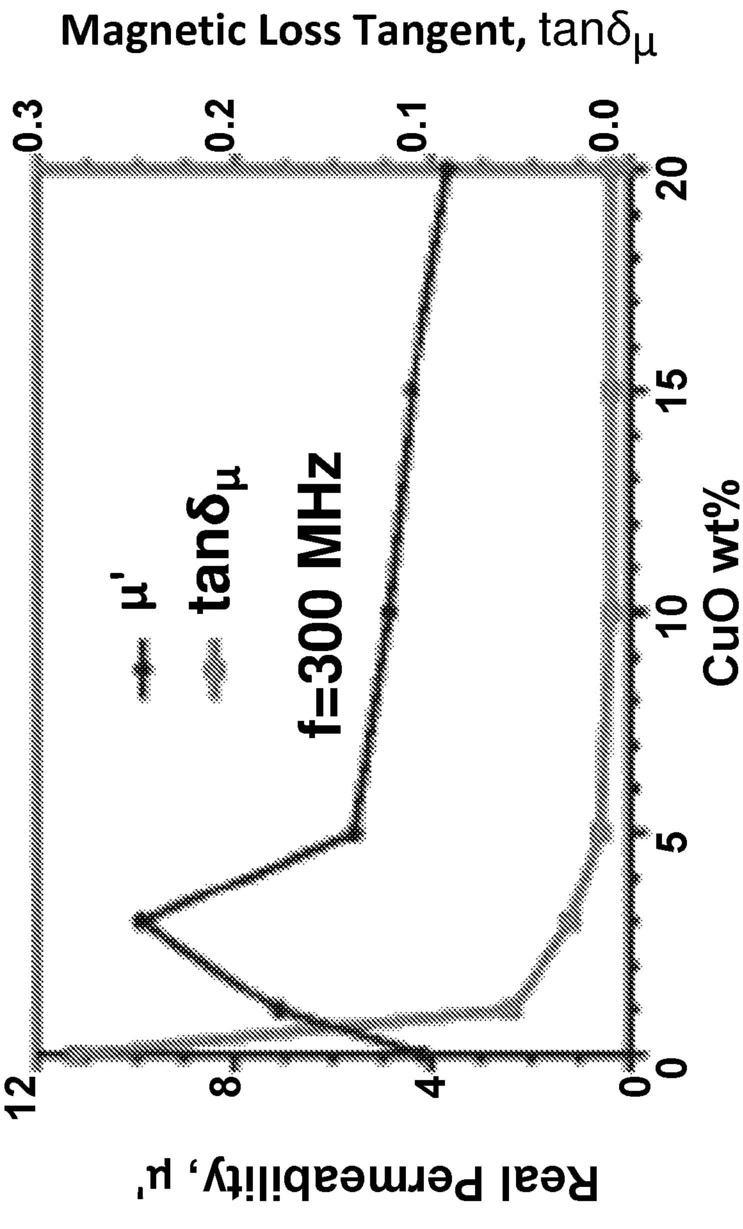
FIG. 16A shows fitted complex permeability spectra of the $Ni_{0.4}Co_{0.25}Zn_{0.35}Fe_2O_4$ samples with varied CuO dopant concentrations, where solid lines are fitting curves and wherein x=3 wt. %.
Figure 16B:
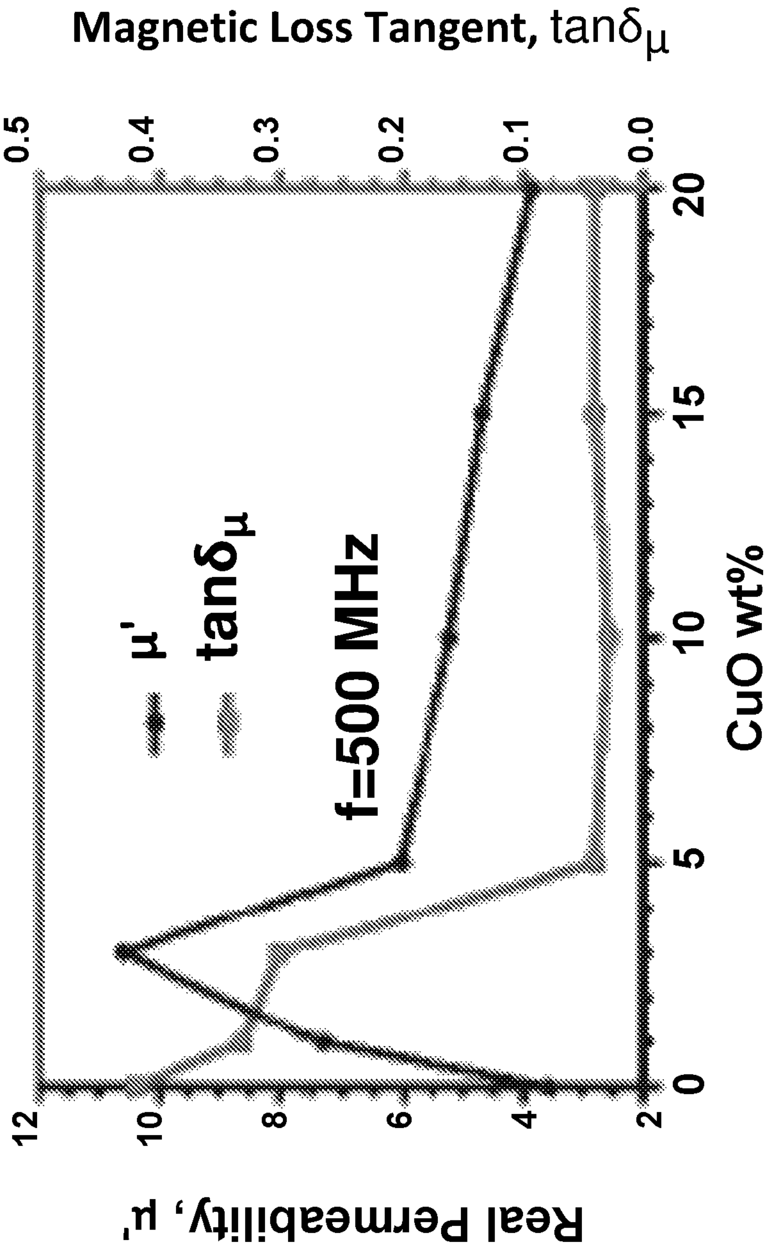
FIG. 16B shows fitted complex permeability spectra of the $Ni_{0.4}Co_{0.25}Zn_{0.35}Fe_2O_4$ samples with varied CuO dopant concentrations, where solid lines are fitting curves and wherein x=5 wt. %.
Figure 16C:
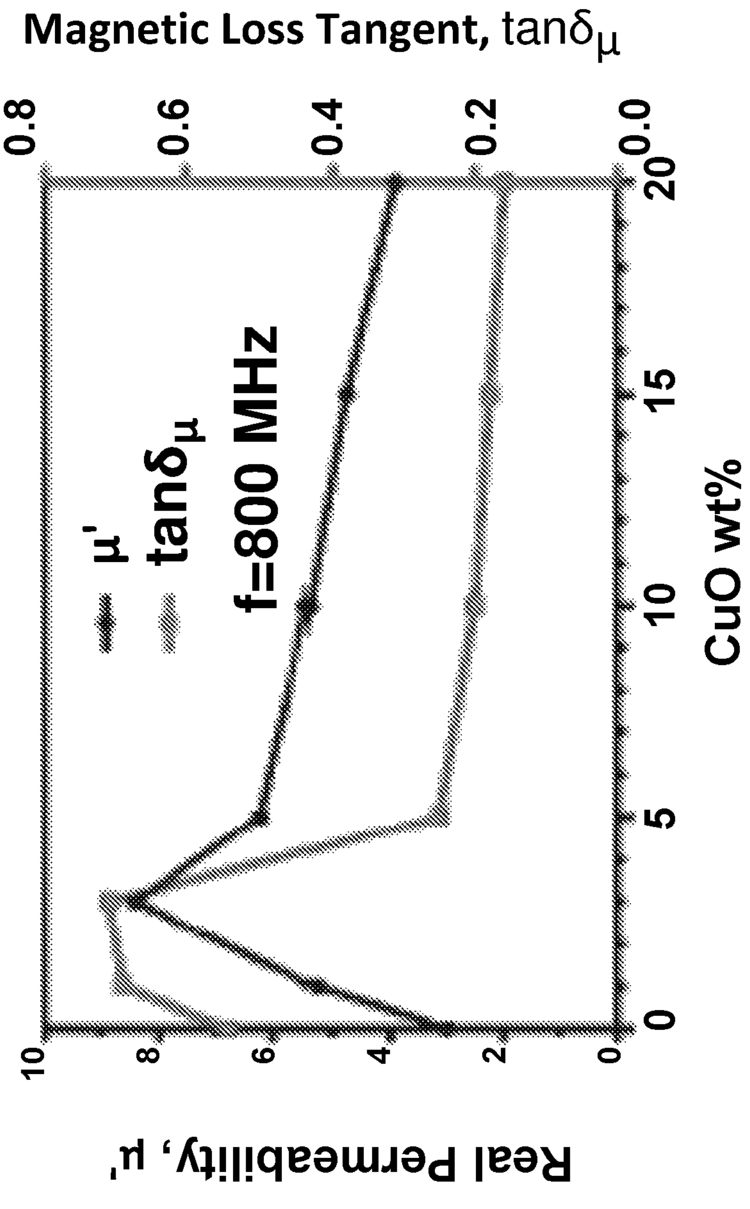
FIG. 16C shows fitted complex permeability spectra of the $Ni_{0.4}Co_{0.25}Zn_{0.35}Fe_2O_4$ samples with varied CuO dopant concentrations, where solid lines are fitting curves and wherein x=20 wt. %.

The measured and fitted permeability spectra of CuO substituted (x=3, 5 and 20 wt. %) ferrite samples are shown in FIGS. 16A-16C. Table 8 listed the parameters obtained for samples with different CuO concentration. The calculated permeability (solid line) in FIGS. 16A-16C is in good agreement with the measured complex permeability (circled line). Similar to the measurements, unsubstituted/undoped samples (x=0 wt. %) have small pores, small average grains along with lowest sintering density as listed in Table 2, which leads to large demagnetizing field. As a result, static magnetic susceptibility ($\chi_O$) is the lowest (e.g., 3.28 for x=0 wt. % vs 7.99 for x=3 wt. % samples). Since the pore volume decreases and the average grain size increases with increasing CuO concentrations, demagnetizing field decreases and xo increases, accordingly. The further increase of CuO concentration beyond a certain threshold (i.e., x=3 wt. %) cause inhomogeneous microstructure that is represented by a large grain size distribution, thus creating closed pores as well as long and wide grain boundaries. As a result, the demagnetizing field increases while magnetic susceptibility ($\chi_O$) decreases [Ref. 35]. Similarly, damping factor (α) also decreases first then increases in response to an increasing concentration of Cu. The generation of closed pores also increase the impediment to domain wall motion, which in turn increases the damping factor. The increase in resonant frequency $f_o$ with CuO concentration can be ascribed to reduced demagnetizing fields caused by the grain size and pore distribution.

TABLE 8

Fitted parameters extracted from the $Ni_{0.4}Co_{0.25}Zn_{0.35}Fe_2O_4$ samples for x = 0 wt. % to 20 wt. %

| Sample | Static magnetic susceptibility ($x_o$) | Resonant frequency ($f_o$) GHz | Damping coefficient (α) |
|---|---|---|---|
| 0% | 3.28 | 1.30 | 1.670 |
| 1% | 5.52 | 2.09 | 1.495 |
| 3% | 7.99 | 1.98 | 1.274 |
| 5% | 4.37 | 2.56 | 1.135 |
| 10% | 3.71 | 2.71 | 1.163 |
| 15% | 3.29 | 1.53 | 0.542 |
| 20% | 4.48 | 2.39 | 1.043 |

Figure 17A:
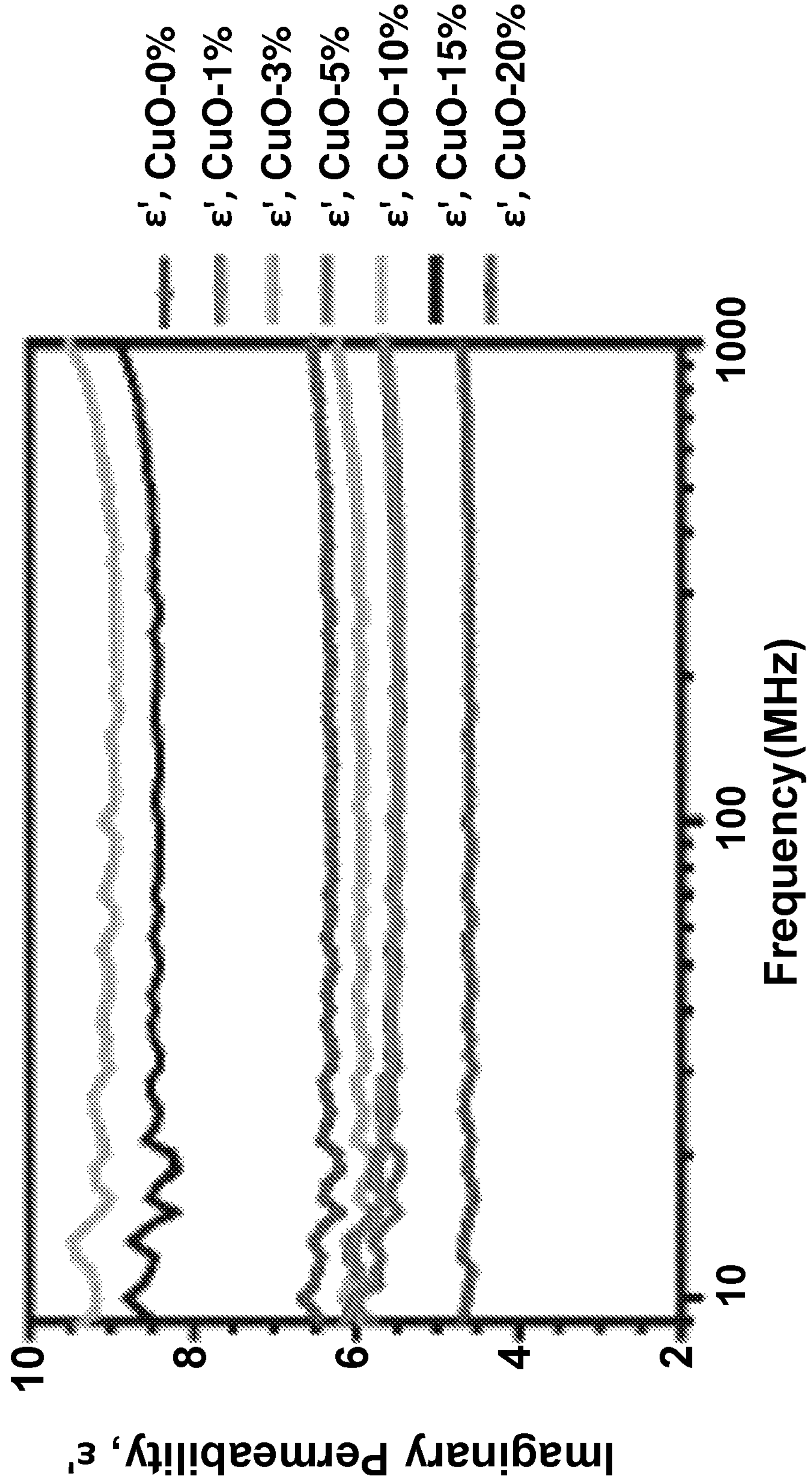
FIG. 17A shows relative complex permittivity spectra of $Ni_{0.4}Co_{0.25}Zn_{0.35}Fe_2O_4$ samples sintered at 1100° C. for 2 hours for relative dielectric permittivity.
Figure 17B:
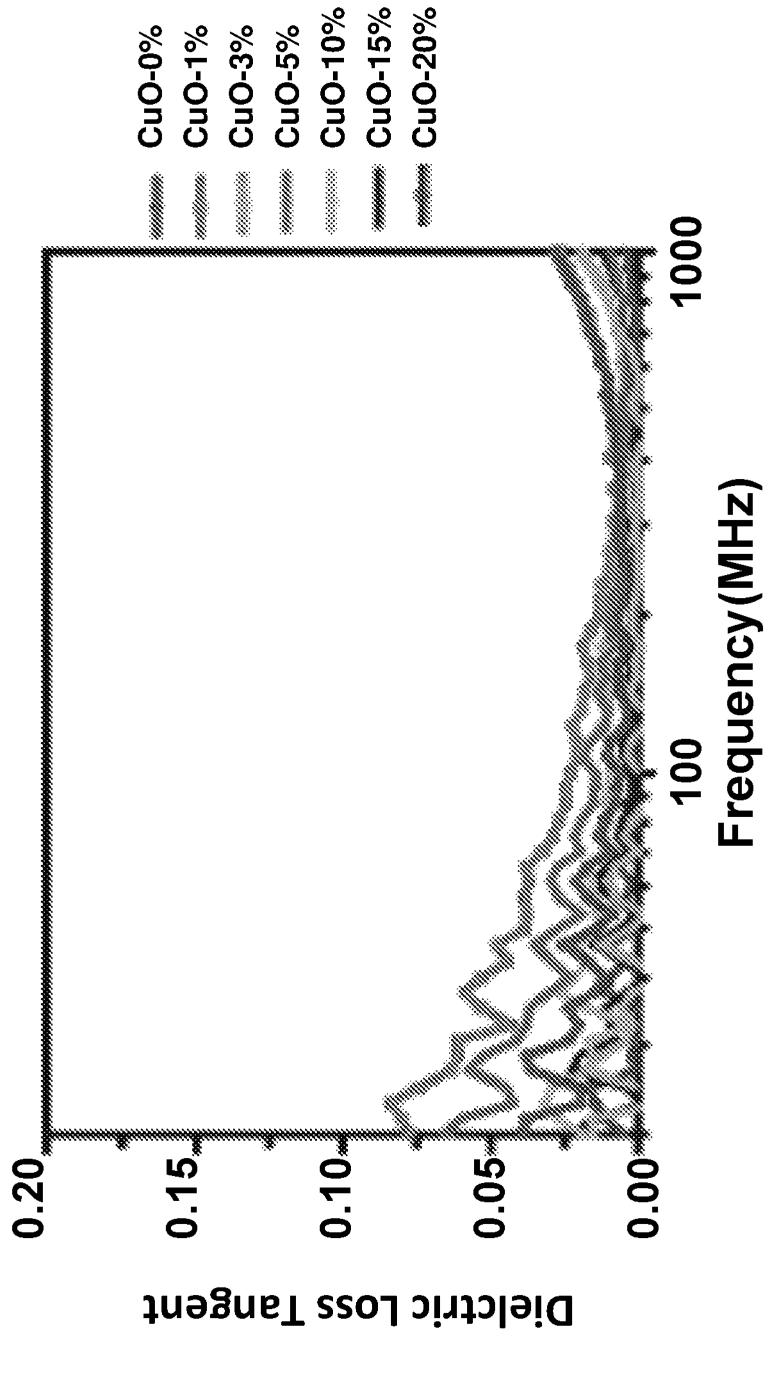
FIG. 17B shows relative complex permittivity spectra of $Ni_{0.4}Co_{0.25}Zn_{0.35}Fe_2O_4$ samples sintered at 1100° C. for 2 hours for dielectric loss tangent.

To characterize the dielectric characteristics of prepared ferrite samples, complex permittivity spectra was measured for CuO doped (x=0 wt. % to 20 wt. %) Ni—Co—Zn ferrite samples sintered at 1100° C. for 2 hours as shown in FIGS. 17A and 17B. The frequency dependent relative complex permittivity can be given by equation 12.

$$\varepsilon_r = \varepsilon' - j\varepsilon'' \quad (12)$$

where $\varepsilon_r$ is known as relative permittivity and ε' and ε" are real and imaginary parts of the complex permittivity.

The dielectric loss tangent is given by equation 13

$$\tan\delta_\varepsilon = \frac{\varepsilon''}{\varepsilon'} \quad (13)$$

Figure 18A:
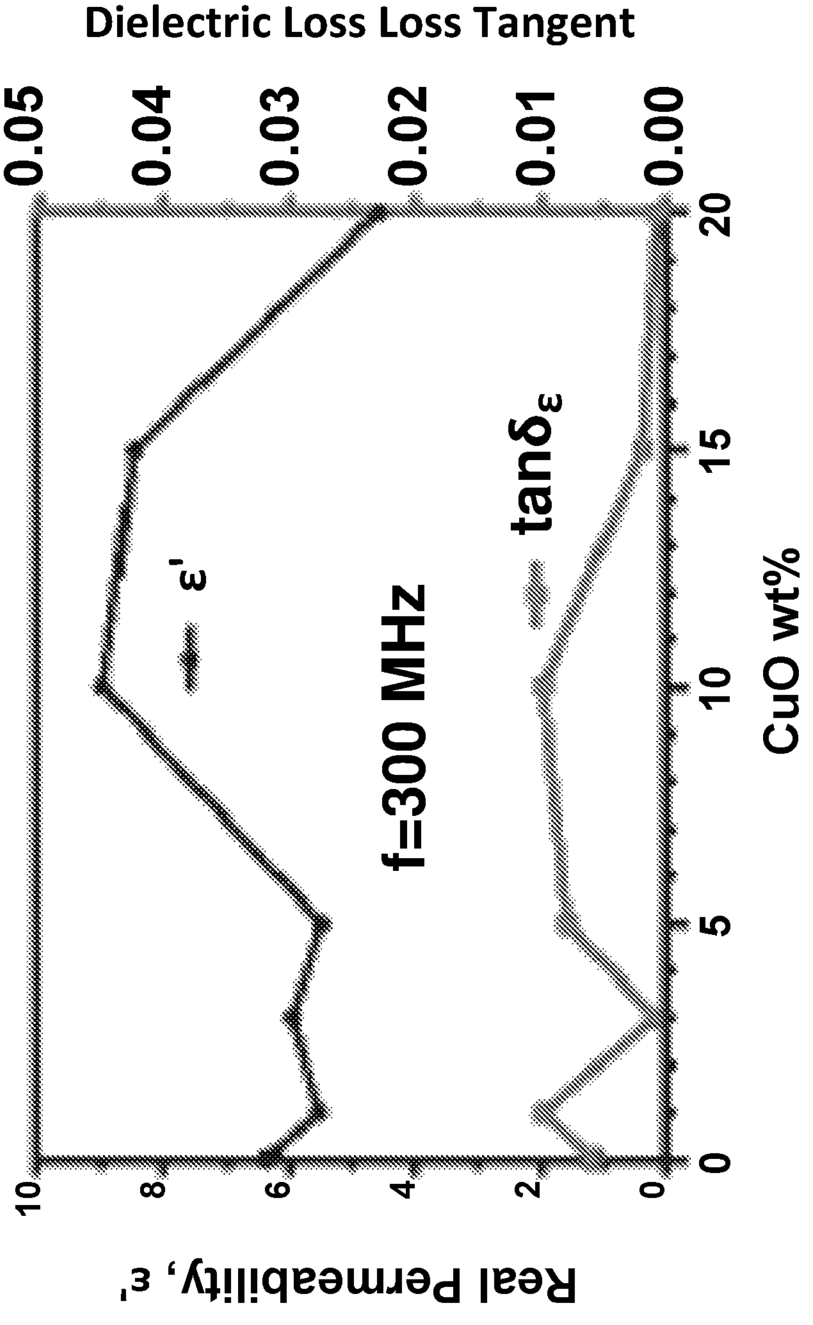
FIG. 18A shows real part of permittivity and dielectric loss tangent of $Ni_{0.4}Co_{0.25}Zn_{0.35}Fe_2O_4$ samples sintered at 1100° C. for 2 hours with respect to CuO concentration at a frequency of 300 MHz.
Figure 18B:
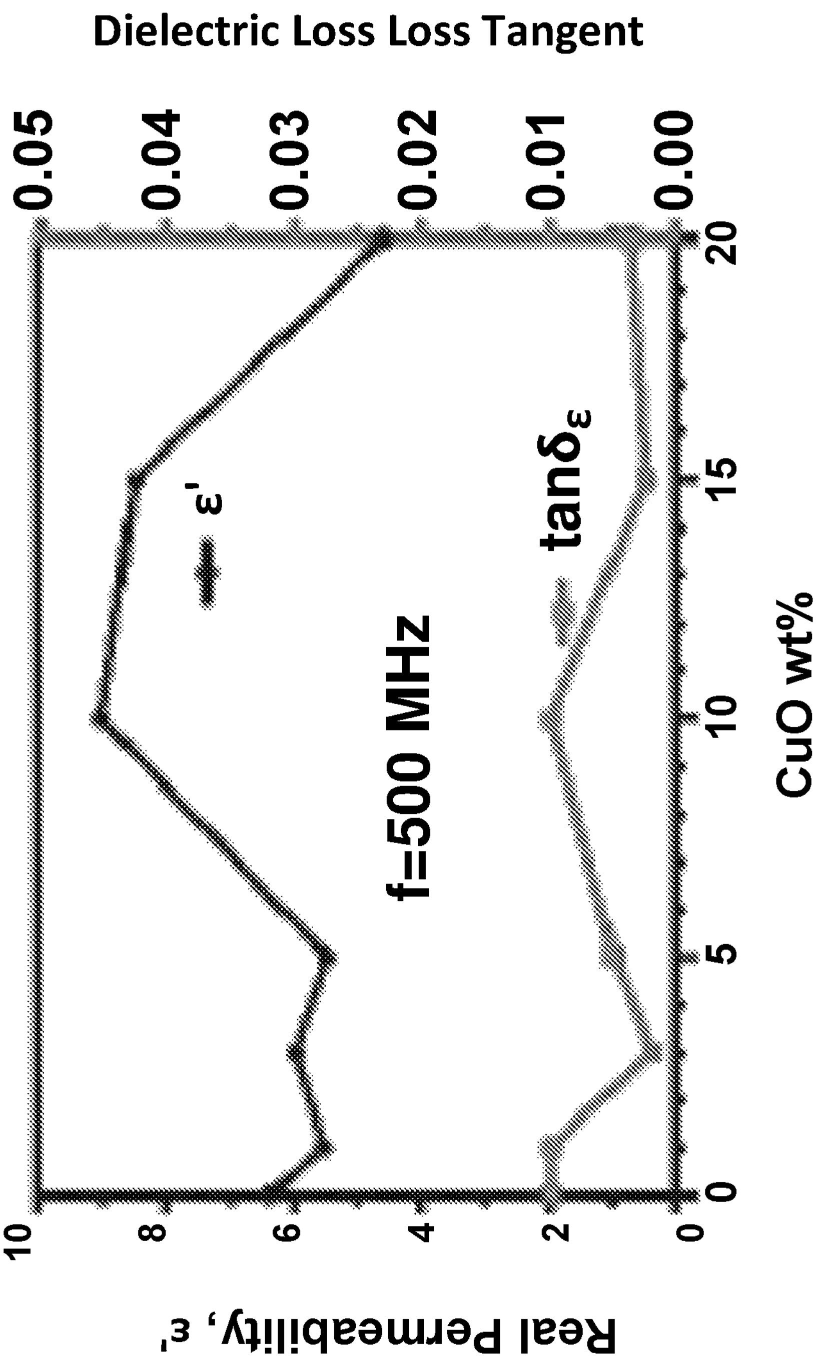
FIG. 18B shows real part of permittivity and dielectric loss tangent of $Ni_{0.4}Co_{0.25}Zn_{0.35}Fe_2O_4$ samples sintered at 1100° C. for 2 hours with respect to CuO concentration at a frequency of 500 MHz.
Figure 18C:
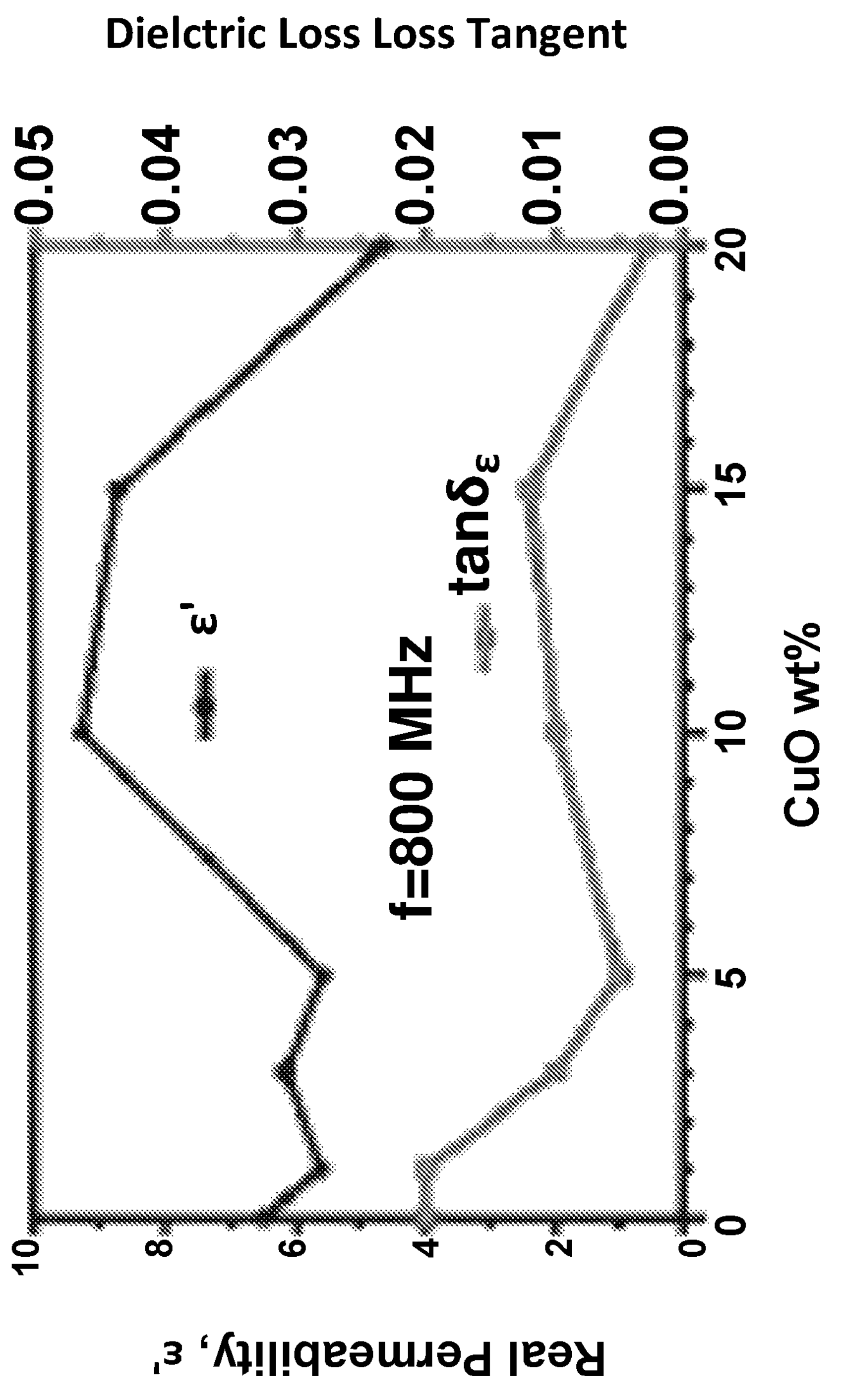
FIG. 18C shows real part of permittivity and dielectric loss tangent of $Ni_{0.4}Co_{0.25}Zn_{0.35}Fe_2O_4$ samples sintered at 1100° C. for 2 hours with respect to CuO concentration at a frequency of 1 GHz.

It is noted that permittivity remains constant across the full range of measured frequencies, which is dissimilar to bulk ferrites in the RF and microwave frequency region. The real part of permittivity (ε') shows some noticeable variation with different CuO concentration, while imaginary part of permittivity (ε") for different samples show small variation in the frequency range from 1 MHz to 1 GHz. Permittivity increases with an increase in CuO concentration until x=10 wt. %, beyond which it decreases with further increased CuO concentrations. Substitution of Cu ions in the spinel lattice enhances the dielectric polarization of the material, thus increasing the permittivity (6.4 to 9). Furthermore, an increase in grain size causes an increase in grain-to-grain boundary thickness ratio, which in turn increases permittivity for samples doped with higher CuO concentrations. At very higher CuO concentration (x>10 wt. %), permittivity starts to drop noticeably from 9 to 4.5 because of nonuniform grain sizes or large grain size distribution. Also, CuO additives at higher concentrations hinder the formation of $Fe^{2+}$ ions and suppresses the polarization, hence resulting in lower permittivity [Ref. 26]. The dielectric loss also exhibits a similar dependence on CuO concentration by decreasing with Cu concentration after an initial increase to reach a peak value. FIGS. 18A-18C show the real part of permittivity and dielectric loss tangent at frequency of 300 MHz, 800 MHz, and 1 GHz. The dielectric and magnetic properties of all samples are summarized in Table 9.

TABLE 9

Magnetic and dielectric properties of $Ni_{0.4}Co_{0.25}Zn_{0.35}Fe_2O_4$ samples sintered at 1100° C. for 2 hours for x = 0 wt. % to 20 wt. % measured at different frequencies

| Sample | Parameters | 300 MHz | 500 MHz | 800 MHZ |
|---|---|---|---|---|
| 0 wt % | μ' | 4.2 | 3.6 | 2.95 |
| | $\tan\delta_\mu$ | 0.28 | 0.42 | 0.54 |
| | $\tan\delta_\mu/\mu'$ | 0.066 | 0.116 | 0.183 |
| | ε' | 6.37 | 6.38 | 6.49 |
| | $\tan\delta_\varepsilon$ | 0.006 | 0.01 | 0.02 |
| | $\tan\delta_\varepsilon/\varepsilon'$ | 0.0009 | 0.0015 | 0.0030 |
| 1 wt % | μ' | 7.12 | 7.33 | 5.26 |
| | $\tan\delta_\mu$ | 0.06 | 0.33 | 0.69 |
| | $\tan\delta_\mu/\mu'$ | 0.008 | 0.045 | 0.131 |
| | ε' | 5.50 | 5.55 | 5.61 |
| | $\tan\delta_\varepsilon$ | 0.01 | 0.01 | 0.02 |
| | $\tan\delta_\varepsilon/\varepsilon'$ | 0.0018 | 0.0018 | 0.0035 |
| 3 wt % | μ' | 9.91 | 10.6 | 8.42 |
| | $\tan\delta_\mu$ | 0.03 | 0.30 | 0.70 |
| | $\tan\delta_\mu/\mu'$ | 0.003 | 0.028 | 0.080 |
| | ε' | 5.98 | 6.0 | 6.16 |
| | $\tan\delta_\varepsilon$ | 0.001 | 0.002 | 0.01 |
| | $\tan\delta_\varepsilon/\varepsilon'$ | 0.0001 | 0.0003 | 0.0016 |
| 5 wt % | μ' | 5.57 | 6.05 | 6.21 |
| | $\tan\delta_\mu$ | 0.015 | 0.04 | 0.25 |
| | $\tan\delta_\mu/\mu'$ | 0.002 | 0.006 | 0.040 |
| | ε' | 5.51 | 5.50 | 5.59 |
| | $\tan\delta_\varepsilon$ | 0.008 | 0.005 | 0.005 |
| | $\tan\delta_\varepsilon/\varepsilon'$ | 0.0014 | 0.0009 | 0.0008 |
| 10 wt % | μ' | 4.88 | 5.23 | 5.39 |
| | $\tan\delta_\mu$ | 0.01 | 0.03 | 0.20 |
| | $\tan\delta_\mu/\mu'$ | 0.002 | 0.006 | 0.037 |
| | ε' | 8.98 | 9.04 | 9.29 |
| | $\tan\delta_\varepsilon$ | 0.01 | 0.01 | 0.01 |
| | $\tan\delta_\varepsilon/\varepsilon'$ | 0.0011 | 0.0011 | 0.0010 |
| 15 wt % | μ' | 4.41 | 4.69 | 4.76 |
| | $\tan\delta_\mu$ | 0.01 | 0.04 | 0.18 |
| | $\tan\delta_\mu/\mu'$ | 0.002 | 0.008 | 0.037 |
| | ε' | 8.49 | 8.51 | 8.73 |
| | $\tan\delta_\varepsilon$ | 0.0028 | 0.0025 | 0.012 |
| | $\tan\delta_\varepsilon/\varepsilon'$ | 0.0003 | 0.0003 | 0.0013 |
| 20 wt % | μ' | 3.68 | 3.89 | 3.92 |
| | $\tan\delta_\mu$ | 0.01 | 0.04 | 0.16 |
| | $\tan\delta_\mu/\mu'$ | 0.003 | 0.01 | 0.040 |
| | ε' | 4.61 | 4.62 | 4.66 |
| | $\tan\delta_\varepsilon$ | 0.0002 | 0.0004 | 0.003 |
| | $\tan\delta_\varepsilon/\varepsilon'$ | 0.00004 | 0.00008 | 0.0006 |

4. Conclusions

Overall, CuO doped Ni—Co—Zn spinel ferrites with a wide range of CuO dopant concentrations from 0 wt. % to 20 wt. % have been successfully prepared using solid state synthesis method. The quantity of CuO dopants is optimized to modify the microstructure and enhance the magneto-electric properties of the sintered ferrite powders, while lowering the magnetic and dielectric losses. CuO dopant up to 3 wt. % has led to uniform grain growth and increased density that result in substantial improvement in magnetic properties. At 400 MHz, 3 wt. % doped sample has exhibited ~180% increase in permeability along with ~60% reduction in magnetic loss tangent. Further increase of the CuO dopant concentration lowered the magnetic permeability and shifted the resonance frequency into GHz range, which has shown potential to expand the utilization of the ferrite powders for RF and microwave applications at GHz frequencies. Moreover, dielectric properties (permittivity) is also stable over the frequency range. In fact, an improvement in permittivity for concentrations up to 10 wt. % doping has been observed. For example, 10 wt. % CuO doped specimen has exhibited ~40% higher permittivity as compared to that of undoped samples. These results demonstrate that CuO doped Ni—Co—Zn ferrites as a promising candidate for next generation RF and Microwave devices, beyond the current near-field communication (NFC) and wireless charging applications.

REFERENCES

1. M. Eltabey, K. El-Shokrofy, and S. Gharbia, "Enhancement of the magnetic properties of Ni—Cu—Zn ferrites by the non-magnetic Al3+-ions substitution," *Journal of Alloys Compounds,* 509[5] 2473-77 (2011).
2. J. Ghodake, R. C. Kambale, T. Shinde, P. Maskar, and S. Suryavanshi, "Magnetic and microwave absorbing properties of $Co^{2+}$ substituted nickel·zinc ferrites with the emphasis on initial permeability studies," *Journal of Magnetism Magnetic Materials,* 401 938-42 (2016).
3. A. Paduraru, M. Feder, and O. Caltun, "Magnetic properties of some perm invar ferrites," *Journal of Optoelectronics Advanced Materials,* 5[4] 945-50 (2003).
4. F. Xie, Y. Chen, M. Bai, and P. Wang, "Co-substituted LiZnTiBi ferrite with equivalent permeability and permittivity for high-frequency miniaturized antenna application," *Ceramics International,* 45[14] 17915-19 (2019).
5. Y. Shirakata, N. Hidaka, M. Ishitsuka, A. Teramoto, and T. Ohmi, "High permeability and low loss Ni—Fe composite material for high-frequency applications," *IEEE Transactions on Magnetics,* 44[9] 2100-06 (2008).
6. L. Kong, Z. Li, G. Lin, and Y. Gan, "Ni—Zn ferrites composites with almost equal values of permeability and permittivity for low-frequency antenna design," *IEEE Transactions on Magnetics,* 43[1] 6-10 (2006).
7. M. Drofenik, A. Znidarsic, and D. Makovec, "Influence of the addition of $Bi_2O_3$ on the grain growth and magnetic permeability of MnZn ferrites," *Journal of the American Ceramic Society,* 81[11] 2841-48 (1998).
8. P. Gelin, P. Queffelec, and F. Le Pennec, "Effect of domain and grain shapes on the dynamical behavior of polycrystalline ferrites: Application to the initial permeability," *Journal of Applied Physics,* 98[5] 053906 (2005).
9. J. Bouchaud and P. Zerah, "The initial susceptibility of ferrites: A quantitative theory," *Journal of Applied Physics,* 67[9] 5512-14 (1990).
10. T. Nakamura, "Snoek's limit in high-frequency permeability of polycrystalline Ni—Zn, Mg—Zn, and Ni—Zn—Cu spinel ferrites," *Journal of Applied Physics,* 88[1] 348-53 (2000).
11. J. Snoek, "Dispersion and absorption in magnetic ferrites at frequencies above one Mc/s," *Physica,* 14[4] 207-17 (1948).
12. N. Abu-Elsaad, A. Nawara, and S. Mazen, "Synthesis, structural characterization, and magnetic properties of Ni—Zn nanoferrites substituted with different metal ions ($Mn^{2+}$, $Co^{2+}$, and $Cu^{2+}$)," *Journal of Physics Chemistry of Solids* 109620 (2020).
13. S. J. Kumar, P. Prameela, K. S. Rao, J. Kiran, and K. Rao, "Structural and Magnetic Properties of Copper-Substituted Nickel-Zinc Nanoparticles Prepared by Sol-Gel Method," *Journal of Superconductivity Novel Magnetism,* 33[3] 693-705 (2020).
14. J. Shrotri, S. Kulkarni, C. Deshpande, A. Mitra, S. Sainkar, P. A. Kumar, and S. Date, "Effect of Cu substitution on the magnetic and electrical properties of Ni—Zn ferrite synthesised by soft chemical method," *Materials Chemistry Physics,* 59[1] 1-5 (1999).
15. Z. Zheng, Y. Li, T. Liu, and Q. Feng, "Novel high-frequency magneto-dielectric properties of CaO·$SiO_2$ Co-doped NiZnCo spinel ferrites for RF and microwave device applications," *IEEE Transactions on Magnetics,* 54[11] 1-4 (2018).
16. C. Stergiou, "Magnetic, dielectric and microwave absorption properties of rare earth doped Ni—Co and Ni—Co—Zn spinel ferrites," *Journal of Magnetism Magnetic Materials,* 426 629-35 (2017).
17. Q. Li, Y. Chen, and V. G. Harris, "Particle-size distribution modified effective medium theory and validation by magneto-dielectric Co—Ti substituted BaM ferrite composites," *Journal of Magnetism Magnetic Materials,* 453 44-47 (2018).
18. Z. Su, H. Chang, X. Wang, A. S. Sokolov, B. Hu, Y. Chen, and V. G. Harris, "Low loss factor $Co_2Z$ ferrite composites with equivalent permittivity and permeability for ultra-high frequency applications," *Applied Physics Letters,* 105[6] 062402 (2014).
19. Z. Zheng, Q. Feng, and V. G. Harris, "Low-loss Z-type barium hexaferrite composites from nanoscale ZnA1204 addition for high-frequency applications," *AIP Advances,* 8[5] 056107 (2018).
20. Z. Zheng, Q. Feng, Y. Chen, and V. G. Harris, "High-frequency magnetic properties of Ca-substituted $Co_2Z$ and $Co_2W$ barium hexaferrite composites," *IEEE Transactions on Magnetics,* 54[6] 1-6 (2018).
21. T. Y. Byun, S. C. Byeon, K. S. Hong, and C. K. Kim, "Factors affecting initial permeability of Co-substituted Ni—Zn—Cu ferrites," *IEEE Transactions on Magnetics,* 35[5] 3445-47 (1999).
22. S. B. Waje, M. Hashim, and I. Ismail, "Effects of sintering temperature on grain growth and the complex permeability of $Co_{0.2}Ni_{0.3}Zn_{0.5}Fe_2O_4$ material prepared using mechanically alloyed nanoparticles," *Journal of Magnetism Magnetic Materials,* 323[11] 1433-39 (2011).
23. P. Lathiya and J. Wang, "Influence of Hydraulic Pressure on Dynamic Magnetic Properties of Ni—Cu—Zn Ferrites," *IEEE Magnetics Letters,* 10 1-5 (2019).
24. M. Molaahmadi, S. Baghshahi, and A. Ghasemi, "Effect of $Cu^{2+}$ substitution on structural and magnetic properties of Ni—Zn ferrite nanopowders," *Journal of Materials Science: Materials in Electronics,* 27[11] 11447-56 (2016).
25. G. Choudary, P. Prameela, M. C. Varma, A. M. Kumar, and K. Rao, "Contribution to Analysis of Co/Cu Substituted Ni—Zn Ferrites," *Indian Journal of Materials Science,* 2013 (2013).
26. G.-s. Luo, W.-p. Zhou, L. Jian-de, G.-w. Jiang, S.-I. Tang, and Y.-w. Du, "Effect of Cu ion substitution on structural and dielectric properties of Ni—Zn ferrites," *Transactions of Nonferrous Metals Society of China,* 25[11] 3678-84 (2015).

27. H.-I. Hsiang, J.-L. J. J. o. M. Wu, and M. Materials, "Copper-rich phase segregation effects on the magnetic properties and DC-bias-superposition characteristic of NiCuZn ferrites," 374 367-71 (2015).
28. M. S. Ruiz, P. G. Bercoff, and S. E. Jacobo, "Shielding properties of CuNiZn ferrite in the radio frequency range," *Ceramics International,* 39[5] 4777-82 (2013).
29. A. Globus, "Magnetization Mechanismssome Physical Considerations About the Domain Wall Size Theory of Magnetization Mechanisms," *Le Journal de Physique Coltoques,* 38[C1] C1-1-01-15 (1977).
30. T. Tsutaoka, T. Nakamura, and K. Hatakeyama, "Magnetic field effect on the complex permeability spectra in a Ni·Zn ferrite," *Journal of Applied Physics,* 82[6] 3068-71 (1997).
31. T. Tsutaoka, "Frequency dispersion of complex permeability in Mn·Zn and Ni—Zn spinel ferrites and their composite materials," *Journal of Applied Physics,* 93[5] 2789-96 (2003).
32. H. Igarashi and K. Okazaki, "Effects of porosity and grain size on the magnetic properties of NiZn ferrite," *Journal of the American Ceramic Society,* 60[1]2] 51-54 (1977).
33. Q. Li, Y. Chen, C. Yu, K. Qian, and V. G. Harris, "Permeability spectra of planar M-type barium hexaferrites with high Snoek's product by two-step sintering," *Journal of the American Ceramic Society* (2020).
34. A. Barba, C. Clausell, J. Jarque, and L. Nuno, "Magnetic complex permeability (imaginary part) dependence on the microstructure of a Cu-doped Ni—Zn-polycrystalline sintered ferrite," *Ceramics International,* 46[10] 14558-66 (2020).
35. H. Su, H. Zhang, X. Tang, Y. Jing, and Z. Zhong, "Complex permeability and permittivity spectra of polycrystalline Ni—Zn ferrite samples with different microstructures," *Journal of Alloys Compounds,* 481 [1-2] 841-44 (2009).
36. Y. Chen, V. Harris, Mo-Doped $Co_2Z$-Type Ferrite Composite Material For Use Ultra-High Frequency, U.S. Patent Application Publication No. 2018/0016157.
37. Y. Chen, V. Harris, $Co_2Z$-Type Ferrite Composite Material For Use In Ultra-High Frequency Antennas, U.S. Patent Application Publication No. 2017/0213628.
38. Jie Li, Dandan Wen, Qiang Li, Tianhui Qiu, Gongwen Gan, Huaiwu Zhang, "Equal Permeability And Permittivity In A Low Temperature Co-Fired In-Doped Mg—Cd Ferrite", *Ceramics International*, Volume 44, Issue 1, January 2018, Pages 678-682.
39. J. Ghodake, R. Kambale, S. Kulkarni, S. Sawant, S. S. Suryavanshi, "Complex Permeability Studies Of Ni—Co—Zn Ferrites Synthesized By An Oxalate Precursor Method", *Smart Materials and Structures*, Volume 18, Number 1218 (2009).
40. A. Thakura, A. Chevalier, J. L. Mattei, and P. Queffelec, "Low-loss spinel nanoferrite with matching permeability and permittivity in the ultrahigh frequency range", *Journal of Applied Physics* 108, 014301 (2010).
41. P. Mathur, A. Thakur, J. H. Lee, M. Singh, "Sustained electromagnetic properties of Ni—Zn—Co nanoferrites for the high-frequency applications", *Materials Letters*, Volume 64, Issue 24, 31 Dec. 2010, Pages 2738-2741.

The citation of any document is not to be construed as an admission that it is prior art with respect to the present invention.

In this disclosure, we focused on development of CuO doped Ni—Co—Zn ferrites for very high and ultra high applications. More specifically, the effect of CuO concentration on the real part of permeability and magnetic loss tangent has been explored. Dynamic magnetic properties in CuO-substituted (x=0 to 20 wt. %) Ni—Co—Zn ferrites at RF frequencies have been investigated. The Ni—Co—Zn ferrites were prepared by a ceramic synthesis process. The synthesized powders were doped with CuO additives up to 20 wt. %. The copper substitution has led to soft ferrites with high permeability and low magnetic loss at RF and microwave frequencies. The technology can be utilized at higher frequencies and in very high frequency applications such as antennas, isolators, and circulators, etc.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment", "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein. Various features and advantages of the invention are set forth in the following claims.

What is claimed is:

1. A ferrite composition comprising:

a ferrimagnetic ceramic material having a crystal structure and a dopant in the crystal structure, wherein the ceramic material comprises an oxide including nickel, cobalt, zinc, and iron, wherein the dopant is selected from the group consisting of copper oxides, and wherein the dopant is present in the crystal structure at 0.1 to 20 weight percent based on a total weight of the composition.

2. The ferrite composition of claim 1 wherein:

the ceramic material is an oxide consisting essentially of nickel, cobalt, zinc, iron, and oxygen.

3. The ferrite composition of claim 1 wherein:

the dopant is present in the crystal structure at 0.1 to 8 weight percent based on a total weight of the composition.

4. The ferrite composition of claim 1 wherein:

the dopant is CuO.

5. The ferrite composition of claim 1 wherein:

a sum of a stoichiometry of the nickel, a stoichiometry of the cobalt, and a stoichiometry of the zinc, is in a ratio of about 1:2 with a stoichiometry of the iron.

6. The ferrite composition of claim 1 wherein:
the ceramic material has the formula: $Ni_{0.4}Co_{0.25}Zn_{0.35}Fe_2O_{4.1}$.

7. The ferrite composition of claim 1 wherein:
the ceramic material has the formula: $Ni_{0.4}Co_{0.25}Zn_{0.35}Fe_2O_4$.

8. The ferrite composition of claim 1 wherein:
the ferrite composition has a porosity of 5% or less.

9. The ferrite composition of claim 1 wherein:
the ferrite composition has a porosity of 3% or less.

10. The ferrite composition of claim 1 wherein:
the ferrite composition has a porosity of 2% or less.

11. The ferrite composition of claim 1 wherein:
the ferrite composition has an average crystallite size of 50 nanometers or less.

12. A method for forming a ferrite composition, the method comprising:
(a) combining a first solid comprising nickel, a second solid comprising cobalt, a third solid comprising zinc, and a fourth solid comprising iron to form a mixture;
(b) calcining the mixture;
(c) doping the calcined mixture with a fifth solid comprising copper;
(d) forming an article from the doped calcined mixture; and
(e) sintering the article for form the ferrite composition.

* * * * *